United States Patent
Park et al.

(10) Patent No.: US 11,202,231 B2
(45) Date of Patent: Dec. 14, 2021

(54) MANAGEMENT DEVICE AND METHOD FOR CONTROLLING END-TO-END NETWORK IN WIRELESS COMMUNICATION SYSTEM

(71) Applicant: Samsung Electronics Co., Ltd., Suwon-si (KR)

(72) Inventors: Kibeom Park, Suwon-si (KR); Eunjin Choi, Suwon-si (KR); Ilhwan Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 16/736,151

(22) Filed: Jan. 7, 2020

(65) Prior Publication Data

US 2020/0221346 A1  Jul. 9, 2020

(30) Foreign Application Priority Data

Jan. 8, 2019 (KR) .................. 10-2019-0002222

(51) Int. Cl.
*H04W 28/12* (2009.01)
*H04W 24/10* (2009.01)
(Continued)

(52) U.S. Cl.
CPC .......... *H04W 28/12* (2013.01); *H04W 24/10* (2013.01); *H04W 28/0268* (2013.01);
(Continued)

(58) Field of Classification Search
CPC ..... H04W 28/10; H04W 28/12; H04W 28/02; H04W 28/0268; H04W 28/20;
(Continued)

(56) References Cited

U.S. PATENT DOCUMENTS 9,215,179 B2  12/2015  Park
9,426,042 B2   8/2016  Park et al.
(Continued)

FOREIGN PATENT DOCUMENTS

EP         3267624 A1    1/2018
KR   10-2018-0127816 A  11/2018

OTHER PUBLICATIONS

"3rd Generation Partnership Project; Technical Specification Group Services and System Aspects; Study on Architecture for Next Generation System (Release 14)", 3GPP Standard; 3GPP TR 23.799, 3rd Generation Partnership Project (3GPP), Mobile Compeience Centre; 650, Route Des Lucioles; F-06921 Sophia-Antipolis Cedex France, vol. SA WG2, No. v1.0.2, pp. 1-423, XP051172701.

(Continued)

*Primary Examiner* — Kevin D Mew
(74) *Attorney, Agent, or Firm* — Jefferson IP Law, LLP

(57) ABSTRACT

A device and a method for managing and controlling an end-to-end network in a wireless communication system are provided. The management device for controlling an end-to-end network in a wireless communication system includes a network slice manager configured to configure network slices for a terminal, a policy manager configured to set a policy applied to the network slices and a software defined network (SDN) device configured to control one or more network entities related to transmission of traffic for the network slices, based on the policy, wherein each of the network slices are configured for a different frequency band.

20 Claims, 49 Drawing Sheets

(51) Int. Cl.
*H04W 28/02* (2009.01)
*H04W 28/24* (2009.01)
*H04W 40/12* (2009.01)
*H04W 48/06* (2009.01)

(52) U.S. Cl.
CPC ........... *H04W 28/24* (2013.01); *H04W 40/12* (2013.01); *H04W 48/06* (2013.01)

(58) Field of Classification Search
CPC ..... H04W 28/22; H04W 28/24; H04W 24/10; H04W 40/12; H04W 48/02; H04W 48/06
See application file for complete search history.

(56) References Cited

U.S. PATENT DOCUMENTS

| | | | |
|---|---|---|---|
| 9,635,569 B2 | 4/2017 | Park et al. | |
| 10,439,902 B2 | 10/2019 | Park et al. | |
| 10,582,393 B2 * | 3/2020 | Deviprasad | H04L 47/70 |
| 10,601,724 B1 * | 3/2020 | Filsfils | H04L 47/10 |
| 10,862,818 B2 * | 12/2020 | Senaralh | H04W 72/1257 |
| 10,999,756 B2 * | 5/2021 | Bogineni | H04W 4/00 |
| 2014/0226467 A1 | 8/2014 | Park | |
| 2015/0281073 A1 * | 10/2015 | Kotha | H04L 49/25 370/392 |
| 2017/0070892 A1 * | 3/2017 | Song | H04W 48/20 |
| 2017/0142010 A1 * | 5/2017 | Mathew | H04L 12/6418 |
| 2017/0332421 A1 | 11/2017 | Sternberg et al. | |
| 2018/0077032 A1 | 3/2018 | Park et al. | |
| 2018/0124854 A1 * | 5/2018 | Myhre | H04W 76/10 |
| 2018/0132138 A1 * | 5/2018 | Senarath | H04L 41/5041 |
| 2018/0152958 A1 * | 5/2018 | Arnold | H04L 41/5025 |
| 2018/0270820 A1 * | 9/2018 | Gupta | H04W 64/003 |
| 2018/0332441 A1 * | 11/2018 | Shaw | H04L 67/1044 |
| 2018/0343567 A1 | 11/2018 | Ashrafi | |
| 2018/0368140 A1 * | 12/2018 | Centonza | H04W 72/0426 |
| 2019/0140904 A1 * | 5/2019 | Huang | H04L 41/0816 |
| 2019/0261187 A1 * | 8/2019 | Chen | H04W 72/0406 |
| 2019/0281466 A1 * | 9/2019 | Zhang | H04W 16/10 |
| 2020/0045548 A1 * | 2/2020 | Dowlatkhah | H04W 12/08 |
| 2020/0053834 A1 * | 2/2020 | Dahan | H04L 43/08 |
| 2020/0068430 A1 * | 2/2020 | Chan | H04W 24/08 |
| 2020/0275360 A1 * | 8/2020 | Bordeleau | H04W 76/11 |
| 2020/0314628 A1 * | 10/2020 | Panchal | H04W 8/24 |
| 2020/0351756 A1 * | 11/2020 | Jager | H04L 47/127 |
| 2020/0404531 A1 * | 12/2020 | Bogineni | H04W 28/0263 |
| 2021/0084582 A1 * | 3/2021 | Li | H04W 48/18 |

OTHER PUBLICATIONS

Extended European Search Report dated Mar. 26, 2020, issued in European Application No. 20150810.8-1216.

* cited by examiner

FIG. 5B

| Slice ID | Name | Type | NSD | Base Station IP | SLA | |
|---|---|---|---|---|---|---|
| | | | | | Bandwidth | Delay |
| 1 | Slice A | LTE | A | 5G NB (3.5GHz) IP address | 5Gbps | 25ms |
| 2 | Slice B | 5G 3.5GHz | B | 5G NB (28GHz) IP address | 10Gbps | 3ms |
| 3 | Slice C | 5G 28GHz | C | LTE eNB IP address | 40Gbps | 10ms |
| ⋮ | ⋮ | ⋮ | ⋮ | | ⋮ | ⋮ |

FIG. 5C

| UE ID | Bearer IP | | | Signaling IP | | |
|---|---|---|---|---|---|---|
| | Slice A | Slice B | Slice C | Slice A | Slice B | Slice C |
| 110 | 2.1.1.1 | 2.1.1.2 | 2.1.1.3 | 2.1.2.1 | 2.1.2.2 | 2.1.2.3 |
| 112 | 10.1.1.1 | | | 10.1.2.1 | 10.1.2.2 | 10.1.2.3 |
| ... | ... | ... | ... | ... | ... | ... |

FIG. 11A

Flow Table 0

| FlowRule for Uplink | | | | |
|---|---|---|---|---|
| Message Type | FLOW-MOD (type=ADD) | | | |
| Table Id | | | | 0 |
| Priority | | | | 40000 |
| Match | OXM field | OFPXMT_OFB_ETH_TYPE | | 0x0800 | Ether type 0x0800 |
| | OXM field | OFPXMT_OFB_IP_PROTO | | 0x11(UDP) | Outer IP protocol ID |
| | OXM field | OFPXMT_OFB_IPV4_SRC | | 10.1.1.1 | Base station IPv4 address |
| | OXM field | OFPXMT_OFB_UDP_DST | | 2152 | UDP destination port for GTP-U packet |
| Instruction | OFPIT_APPLY_ACTIONS | OFPAT_INNER_IPLKUP | - | - | |
| | OFPIT_SET_METADATA | | | 0x1 | Slice ID value |
| | OFPIT_GOTO_TABLE | | | 1 | go to next-table (table 1) |
| Counter | Bytes | | | xx | |
| | Packets | | | xx | |

| FlowRule for Downlink | | | | |
|---|---|---|---|---|
| Message Type | FLOW-MOD (type=ADD) | | | |
| Table Id | | | | 0 |
| Priority | | | | 40000 |
| Match | OXM field | OFPXMT_OFB_ETH_TYPE | | 0x0800 | Ether type 0x0800 |
| | OXM field | OFPXMT_OFB_IP_PROTO | | 0x11(UDP) | Outer IP protocol ID |
| | OXM field | OFPXMT_OFB_IPV4_DST | | 30.1.1.1 | Base station IPv4 address |
| | OXM field | OFPXMT_OFB_UDP_DST | | 2152 | UDP destination port for GTP-U packet |
| Instruction | OFPIT_APPLY_ACTIONS | OFPAT_INNER_IPLKUP | - | - | |
| | | OFPAT_SET_FIELD | OFPXMT_OFB_TUN_ID | 0x435 | |
| | OFPIT_SET_METADATA | | | 0x1 | Slice ID value |
| | OFPIT_GOTO_TABLE | | | 1 | go to next-table (table 1) |
| Counter | Bytes | | | xx | |
| | Packets | | | xx | |

Flow Table 1

FlowRule for Uplink

| Message Type | FLOW-MOD (type=ADD) | | |
|---|---|---|---|
| Table Id | | | |
| Priority | | Value | Description |
| Match | OXM field | 40000 | |
| | OXM field | 0x0800 | Ether type 0x0800 |
| | OXM field | 0X1 | Slice ID |
| | | 11.11.11.2 | UE IPv4 address |
| Instruction | OFPIT_GOTO_TABLE | 2 | go to next-table (table 2) |
| Counter | Bytes | xx | |
| | Packets | xx | |

FlowRule for Downlink

| Message Type | FLOW-MOD (type=ADD) | | |
|---|---|---|---|
| Table Id | | | |
| Priority | | Value | Description |
| Match | OXM field | 40000 | |
| | OXM field | 0x0800 | Ether type 0x0800 |
| | OXM field | 0X1 | Slice ID |
| | | 11.11.11.2 | UE IPv4 address |
| Instruction | OFPIT_GOTO_TABLE | 2 | go to next-table (table 2) |
| Counter | Bytes | xx | |
| | Packets | xx | |

Flow Table 2

FlowRule for Uplink

| | | Value | Description |
|---|---|---|---|
| Message Type | FLOW-MOD (type=ADD) | | |
| Table Id | | 2 | |
| Priority | | 40000 | |
| Match | OXM field | 00:16:e3:45:b3:64 | VM(UPF) MAC address |
| | OXM field | 0x435 | Tenant's segmentation ID |
| Instruction | OFPIT_APPLY_ACTIONS | | |
| | OFPAT_OUTPUT | 2 | Output port to UPF VM |
| Counter | Bytes | xx | |
| | Packets | xx | |

FlowRule for Downlink

| | | Value | Description |
|---|---|---|---|
| Message Type | FLOW-MOD (type=ADD) | | |
| Table Id | | 2 | |
| Priority | | 30000 | |
| Match | OXM field | 0x0800 | Ether type 0x0800 |
| | OXM field | 0x435 | Tenant's segmentation ID |
| Instruction | OFPIT_APPLY_ACTIONS | | |
| | OFPAT_SET_FIELD | OFPXMT_TUN_DST | 120.251.215.247 | Remote Vxlan Tunnel end point IP address |
| | OFPAT_OUPUT | 1 | Ouput port to VXLAN tunnel (VTEP) |
| Counter | Bytes | xx | |
| | Packets | xx | |

FIG. 22

DSM ORCHESTRATOR　TOPOLOGY VIEW　CONFIGURATION　MONITOR　PERFORMANCE　GENERAL

Slice Configuration

Slice Configuration

| ID | Name | Type | Base Station IP | Actions |
|---|---|---|---|---|
| 1 | LTE | LTE | 20.11.21 | |
| 2 | 3.5G | 3.5GHz | 20.11.22 | |
| 3 | 28G | 28GHz | 20.11.23 | |

Connected　Critical　CRITICAL　id　Event　Location　Description

FIG. 32

MANAGEMENT DEVICE AND METHOD FOR CONTROLLING END-TO-END NETWORK IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0002222, filed on Jan. 8, 2019, in the Korean Intellectual Property Office, the disclosure of which is incorporated by reference herein in its entirety.

BACKGROUND

1. Field

The disclosure relates to a method for controlling an end-to-end network and a device therefor.

2. Description of Related Art

In order to meet wireless data traffic demands that have increased after $4^{th}$ generation (4G) communication system commercialization, efforts to develop an improved $5^{th}$ generation (5G) communication system or a pre-5G communication system have been made. For this reason, the 5G communication system or the pre-5G communication system is called a beyond 4G network communication system or a post long term evolution (LTE) system. In order to achieve a high data transmission rate, an implementation of the 5G communication system in a mmWave band (for example, 60 GHz band) is being considered. In the 5G communication system, technologies such as beamforming, massive multiple input and multiple output (MIMO), Full Dimensional MIMO (FD-MIMO), array antenna, analog beam-forming, and large scale antenna are being discussed as means to mitigate a propagation path loss in the mm Wave band and increase a propagation transmission distance. Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network. In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has evolved into an Internet of Things (IoT) network in which distributed components such as objects exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted.

In an IoT environment, an intelligent Internet Technology (IT) service that collects and analyzes data generated from connected objects and creates new value in peoples' lives may be provided. The IoT may be applied to fields such as those of a smart home, a smart building, a smart city, a smart car, a connected car, a smart grid, health care, a smart home appliance, or high-tech medical services through the convergence of the conventional Information Technology (IT) and various industries.

In 5G, there is a need to support interference-free operation between devices with various requirements, and the need for dynamic network control is also receiving attention for services, such as IoT (massive IoT), smart cars, and the like, which have new characteristics. In line with this, network slices that constitute dedicated networks based on several logical virtual networks have been introduced to support a variety of services with different characteristics in a single physical network. Network slices dynamically produce services with new characteristics and assure fast delivery of new services, thereby generating revenue.

Such network slices are logically isolated from each other and have a feature of end-to-end (E2E) from a terminal to a data network. Therefore, if the network slices are optimally configured according to requirements for each slice, such as latency or bandwidth, it is possible to control an E2E range.

Meanwhile, network service assurance technology provides performance monitoring for diagnosing and managing network quality and optimizes the network in conjunction with software defined network (SDN) technology using the performance monitoring. Further, the network service assurance technology is capable of providing value-added services, such as recommendation of a new resource configuration at an optimal location, in association with big data analytics or machine learning. In particular, next-generation networks represented by 5G have two major features, as follows, in terms of QoE.

The evolution of the existing wireless communication requires only an increase in the bandwidth, but primary requirements in 5G are low latency and low jitter, which require real-time responsiveness and mutual reaction. According to these requirements, since many devices represented by IoT are required to be controlled, the complexity of the network increases exponentially. In addition, since several service providers must satisfy a service level agreement (SLA) between a plurality of network providers while configuring a single mobile communication network, management of network quality becomes very important.

In another aspect, as existing network infrastructure is rapidly changing to the cloud, a network slicing technique for logically dividing the same infrastructure into multiple networks is emerging as an important technology. Thus, quality management technology in cloud-based data center networks is becoming more important.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of configuring a network slice for each radio access technology (RAT) and for setting and operating a policy for each network slice.

Another aspect of the disclosure is to provide a method for managing network slices by distinguishing between packets for respective configured network slices in a network and by monitoring traffic in an end-to-end (E2E) section between a terminal and a data network.

Additional aspects will be set forth in part in the description which follows and, in part, will be apparent from the description, or may be learned by practice of the presented embodiments.

In accordance with an aspect of the disclosure, a management device for controlling an end-to-end network in a wireless communication system is provided. The device includes a network slice manager configured to configure network slices for a terminal, a policy manager configured to set a policy applied to the plurality of network slices and a software defined network (SDN) device configured to control one or more network entities related to transmission of traffic for the plurality of network slices, based on the policy, wherein each of the plurality of network slices is configured for a different frequency band.

In accordance with another aspect of the disclosure, a server for controlling an end-to-end network in a wireless communication system is provided. The server includes a virtual switch including a flow table applier configured to process traffic for a terminal and a user plane function (UPF) configured to receive the traffic from the terminal or transmit the traffic to the terminal, wherein the flow table applier may be configured to identify a network slice configured for the terminal among a plurality of network slices using a plurality of flow tables for processing the traffic and process the traffic according to a flow rule corresponding to the identified network slice, and wherein each network slice among the plurality of network slices is configured for a different frequency band.

In accordance with another aspect of the disclosure, a method of the management device for controlling an end-to-end network in a wireless communication system is provided. The method includes configuring the plurality of network slices for a terminal, setting a policy applied to the plurality of network slices and controlling one or more network entities related to the transmission of traffic for the plurality of network slices, based on the policy, wherein each of the plurality of network slices is configured for a different frequency band.

In accordance with another aspect of the disclosure, a method of a server for controlling an end-to-end network in a wireless communication system is provided. The method includes identifying a network slice configured for a terminal among a plurality of network slices using a plurality of flow tables for processing traffic for the terminal, processing the traffic according to a flow rule corresponding to the identified network slice and transmitting the processed traffic to a user plane function (UPF) inside the server or an entity outside the server, wherein each network slice among the plurality of network slices is configured for a different frequency band.

According to an embodiment, it is possible to measure and monitor the network quality for each network slice and for each terminal by configuring and operating a network slice for each RAT.

In addition, according to an embodiment, it is possible to support the measurement of network quality and optimization based on the same by monitoring traffic for the overall section, as well as a specific section of E2E.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5B is a diagram illustrating an example of data for managing a policy and slices in the system according an embodiment of the disclosure;

FIG. 5C is a diagram illustrating an example of data for managing policy and slices in the system according to FIG. 5A of the disclosure;

FIG. 11A is a diagram illustrating an example of a flow table used to process a packet inside a virtual switch according to an embodiment of the disclosure;

FIG. 12 is a diagram illustrating an example of a flow table used to process a packet inside a virtual switch according to an embodiment of the disclosure;

FIG. 13 is a diagram illustrating an example of a flow table used to process a packet inside a virtual switch according to an embodiment of the disclosure;

FIG. 22 is a diagram illustrating a user interface for providing information on network slices configured for respective RATs according to an embodiment of the disclosure;

FIG. 32 is a diagram illustrating a user interface for an operator to input configuration related to an active monitoring operation for a specific network slice according to an embodiment of the disclosure;

The same reference numerals are used to represent the same elements throughout the drawings.

DETAILED DESCRIPTION

Figure 1A:
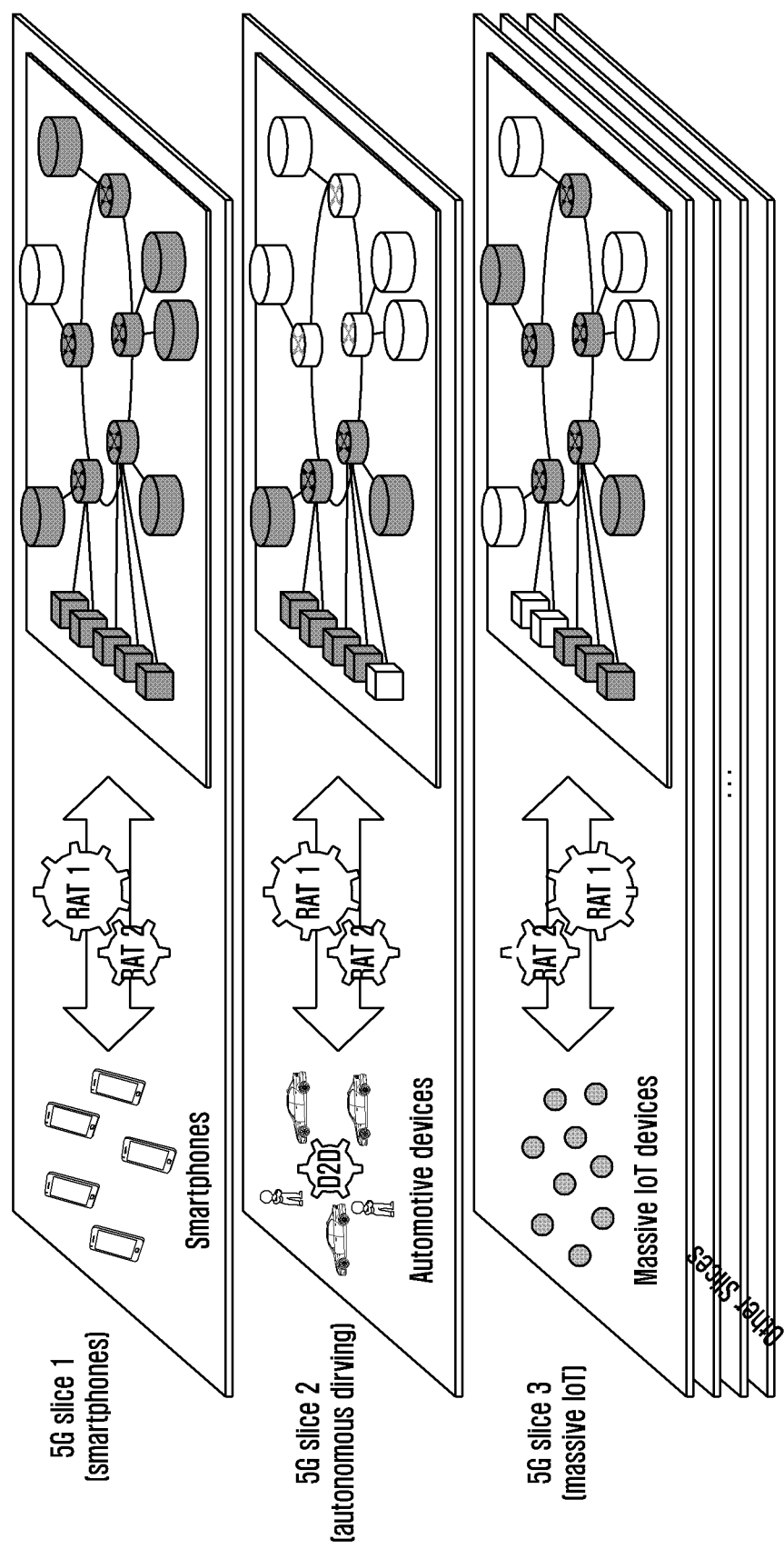
FIG. 1A is a diagram illustrating a structure for operating a network slice for each service according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, in describing the embodiments of the disclosure, a main substance of the disclosure may be applied to even other communication systems that have a similar technical background with a little change in a range that is not largely out of the range of the disclosure, and this may be possible by a determination of a person having a skilled technical knowledge in a technical field of the disclosure.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors.

Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

Hereinafter, the configuration of a network slice and a method of operating and managing the same according to an embodiment will be described in more detail with reference to the accompanying drawings.

Figure 1B:
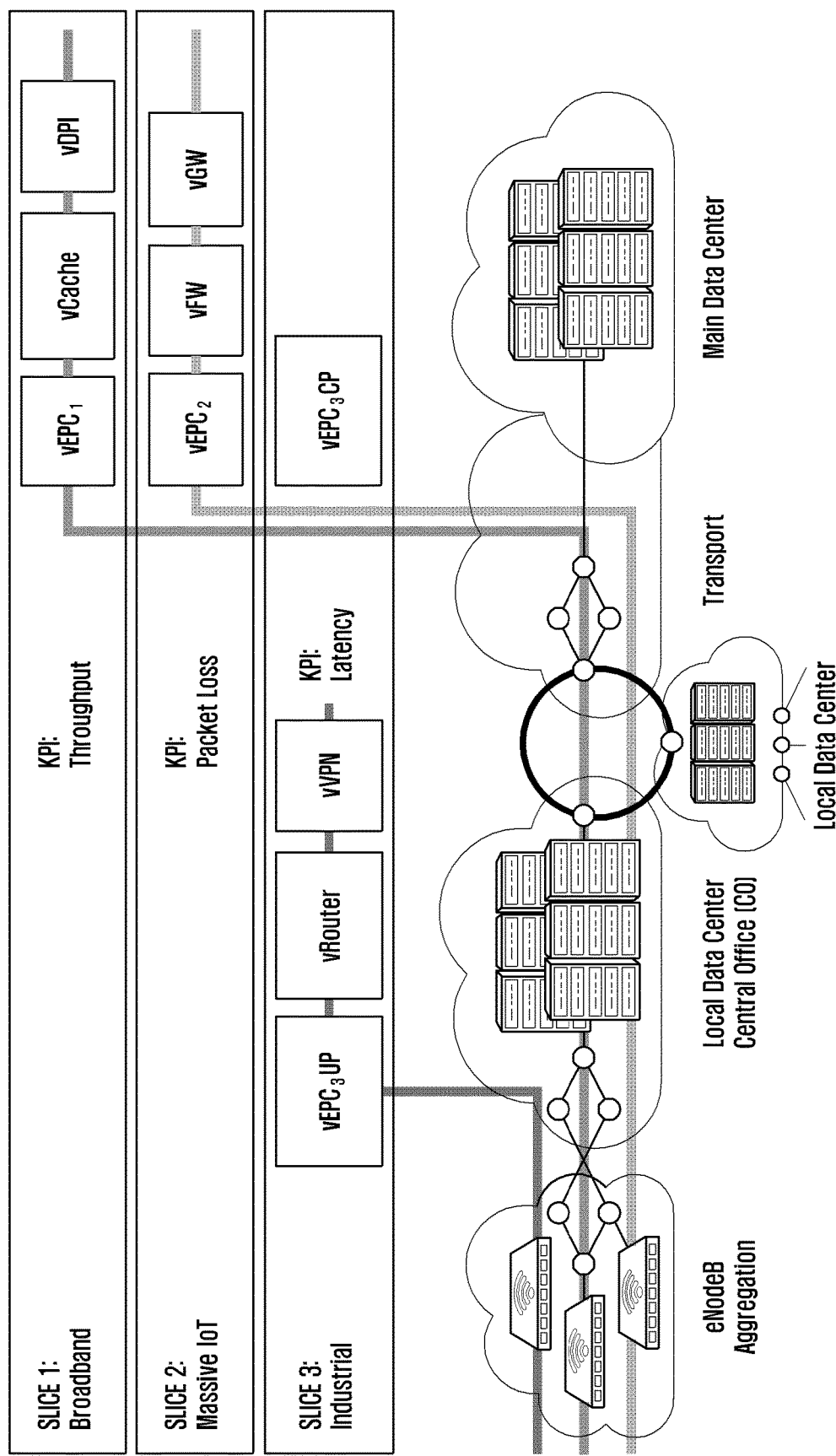
FIG. 1B is a diagram illustrating a structure for operating a network slice for each service according to an embodiment of the disclosure.

FIGS. 1A and 1B are diagrams illustrating a structure for operating a network slice for each service, according to various embodiments of the disclosure.

Figure 1C:
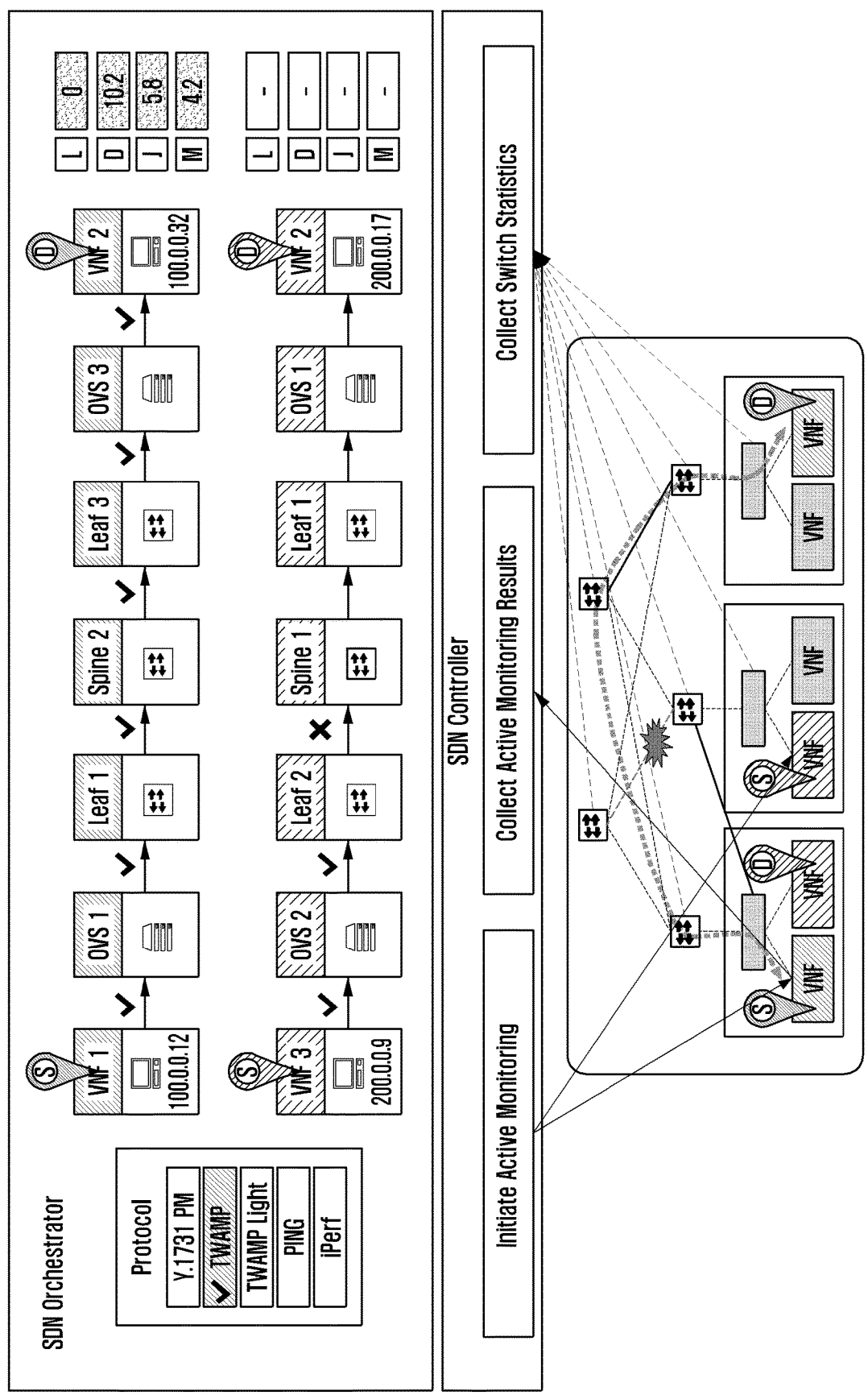
FIG. 1C is a diagram illustrating the structure of a data center for measuring network quality according to an embodiment of the disclosure.

FIG. 1C is a diagram illustrating the structure of a data center for measuring network quality according to an embodiment of the disclosure.

FIG. 1A shows that network slices are configured and operated for respective services supported by 5G according to an embodiment of the disclosure.

Referring to FIG. 1A, a first slice may be configured to support a wireless communication service between user terminals (e.g., smart phones, mobile phones, etc.). In addition, a second slice may be configured for a wireless communication service supporting transmission and reception of necessary information between devices that are moving at a predetermined speed or more, such as vehicles. Further, a third slice may be configured to support a massive IoT service for collecting and analyzing data on specific objects. As shown in FIG. 1A, in addition to the above examples, various network slices may be configured and operated for respective services supported by 5G.

In the embodiment, network slices for respective services are configured in the same infrastructure, instead of producing a dedicated network for each service.

Referring to FIG. 1B, for example, a first slice for supporting broadband services, a second slice for supporting massive IoT services, and a third slice for supporting industrial services may be configured. In this case, the respective network slices may have different key performance indicators (KPIs), which are performance indicators for respective services. For example, the first slice, which needs to support broadband services may have a throughput as a KPI, the second slice, which needs to support massive IoT may have packet loss as a KPI, and the third slice, which needs to support industrial services may have latency as a KPI.

Meanwhile, the respective network slices may be operated by logically dividing resources, such as networks, according to the characteristics of respective services and allocating the same to the slices in an existing infrastructure. Referring to FIG. 1B, although several network slices are logically divided and configured according to services, it can be seen that they are operated in the same infrastructure in which base stations, a data center office, and a data center are connected.

In the case where network slices are operated for respective services as described above, even if a terminal uses multiple RATs in a non-stand-alone (NSA) structure in which LTE and 5G coexist, the network slices can be operated only for specific services of 5G. That is, since the network slices are not operated for respective RATs, it is difficult to measure the total traffic of the corresponding terminal and to determine whether or not the providers satisfy the service level agreement (SLA).

Referring to FIG. 1C, it illustrates a structure for measuring network quality by performing monitoring inside a data center. More specifically, the monitoring in FIG. 1C includes an active monitoring scheme for measuring quality by transmitting a test packet for diagnosis and a passive monitoring scheme for measuring quality using a normal communication packet. In this way, an operator is able to measure the network quality of a desired section in the complex network structure inside the data center, and it is possible to secure the visibility of a target network in the measurement section and to collectively manage the same, based on software.

If the monitoring is performed only in the data center as described above, it is difficult to measure network quality in an end-to-end (E2E) section including entities outside the data center. In addition, in the situation in which a plurality of network slices is configured and operated, a network slice operation system and a network quality measurement system are not associated with each other. Therefore, it is difficult to measure quality for each network slice, and it is impossible to perform a traffic optimization operation reflecting the same.

Accordingly, an embodiment of the disclosure proposes a method for configuring network slices for respective RATs and producing and applying a policy for each network slice in a system including the network slices configured for respective RATs.

In addition, an embodiment of the disclosure proposes a method for monitoring end-to-end traffic in a system including network slices for respective RATs and measuring and optimizing the quality thereof.

Figure 2:
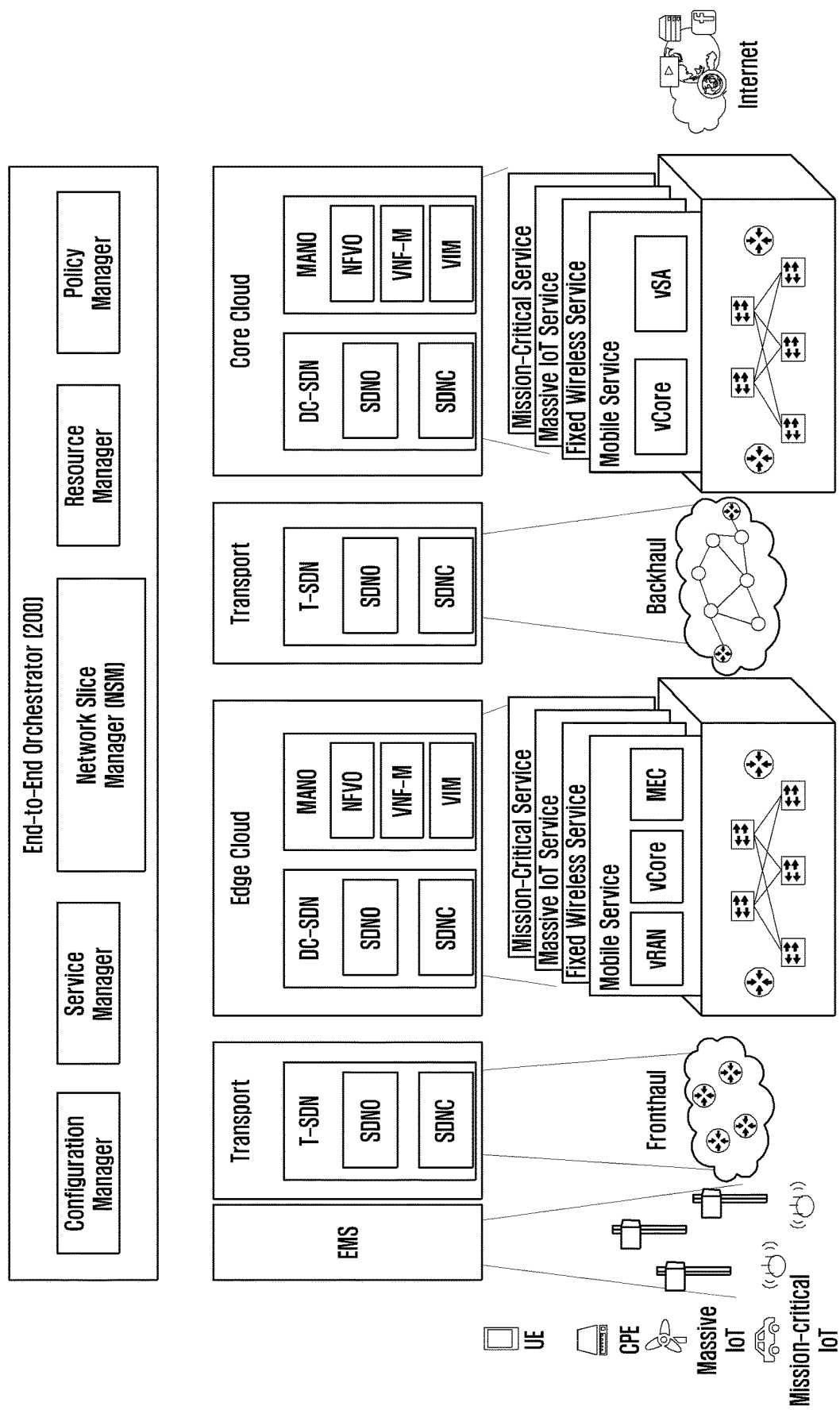
FIG. 2 is a diagram illustrating network entities included in an overall service section of a terminal according to an embodiment of the disclosure.

FIG. 2 is a diagram illustrating network entities included in an overall service section of a terminal according to an embodiment of the disclosure.

Figure 3:
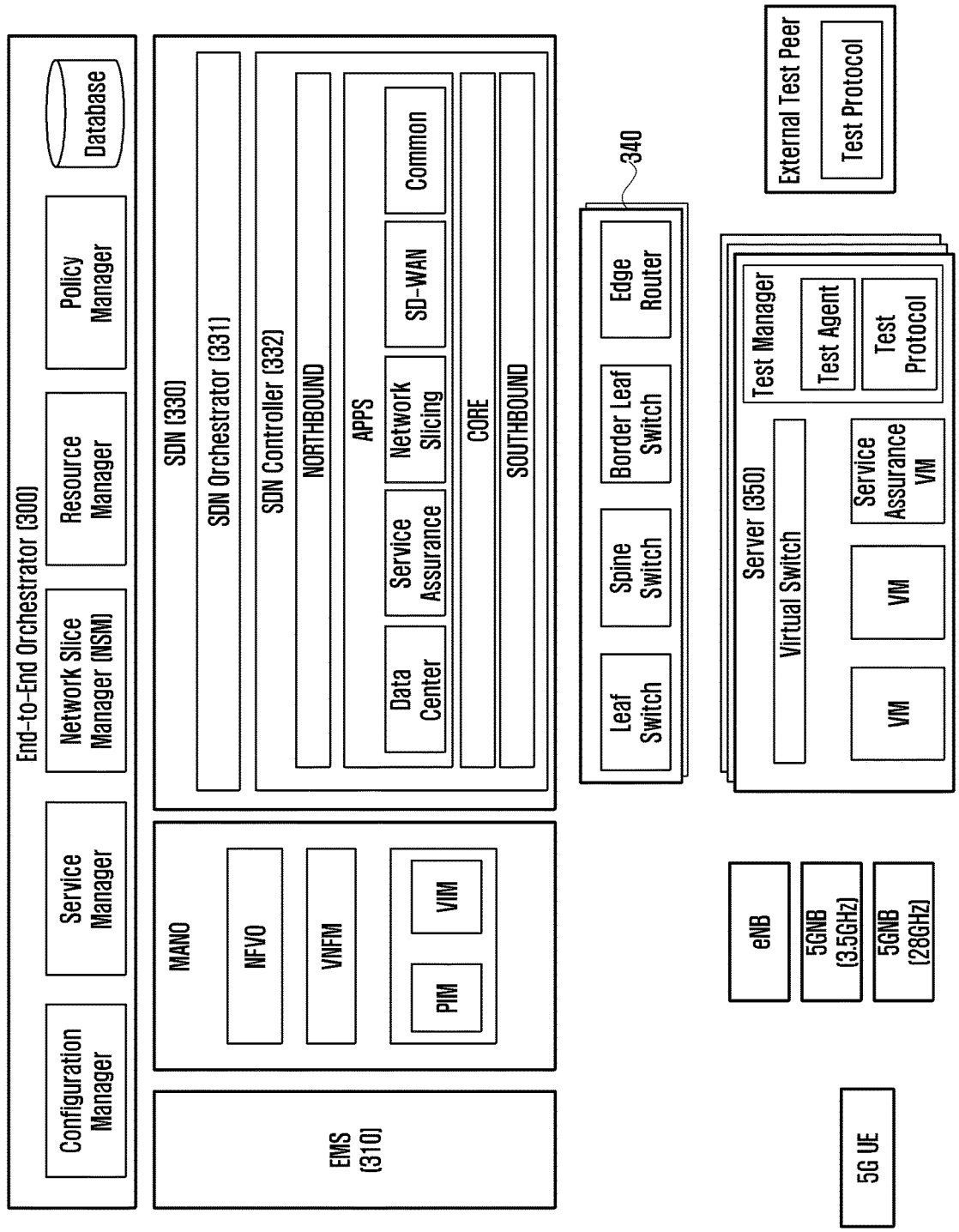
FIG. 3 is a block diagram illustrating the configuration of network entities for managing elements in respective sections in the overall service section of a terminal according to an embodiment of the disclosure.

FIG. 3 is a block diagram illustrating the configuration of network entities for managing elements in respective sections in the overall service section of a terminal according to an embodiment of the disclosure.

Referring to FIG. 2, a system for managing and operating a network according to an embodiment of the disclosure may include an E2E orchestrator 200 for controlling and managing an overall service section including a terminal and used by the terminal. The E2E orchestrator (E2E-O) 200 according to an embodiment, as shown in the drawing, may include a configuration manager, a service manager, a network slice manager (NSM), a resource manager, and a policy manager. According to an embodiment, the network slice manager may configure and operate network slices for respective RATs, and the policy manager may play the role of setting a policy and applying the same to each of the configured network slices. A detailed description of the respective elements will be made later with reference to FIG. 5A.

A system for controlling and managing an overall service section including a terminal and used by the terminal (hereinafter, referred to as an "end-to-end service section") according to an embodiment may include a plurality of network entities for managing a plurality of elements that manage the end-to-end service section {e.g., a base station, a virtual network function (VNF), a link, etc.). As shown in FIG. 2, the end-to-end service section may include an EMS for managing and controlling wireless communication between terminals, such as user equipment (UE), IoT devices, and the like, and a base station, an edge cloud for processing packets for the wireless communication, a transport section including a fronthaul connected to the edge cloud, a core cloud for processing packets at a core end, and a transport section connecting the core cloud to the edge cloud through a backhaul.

The edge cloud, the respective transport sections, and the core cloud may include at least one of a software defined network (SDN) and management and orchestration (MANO). The SDN and the MANO may perform a function of managing and controlling operation by network elements in corresponding sections.

Referring to FIG. 3, an element management system (EMS) 310 according to an embodiment of the disclosure may control and manage functions of a base station and a data center, such as a RAN virtualized network function (VNF), a core VNF, or the like. In addition, the EMS 310 may transmit information on a base station, a RAN VNF, a core VNF, or the like, to an E2E-O 300, and may be controlled by the E2E-O 300 so as to set items configured to the base station, the RAN VNF, the core VNF, or the like, among network slice policies.

The MANO 320 according to an embodiment, as shown in FIG. 3, may include a network functions virtualization orchestrator (NFVO), a virtualized network function manager (VNFM), a physical infrastructure manager (PIM), and a virtualized infrastructure manager (VIM). The MANO 320 manages virtual resources in the data center and controls and manages operations related to the lifecycle of the VNFs (e.g., an operation of producing or deleting VNFs). The MANO 320 may transmit information and status of VNFs in the data center to the E2E-O 300, and may be controlled by the E2E-O 300 so as to produce or delete VNFs required for configuration of network slices.

As shown in FIG. 3, the SDN 330 according to an embodiment may include an SDN orchestrator 331 and an SDN controller 332 for operating and managing the SDN. In addition, the SDN controller 332 may include applications (APPs) for executing operations related to the data center or network slices. The operation of the elements related to the embodiment of the disclosure, among the elements included in the SDN controller 332, will be described later.

In addition, the system according to an embodiment may include a plurality of switches 340 that are associated with the applications (APPs) of the SDN and process packets related to the respective network slices and a server 350 including a virtual switch and a test manager for performing a monitoring-related operation.

The SDN 330 according to an embodiment may control and manage network equipment (e.g., switches, routers, etc.) for network sections inside and outside the data center, and may configure a network to enable communication between the VNFs or communication between the VNF and the base station. The SDN 330 may be controlled so as to transmit, to the E2E-O 300, the status of network equipment and information thereon in each section, and so as to configure a network for communication of the elements or configure items to be applied to the network equipment, among network slice policies, when configuring network slices by the E2E-O 300.

Figure 4A:
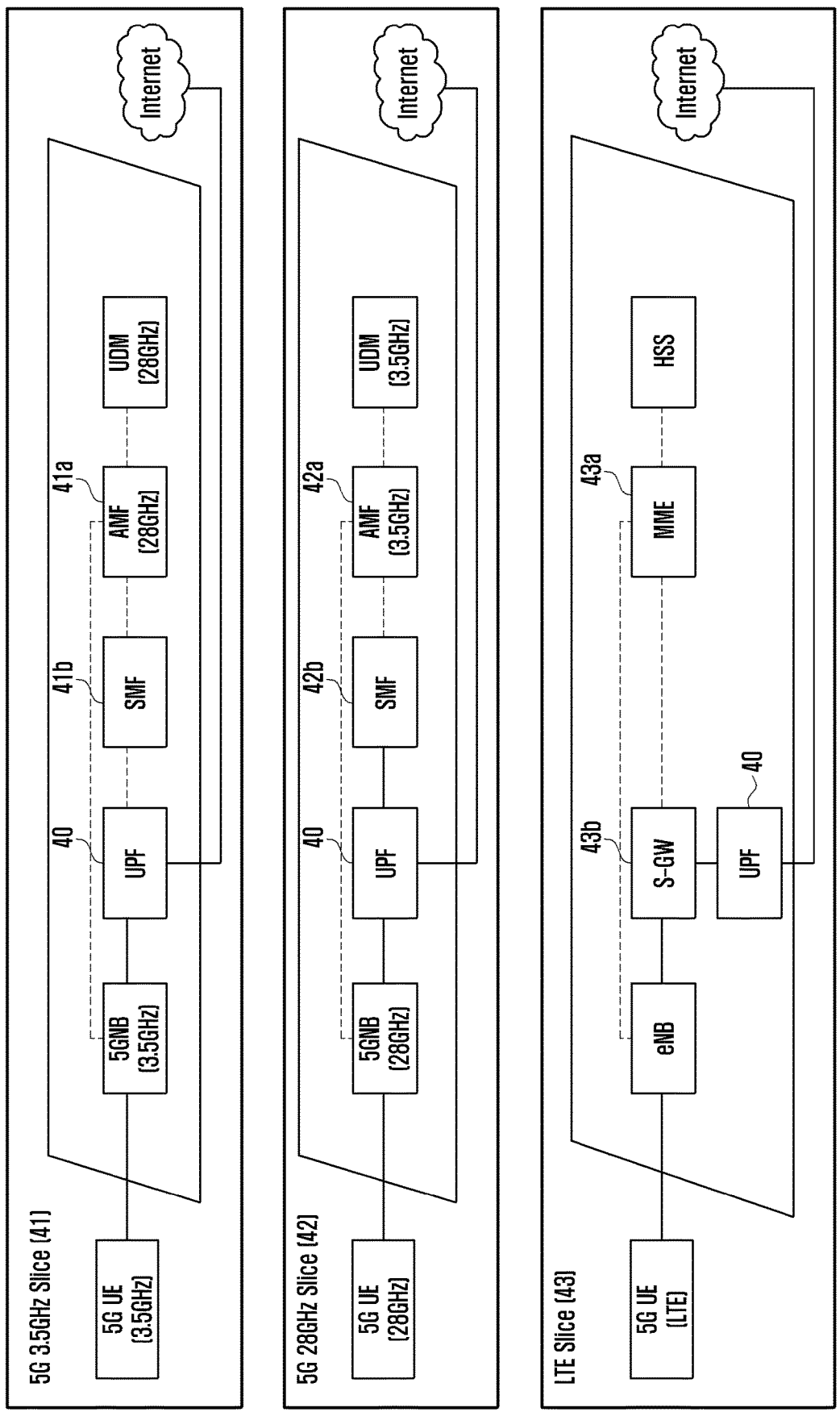
FIG. 4A is a diagram illustrating the structures of network slices configured for respective RATs in a system for controlling an end-to-end service section according to an embodiment of the disclosure.
Figure 4B:
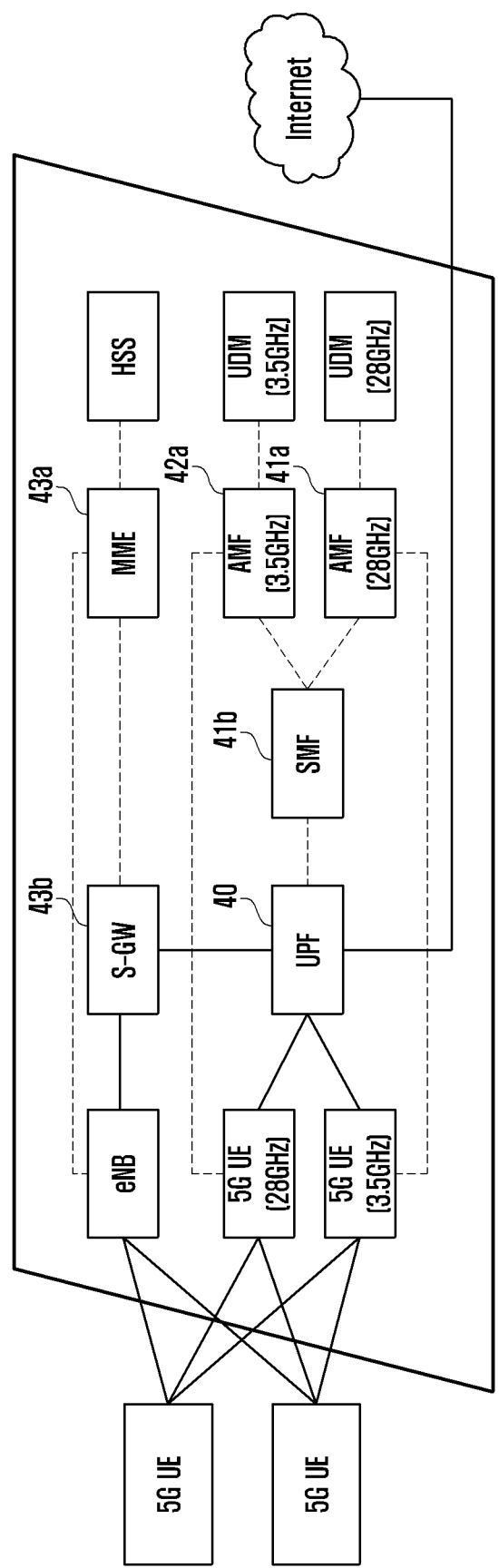
FIG. 4B is a diagram illustrating the structures of network slices configured for respective RATs in a system for controlling an end-to-end service section according to an embodiment of the disclosure.

FIGS. 4A and 4B are diagrams illustrating the structures of network slices configured for respective RATs in a system for controlling an end-to-end service section, according to various embodiments of the disclosure.

FIGS. 4A and 4B illustrate the structures of network slices applied to a system for controlling an end-to-end service section described above with reference to FIGS. 2 and 3. The disclosure proposes the structure of a network slice that can be operated separately for each RAT.

Referring to FIG. 4A, three network slices may be configured in an embodiment. For example, a first slice 41 and a second slice 42, which are network slices according to 5G communication, and a third slice 43, which is a network slice according to LTE communication, may be configured. Here, three network slices may be configured by the network slice manager in the E2E-O described above with reference to FIGS. 2 and 3.

A terminal may communicate with the Internet (data network) using the first to third slices. For example, the terminal may perform wireless communication with a 5G base station 5GNB included in the first slice 41 and the second slice 42, and a packet according thereto may perform communication with the Internet through a user plane function (UPF) entity 40, a session management function (SMF) entity 41b or 42b, and an access and mobility management function (AMF) entity 41a or 42a.

Unlike the prior art in which network slices are divided by specific services, the network slices according to an embodiment of the disclosure may be divided by radio frequency bands. For example, the first slice 41 in FIG. 4A may be a network slice configured for communication in a 3.5 GHz frequency band, and the second slice 42 may be a network slice configured for communication in a 28 GHz frequency band.

In addition, the terminal performs wireless communication with a base station included in the third slice 43, and a packet according thereto is transmitted/received to/from the Internet through a serving gateway (S-GW) 43b. Although not shown in the drawing, uplink and downlink traffic is transmitted between the S-GW 43b and the Internet through a packet data network (PDN) gateway (P-GW). The mobility management entity (MME) 43a performs management such as production, modification, and release of an EPS bearer, which is a GTP tunnel (a logical tunnel produced in a UE-eNB-SGW-PGW section) as a path between the terminal and the Internet, and a home subscriber server (HSS) plays the role of providing information such that the MME is able to perform authentication or access management on a corresponding terminal.

Meanwhile, the S-GW 43b included in the network slice for LTE communication according to an embodiment may support a network slice function for LTE communication because a packet transmission path for LTE communication is formed through a connection with the UPF 40.

For clarity, referring to FIG. 4B illustrating a connection relationship of the network slices described above, three network slices may be configured in a single terminal, and more specifically, two 5G network slices and one LTE network slice may be configured. In an embodiment, although two network slices formed according to 5G communication use an SMF 41b in common, the SMF may be configured for each network slice.

As shown in FIG. 4B, even if the terminal performs communication through different base stations, traffic transmitted and received through each base station may be transmitted to the Internet through a single UPF 40. That is, since traffic transmission paths for both the network slice for LTE communication and the network slices for different frequency bands in 5G communication are configured through a common UPF 40, it is possible to set and apply appropriate policies to the traffic paths configured for respective terminals and respective network slices.

The network slices described with reference to FIGS. 4A and 4B may be configured for respective RATs and respective frequency bands. In the case where a plurality of network slices is configured for a single terminal, the system may be operated such that all of the configured network slices support specific services used by the terminal.

Figure 5A:
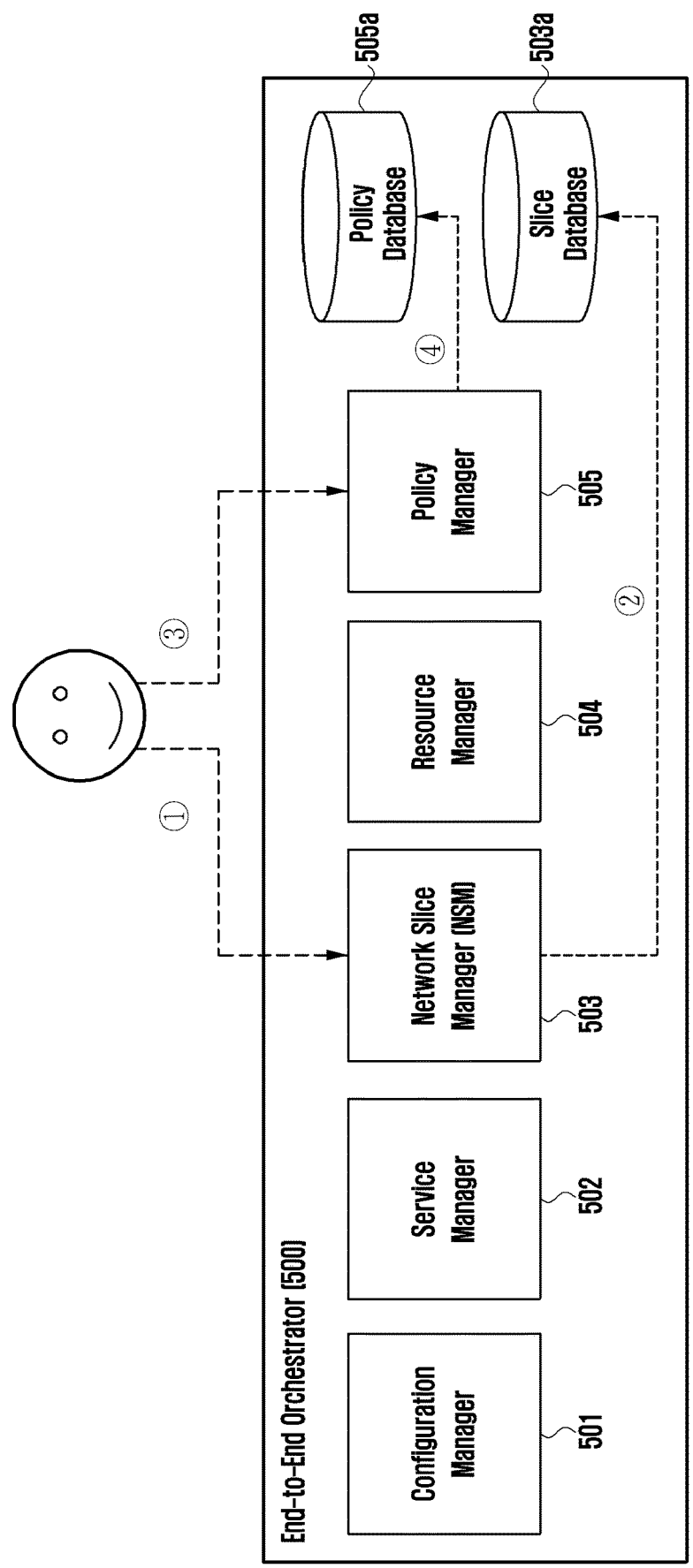
FIG. 5A is a diagram illustrating the configuration of an E2E orchestrator (E2E-O) for managing an end-to-end service section according to an embodiment of the disclosure.

FIG. 5A is a diagram illustrating the configuration of an E2E-O for managing an end-to-end service section according to an embodiment of the disclosure.

FIGS. 5B and 5C are diagrams illustrating an example of data for managing a policy and a slice in the system according to FIG. 5A, according to various embodiments of the disclosure.

Figure 6:
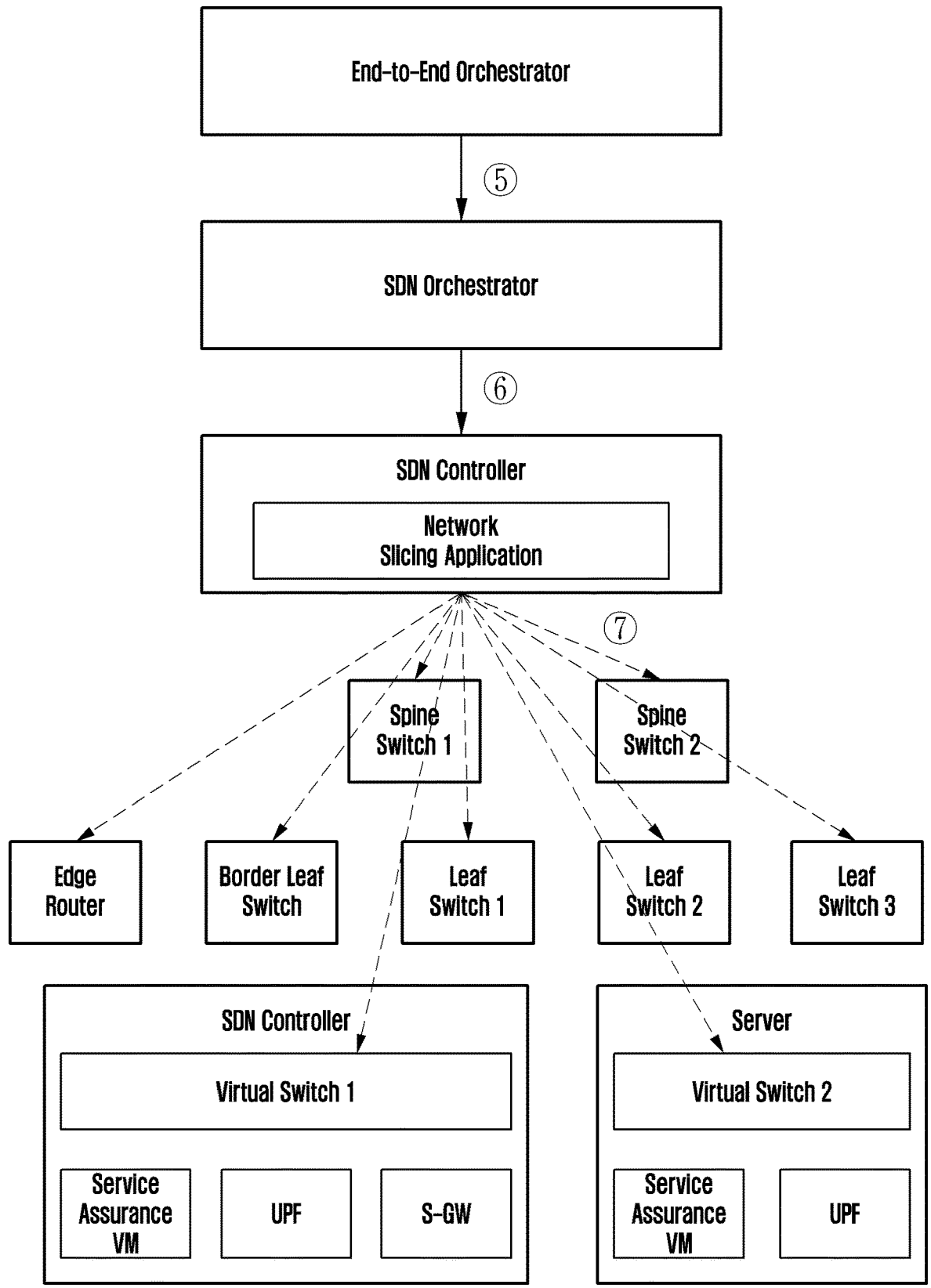
FIG. 6 is a diagram illustrating a flow in which an SDN is controlled by an E2E-O according to an embodiment of the disclosure.

FIG. 6 is a diagram illustrating a flow in which an SDN is controlled by an E2E-O according to an embodiment of the disclosure.

Referring to FIG. 5A, an E2E-O 500 according to an embodiment may include a configuration manager 501, a service manager 502, a network slice manager 503, a resource manager 504, and a policy manager 505.

The configuration manager 501 applies configuration to respective elements (e.g., a base station, a VNF, etc.) or obtains the applied configuration, and the service manager 502 is applied to a network slice and performs a function of configuring or managing services to be provided to the terminal. The network slice manager 503 produces or configures network slices, based on a predetermined rule (e.g., according to a predetermined operation rule of the E2E-O, a request or input of an operator, or the like) (see ① in FIG. 5A), and manages or deletes the same.

In addition, the policy manager 505 sets and manages policies to be applied to the network slices configured by the network slice manager 503 or the overall network (see ③ in FIG. 5A). The resource manager 504 manages resources of all elements (e.g., server usage rate, network usage rate, etc.) in the end-to-end service section.

In particular, the E2E-O 500 according to an embodiment may include a slice database (DB) 503a for configuration and management of network slices for respective RATs.

Referring to FIG. 5B, the slice DB 503a, may include, for example, identification information of configured network slices, the type of network of each network slice (the type of RAT, frequency band information, etc.), identification information of a base station included in each network slice (e.g., an IP address of the base station), information on the SLA to be satisfied in each network slice, and the like. The network slice manager 503 configures and controls network slices using information stored in the slice DB 503a (see ② in FIG. 5A).

In addition, the E2E-O 500 according to an embodiment may include a policy database (DB) 505a for configuring a policy for each slice or each terminal.

Referring to FIG. 5C, the policy DB 505a may include policy information related to a bearer or a signaling IP for each terminal or each network slice. Although not shown in the drawing, the policy DB 505a may further include policy information on the SLA for each terminal or each network slice. The policy manager 505 may configure and apply a corresponding policy to each slice using information stored in the policy DB 505a (see ® in FIG. 5A).

In the configuration and operation of network slices according to an embodiment, several network slices are simultaneously operated in the same physical resource, and resources to be used are distributed to respective slices according to a policy set by an operator, instead of evenly distributing and using the same resource. An example of a policy applied to each network slice for the resource distribution described above may be as follows.

Service level agreement (SLA) policies: these are policies that must be guaranteed in network slices. It is required to continuously check whether or not values set in the policy are satisfied and to control the resources.

Bandwidth (maximum traffic bandwidth that corresponding network slice can use)

Latency (latency between terminal and service that must be guaranteed in corresponding network slice)

Maximum number of terminals that can access network slices

Information such as priority of network slice and others

Terminal policies: these are policies applied to a terminal.

IP address to be used by terminal (signaling IP, bearer IP, and the like to be used for each slice)

Others

Referring to FIG. 6, if network slices are configured in an E2E-O according to an embodiment of the disclosure, and if policies thereof are set, the E2E-O performs control so as to apply the above configuration to a network through an SDN (see ⑤ in FIG. 6). That is, the network slices configured in the E2E-O and the policies set therein may be applied to an actual network through the SDN.

More specifically, information necessary for configuration of a network, among the configuration of network slices and the policies, which are configured in the E2E-O, is transmitted to an SDN orchestrator (SDNO). The SDNO produces information for network configuration of the network slices, based on the information received from the E2E-O. The information required for network configuration may be, for example, an IP address of a base station assigned to each slice, a path for traffic between a terminal and a service, and an SLA policy such as bandwidth. A more detailed example will be described later with reference to FIG. 7B.

The SDNO transfers the produced network configuration information to an SDN controller (SDNC) (see ⑥ in FIG. 6). The SDN controller performs an operation of applying the corresponding configuration to all network equipment in the traffic path, based on the received network configuration information (see ⑥ in FIG. 6). The SDN controller according to an embodiment performs an operation of applying the configuration by an internal network slicing application. For example, the network slicing application of the SDN controller may set a rate limit for guaranteeing bandwidth or a flow rule for communication in the configuration related to the traffic path of each network slice (a virtual switch, a spine switch, an edge router, etc.).

Figure 7A:
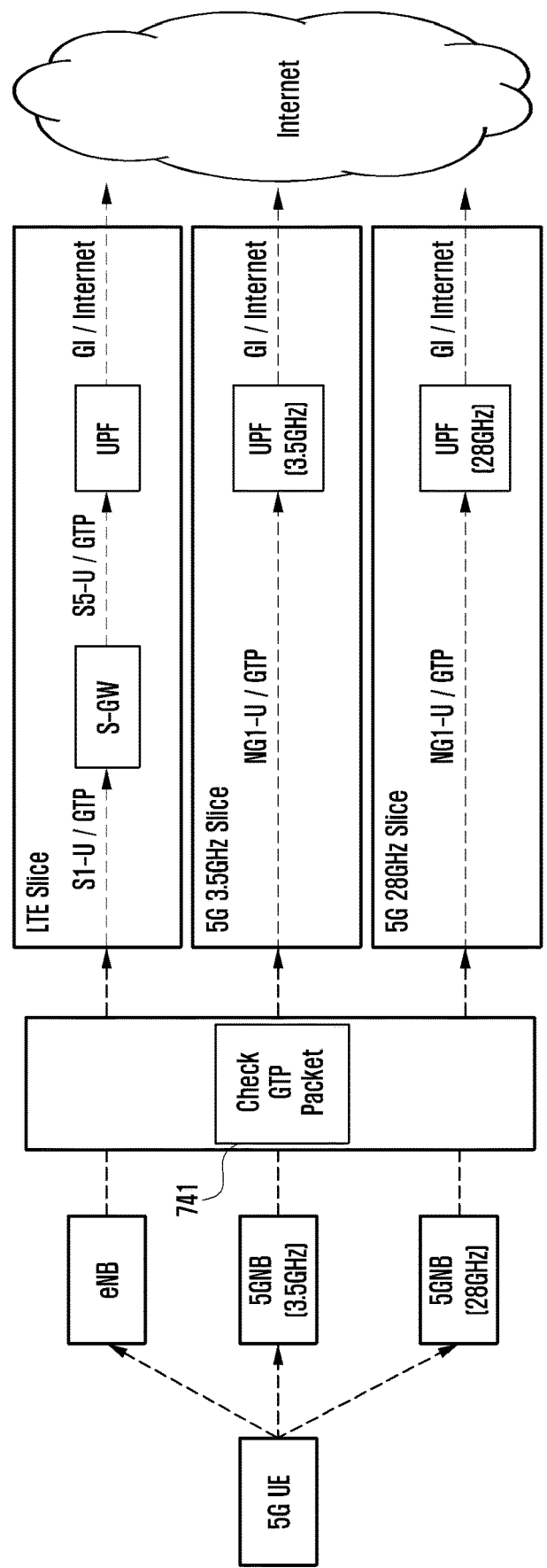
FIG. 7A is a diagram illustrating identification of a traffic path in each network slice according to an embodiment of the disclosure.

FIG. 7A is a diagram illustrating identification of a traffic path in each network slice according to an embodiment of the disclosure.

Figure 7B:
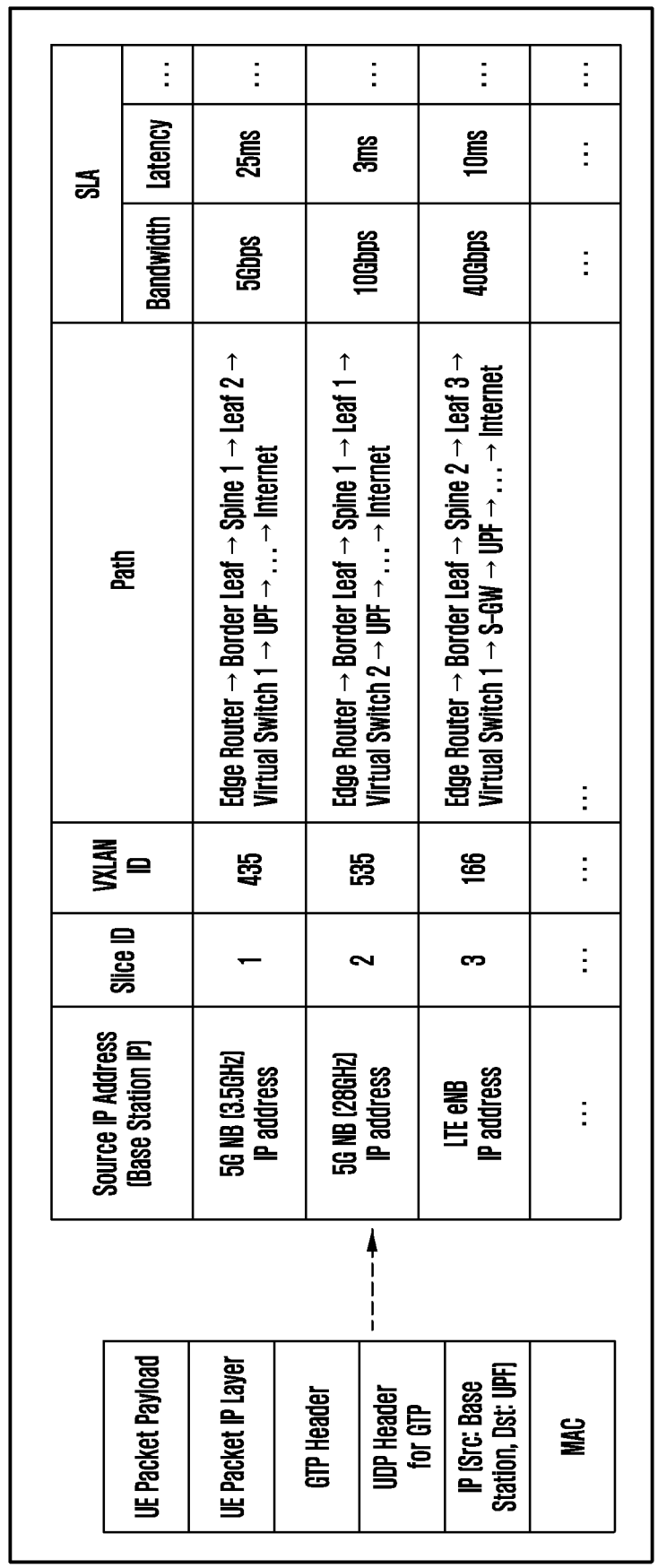
FIG. 7B is a diagram illustrating an example of a policy applied to a GTP packet according to an embodiment of the disclosure.

FIG. 7B is a diagram illustrating an example of a policy applied to a GTP packet according to FIG. 7A according to an embodiment of the disclosure.

Referring to FIG. 7A, if a plurality of network slices are configured for respective RATs according to an embodiment of the disclosure, it is possible to identify the network slice through which traffic passes according to a policy configured by the SDN by checking GTP packets for each network slice. The flow of traffic for each network slice may be distinguished by an IP address of the base station allocated to each network slice.

More specifically, data traffic (bearer traffic) of a terminal may pass through a GTP tunnel section between a base station and a UPF for processing bearer traffic using one of 5G Core VNFs or an S-GW for processing bearer traffic of LTE. That is, data traffic of the terminal is transmitted through S1-U/GTP and NG1-U/GTP sections shown in FIG. 7A. At this time, the IP header of the GTP packet corresponding to the data traffic of the terminal includes an IP address of a base station. The SDN may check the IP address of the base station in the IP header of the GTP packet to identify the network slice to which each piece of data traffic belongs.

In addition, after identifying the network slice for each piece of data traffic, the SDN may set a configuration for checking the GTP packet such that the path of the data traffic is controlled according to a predetermined policy. For example, in the case where the policy applied to the network slices configured in FIG. 7A is the same as that shown in FIG. 7B, for example, if it is determined that the GTP packet is a slice corresponding to a 3.5 GHz frequency band, the GTP packet checker 741 may identify data path for the corresponding slice (according to FIG. 7B, edge router-→border leaf→spine 1→leaf 2→virtual switch 1→UPF→. . . →Internet), and may perform control such that the GTP packet is transmitted and processed through the corresponding path.

Meanwhile, Referring to FIG. 7B, it can be seen that the IP address of the base station is set to the source IP address. If the policy setting is identified as a source IP address as shown in FIG. 7B, the setting is applied to uplink traffic, and if the policy setting is identified as a destination IP address, the setting is applied to downlink traffic.

Hereinafter, an operation of the SDN for identifying and controlling the path of traffic by applying a set policy to the uplink traffic and the downlink traffic, respectively, will be described in more detail.

Figure 8:
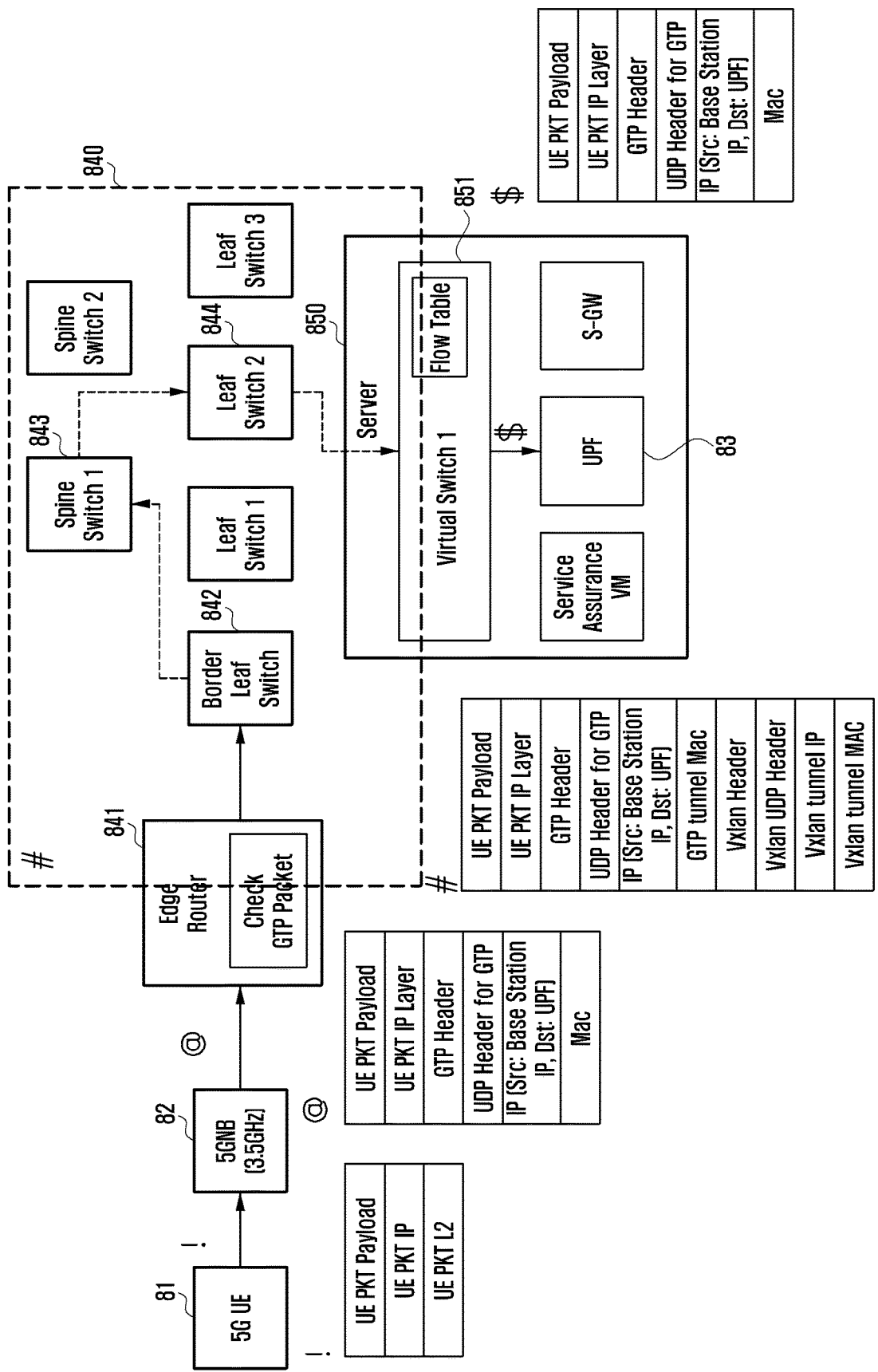
FIG. 8 is a diagram illustrating a procedure of processing data traffic of a terminal according an embodiment of the disclosure.

FIG. 8 is a diagram illustrating a procedure of processing data traffic of a terminal according to an embodiment of the disclosure.

Figure 9:
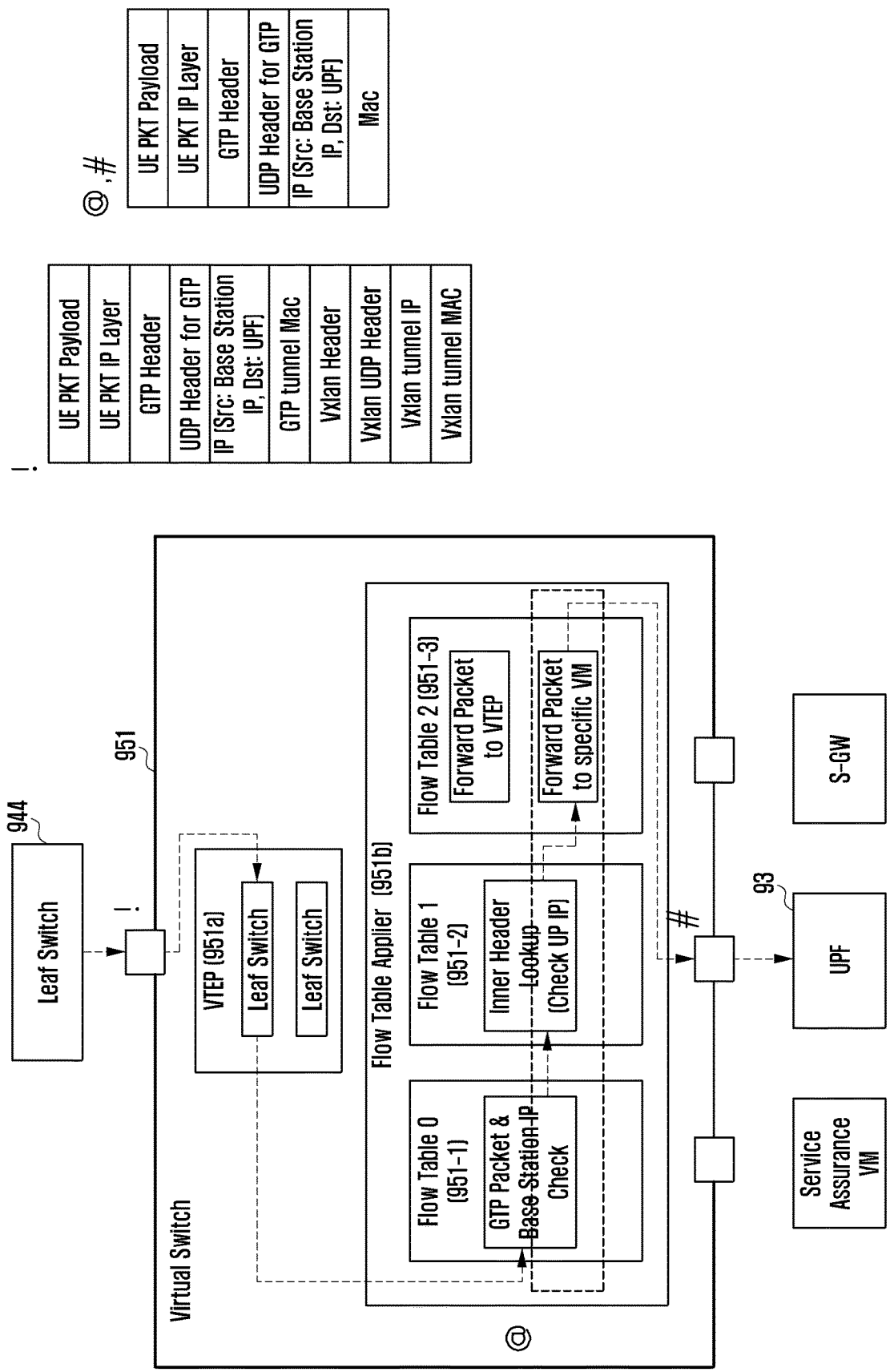
FIG. 9 is a diagram illustrating a transmission path of an uplink packet transmitted to a UPF VM inside a virtual switch according to an embodiment of the disclosure.

FIG. 9 is a diagram illustrating a transmission path of an uplink packet transmitted to a UPF VM inside a virtual switch according to an embodiment of the disclosure.

Figure 10:
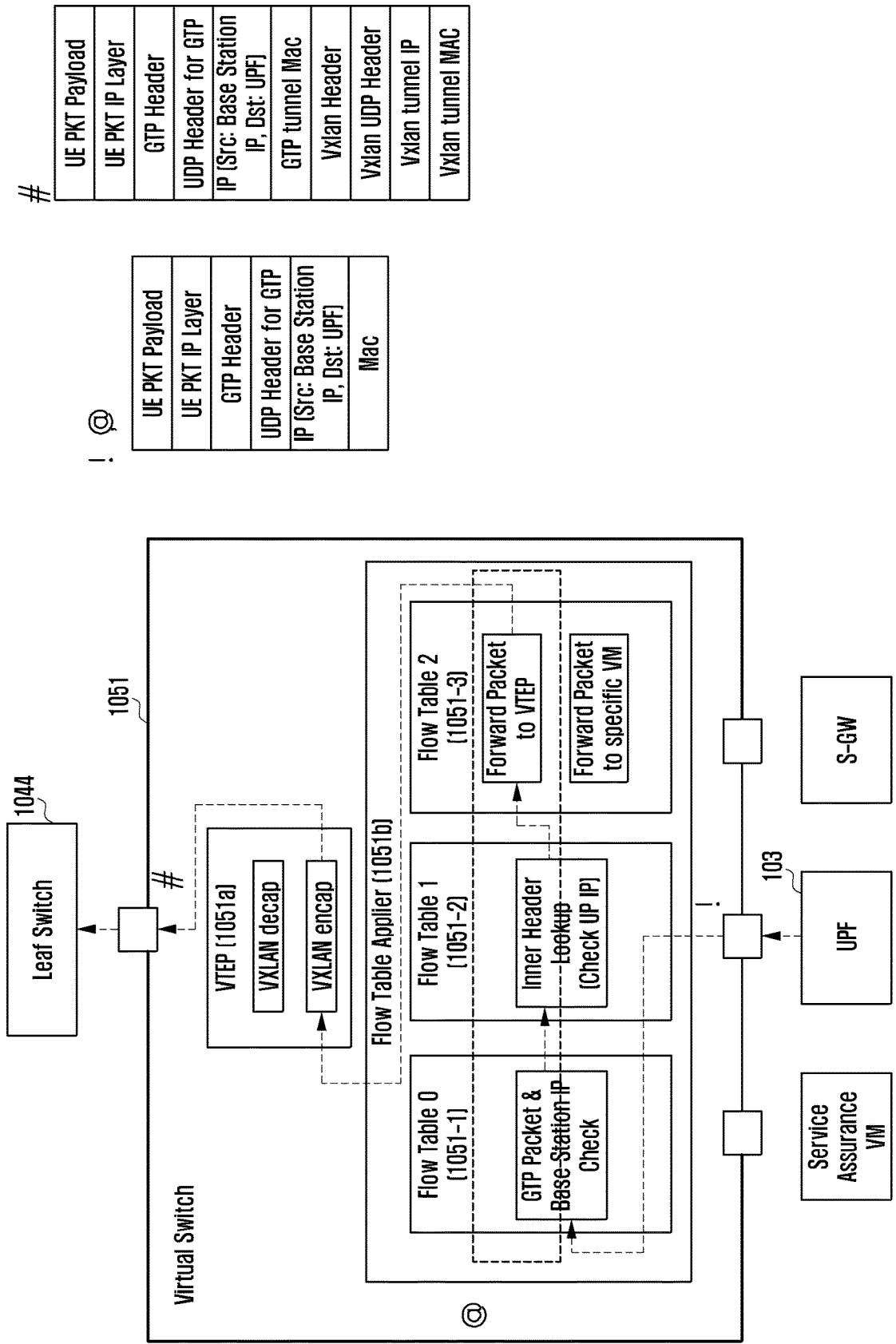
FIG. 10 is a diagram illustrating a transmission path of a downlink packet transmitted through a virtual switch in a UPF VM according to an embodiment of the disclosure.

FIG. 10 is a diagram illustrating a transmission path of a downlink packet transmitted through a virtual switch in a UPF VM according to an embodiment of the disclosure.

FIG. 11A is a diagram illustrating an example of a flow table used to process a packet inside a virtual switch according to an embodiment of the disclosure.

FIG. 12 is a diagram illustrating an example of a flow table used to process a packet inside a virtual switch according to an embodiment of the disclosure.

FIG. 13 is a diagram illustrating an example of a flow table used to process a packet inside a virtual switch according to an embodiment of the disclosure.

Figure 11B:
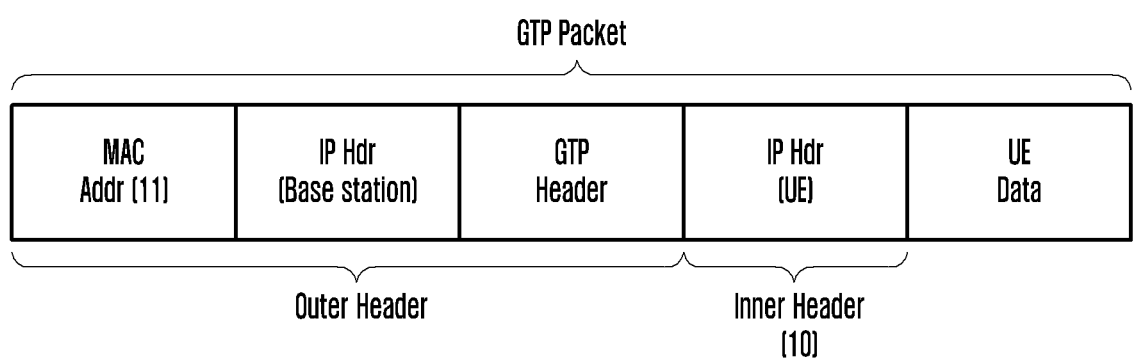
FIG. 11B is a diagram illustrating the structure of a GTP packet to which a flow table is applied according to an embodiment of the disclosure.

FIG. 11B is a diagram illustrating the structure of a GTP packet to which a flow table is applied according to an embodiment.

According to an embodiment, after all the settings are completed in the SDN, a packet for a specific network slice may be transmitted in an end-to-end service section. First, the transmission of an uplink packet will be described.

Referring to FIG. 8, a packet may be transmitted from a terminal 81 to a base station 82 included in a specific network slice. The packet transmitted between the terminal 81 and the base station 82 may be a packet ① including an IP address of the terminal and data of the terminal in the simplest form. Such a packet is transmitted from the base station 82 to a GTP tunnel section, and is then transmitted in the form of a GTP packet ② to an UPF 83 provided in a data center. At this time, the GTP packet is transmitted to the UPF 83 through a path 840 according to a policy set in a specific network slice via a plurality of switches and a server.

More specifically, the GTP packet transmitted to the GTP tunnel may pass through an edge router 841. The edge router 841 according to an embodiment may identify a GTP packet in order to transmit the GTP packet according to the policy set by the SDN, may identify the IP address of a base station from the header of the GTP packet, and may determine a transmission path and a destination UPF of the packet. In addition, the edge router 841 according to an embodiment may change the GTP packet into a VXLAN packet form (③) by adding a VXLAN-related header to the GTP packet so that the packet is transmitted to the UPF VM in the section inside the data center. However, the operation of changing the GTP packet to the form of a VXLAN packet may be performed by the border leaf switch 842 according to an operator's policy.

Subsequently, the packet changed into the VXLAN form reaches a virtual switch 851 of a server 850 in which a destination UPF VM exists through the border leaf switch 842, a spine switch 843, a leaf switch 844, and the like, based on the path 840 according to the identified policy.

The packet reaching the virtual switch 851 is transmitted to the UPF VM through a flow table inside the virtual switch. This will be described with reference to FIG. 9.

Referring to FIG. 9, the packet from a leaf switch 944 reaching a virtual switch 951 is processed in a virtual switch 951 so as to be transmitted to the UPF VM as shown in FIG. 9.

More specifically, the packet ① entering the virtual switch 951 includes a VXLAN header, and the header is removed while passing through a virtual port called a "virtual tunnel end point (VTEP)" 951a so that the packet is changed to a GTP packet form (②). Thereafter, the GTP packet is input to a flow table applier 951b and passes through respective flow tables set in the flow table applier 951b such that a flow rule corresponding to each table is applied thereto. In the disclosure, the case in which traffic is processed using three flow tables in the virtual switch 951 is illustrated.

For example, a first flow table (table 0) 951-1 checks an IP address of a base station of the GTP packet and identifies the network slice to which the packet belongs. In addition, a second flow table (table 1) 951-2 checks an IP address of a terminal of the GTP packet and identifies the terminal to which the packet traffic belongs. In the disclosure, a specific function is added to the virtual switch 951 for the operation of the second flow table, which will be described later with reference to FIGS. 11 and 12. Further, a third flow table (table 2) 951-3 checks a MAC address of the GTP packet and determines the UPF VM 93 to which the packet is to be transmitted.

If the network slice and the terminal to which each packet belongs and the UPF VM 93 to which the packet is to be transmitted are determined by applying the respective flow tables to the packet as described above, the GTP packet ③ is finally transmitted to a virtual port connected to the determined UPF VM 93. Thereafter, the packet is received by the UPF VM 93.

In the above example, the processing of an uplink packet has been described. Now, an example of a downlink packet will be described with reference to FIG. 10.

Referring to FIG. 10, a UPF 103 inputs, into a virtual switch 1051, a packet to be transmitted to a specific terminal through a specific network slice. The packet input from the UPF 103 to the virtual switch 1051 is in the form of a GTP packet ①. The GTP packet is input to a flow table applier 1051b of a virtual switch 1051 and passes through respective flow tables set therein such that a flow rule corresponding to each table is applied thereto.

For example, a first flow table (table 0) 1051-1 checks the IP address of the base station of the GTP packet ② and identifies the network slice to which the packet belongs. In addition, a second flow table (table 1) 1051-2 checks the IP address of the terminal of the GTP packet and identifies the terminal to which the packet belongs. Further, a third flow table (table 2) 1051-3 checks the MAC address of the GTP packet and transmits the same to a virtual tunnel end point (VTEP) 1051a so that a VXLAN header for transmitting the packet is added thereto.

The packet transmitted to the virtual tunnel end point (VTEP) 1051a as described above is changed into a VXLAN packet form ③ and is transmitted to a leaf switch 1044 so as to be transmitted to the terminal through a base station. Thereafter, as shown in FIG. 8, the packet is transmitted to the terminal through a base station of a specific network slice for the packet via a leaf switch, a spine switch, an edge router, and the like.

The above-described flow tables in the virtual switch will be described in more detail. Referring to FIGS. 11A, 12, and 13, a plurality of flow tables is configured and numbered from "0", and the respective flow tables include flow rules for processing packets. The flow rule is configured to be applied to all packets passing through the virtual switch. The flow rules may be produced through the process described with reference to FIG. 6 above.

Flow rules according to the drawings roughly include "match", "instruction", and "counter". "Match" is a field indicating the form of a packet to which a flow rule is applied, "instruction" is a field indicating an operation to be applied to a matching packet, and "counter" is a field in which the cumulative sum of the number of matching packets and the size of the packet is stored and is then collected to be used in a passive monitoring process.

Referring to FIG. 11A, FIG. 11A corresponds to flow table 0, which is a first table for checking a packet when the packet enters a virtual switch. Flow table 0 may be used to identify the IP address of a base station and identify the network slice of traffic. The table in FIG. 11A illustrates an example of flow rules for processing traffic in FIG. 8, among flow rules of flow table 0. If the packet matches the flow rule, the packet is processed as specified in the instruction and is passed to apply flow table 1, and then a flow rule check process is performed again.

In the instruction in FIG. 11A, "OFPTA_INNER_IPLKUP" is an operation newly added to the virtual switch in order to check an IP address of a terminal in an IP header 10 inside the GTP packet, as shown in FIG. 11B, according to an embodiment. After the corresponding operation is performed, when the IP header is used in a match process of the flow table, the inner IP header (the header 10 including the IP address of the terminal) is checked.

FIG. 12 is a diagram illustrating flow table 1 according to an embodiment, which shows an example of a flow rule for checking an IP address of a terminal in an IP header inside a GTP packet (an inner IP header) and identifying the network slice and the terminal from which the traffic originates. Since the packet transmitted after flow table 0 is applied according to an embodiment has been processed with the "OFPTA_INNER_IPLKUP" operation, the IP header of a match field in flow table 1 in FIG. 12 refers to the inner header 10 in FIG. 11B. If the packet matches the flow rule, the packet goes to flow table 2 as specified in the instruction, and then a flow rule check process is performed again.

Referring to FIG. 13, it illustrates flow table 2 according to an embodiment, which shows an example of a flow rule for determining the VM to which the packet is finally transmitted or whether or not to transmit the packet to the outside of the server. After checking the MAC address 11 of the packet shown in FIG. 11B according to an embodiment, if there is a flow rule that matches the packet in flow table 2, an operation corresponding to the instruction of the matching rule is performed. In the example shown in the drawing, the packet is transmitted to the UPF VM or the outside of the server according to the operation of the corresponding instruction.

Hereinafter, an operation of monitoring a network slice according to an embodiment will be described with reference to the accompanying drawings. In an embodiment, active monitoring and passive monitoring will be described as monitoring schemes.

Active monitoring is a method in which a measurement device produces a specific packet called a "test packet" and transmits the same to a measurement target, and receives a packet sent back by the measurement target in response thereto, thereby measuring the network quality of the section between a transmitting device and a receiving device. Examples of this method includes test protocols, such as ping and TWAMP, and the packet form produced for the test differs between respective test protocols. In order to measure quality using the active monitoring scheme, a device for producing and transmitting a test packet is required, and a test protocol of the applied scheme must be able to operate in the transmitting/receiving device.

Passive monitoring is a method of collecting packets transmitted and received through a network path without further producing and transmitting/receiving a specific packet, such as a test packet in the active monitoring, and checking the current network state. Since passive monitoring does not use a test packet, no additional device for measurement is required. However, a method for collecting transmitted and received packets and a method for obtaining state information of a network from the collected packets are required to be defined.

Figure 14:
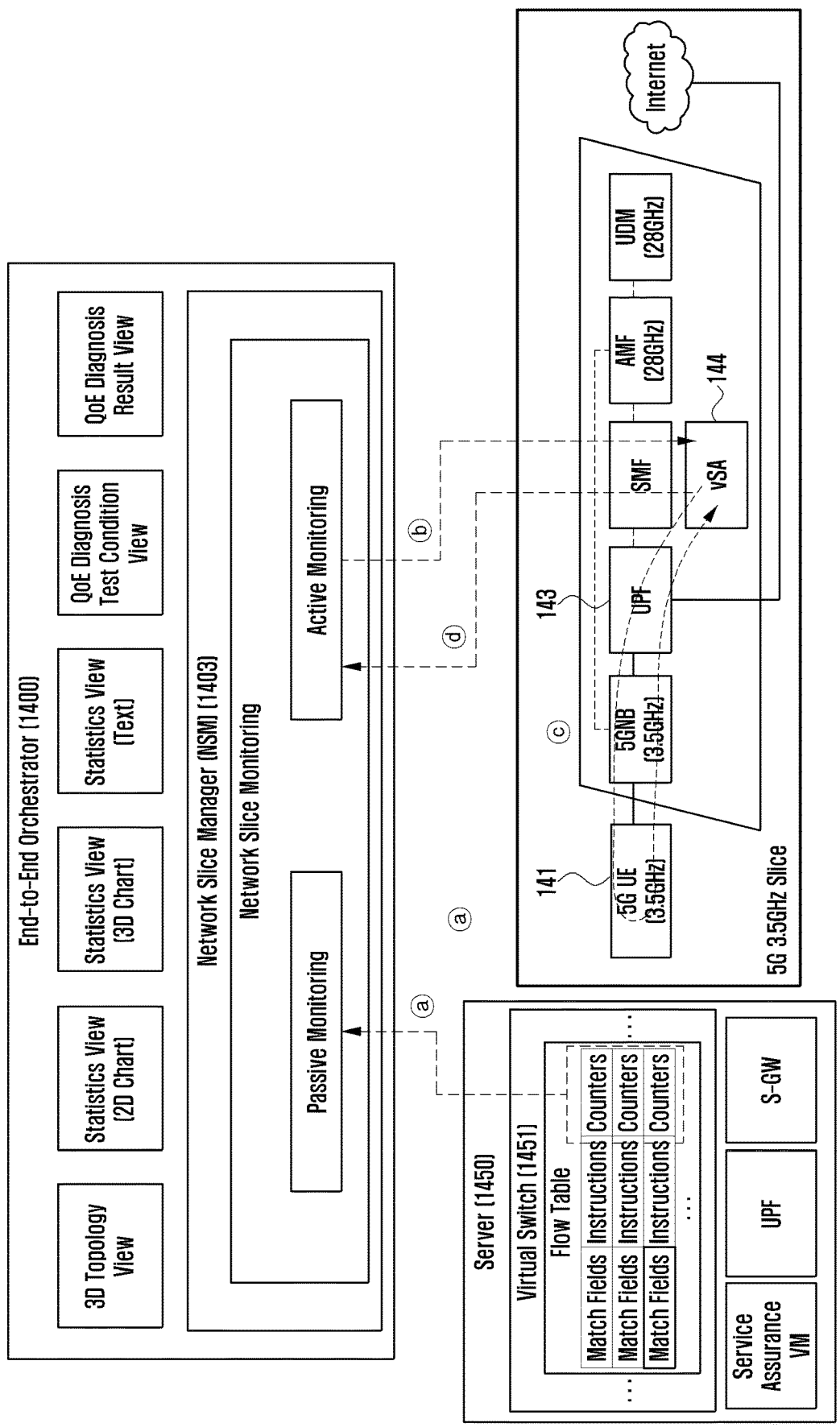
FIG. 14 is a diagram illustrating a monitoring scheme according to an embodiment of the disclosure.

FIG. 14 is a diagram illustrating a monitoring scheme according to an embodiment of the disclosure.

Referring to FIG. 14, for the active monitoring scheme proposed by the disclosure, a system according to an embodiment may include a vSA 144, as a virtual machine (VM), for producing a test packet for each network slice and transmitting/receiving the same to/from a measurement target device. As shown in the drawing, the vSA 144 is connected to the rear end of a UPF 143 and produces a test packet to be transmitted to the measurement target device using a test protocol. For example, in the case where the measurement target device is a terminal 141, the terminal 141 may be configured to operate a test protocol therein.

More specifically, active monitoring according to an embodiment is triggered by an operator in an E2E-O 1400, the operator selects a virtualized service assurance (vSA) 144 provided for each network slice (for example, a virtual machine including a test protocol and the like for performing the active monitoring scheme may correspond thereto) and the terminal 141 to be measured, and initiates measurement. If a request message according to the measurement initiation is transmitted from the E2E-O 1400 to the vSA 144 through an SDN (not shown), the measurement requested by the E2E-O 1400 is executed (ⓑ). In this case, a process of setting a flow rule to be applied to a path through which a test packet for measurement is transmitted may be further performed.

Meanwhile, the vSA 144, upon receiving the message requesting measurement initiation, transmits a test packet to the measurement target terminal 141 and receives a packet from the measurement target terminal 141 in response thereto, thereby performing measurement of network quality (ⓒ). As described above, if a measurement result is collected, the vSA 144 may transmit the measurement result to the E2E-O 1400 through the SDN (not shown) (ⓓ).

The measurement result may be obtained by a network slice manager 1403 of the E2E-O 1400 and may be visualized in any of various forms, such as charts, using other elements (e.g., 3D topology view, statistics view-2D, 3D, text, QoE diagnosis test condition view, and QoE diagnosis result view) included in the E2E-O 1400, so that the operator is able to identify the same.

Since the monitoring operation is able to be performed for each network slice, it is possible to measure the quality of the network for each network slice. Therefore, it is possible to manage and control whether or not the SLA policy (e.g., latency or the like) is guaranteed for each network slice. In addition, since the measurement target is a terminal, it is possible to check the quality of a network including a radio section between the terminal and the base station. The collected results as described above may be used for closed loop control later.

The passive monitoring scheme proposed by the disclosure may be performed by monitoring the traffic passing through the UPF 143 according to an embodiment. More specifically, all traffic used by the terminal may be checked in the virtual switch 1451 in server 1450 in which the UPF VM exists, and the value of a counter field of the flow table may be periodically collected. The traffic of each network slice may be monitored (ⓐ), based on the counter field values collected as described above.

Unlike the active monitoring, the passive monitoring operation may be performed periodically even without an operator's request, and information on traffic usage for each terminal and each network slice may be obtained by analyzing the collected counter field values by the SDN. The information analyzed by the SDN as described above may be transmitted to the E2E-O 1400, and may be visualized as, for example, charts through various elements included in the E2E-O 1400, so that the operator may identify the same. The collected results as described above may be used for closed loop control later.

FIGS. 15 to 17C are diagrams illustrating at a glance the flow of monitoring described above with reference to FIG. 14 in a system according to various embodiments of the disclosure. Hereinafter, the description is the same as that made with reference to FIG. 14, and thus will be omitted.

Figure 15:
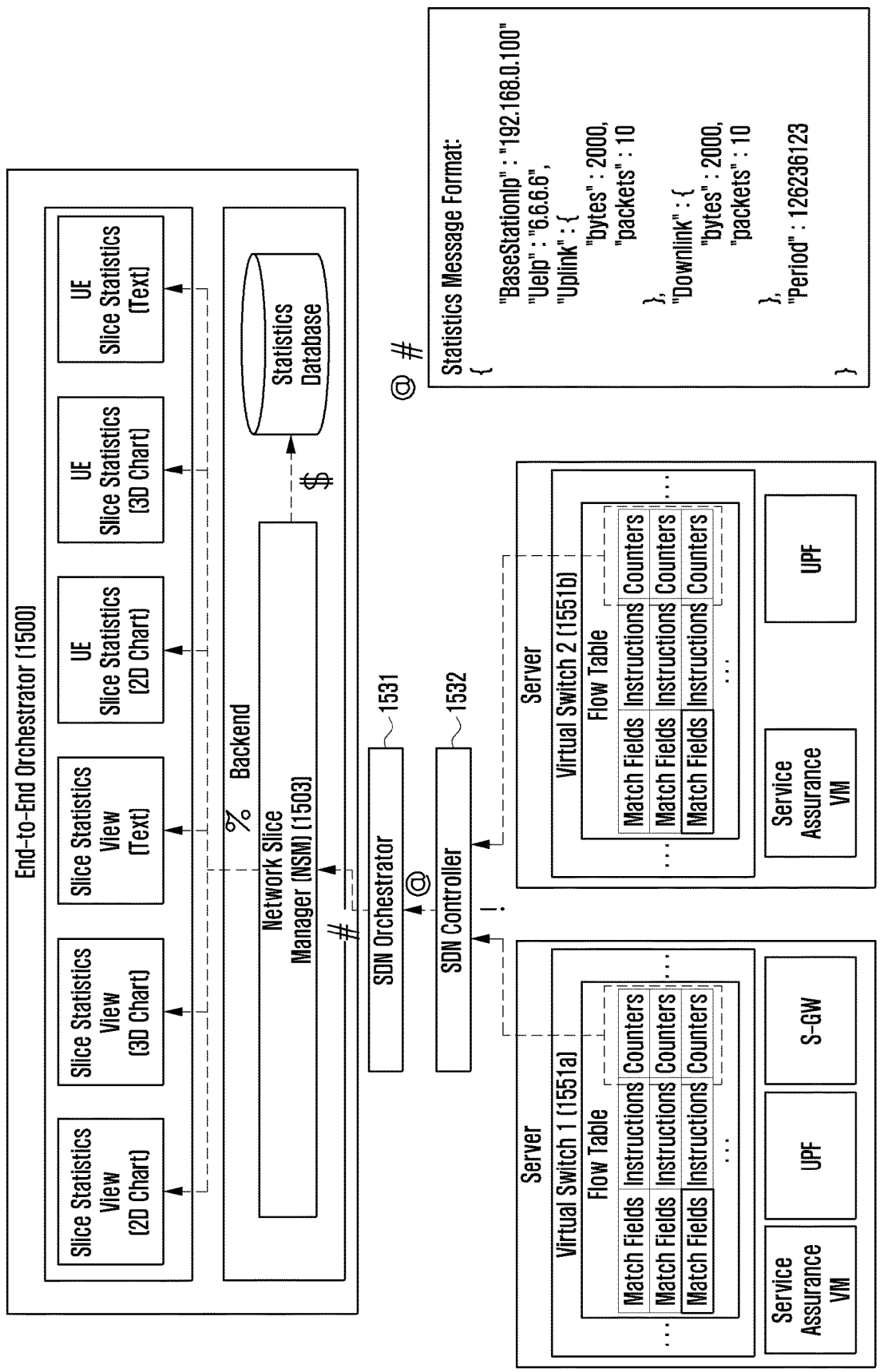
FIG. 15 is a diagram illustrating a flow of passive monitoring of a packet for each network slice according to an embodiment of the disclosure.

FIG. 15 is a diagram illustrating the flow of passive monitoring of a packet for each network slice according to an embodiment of the disclosure.

Referring to FIG. 15, as described above with reference to FIG. 14, the virtual switch located in the path of all packets transmitted to and received from a terminal may collect cumulative values, such as the number of packets, the size of the packet, or the like, through a counter field value of a flow table applied to all packets. For example, virtual switch 1 (1551*a*) may collect information about packets transmitted and received in a network slice configured for LTE communication, and virtual switch 2 (1551*b*) may collect information about packets transmitted and received in a network slice configured for one frequency band in 5G communication.

The information on the packets collected through the counter field value of each flow table may be collected and analyzed by an SDN controller 1532 and an SDN orchestrator 1531, and result information thereof may be transmitted to a network slice manager 1503 in an E2E-O 1500. As shown in FIG. 15, the SDN controller 1532 may analyze the collected information, may produce a specific statistical message format, and may then transmit the same to the E2E-O 1500 through the SDN orchestrator 1531. The transmitted information may be stored in a statistics DB through the network slice manager 1503. Thereafter, the information may be visualized through various elements included in the E2E-O 1500, and may then be provided to the operator.

Figure 16:
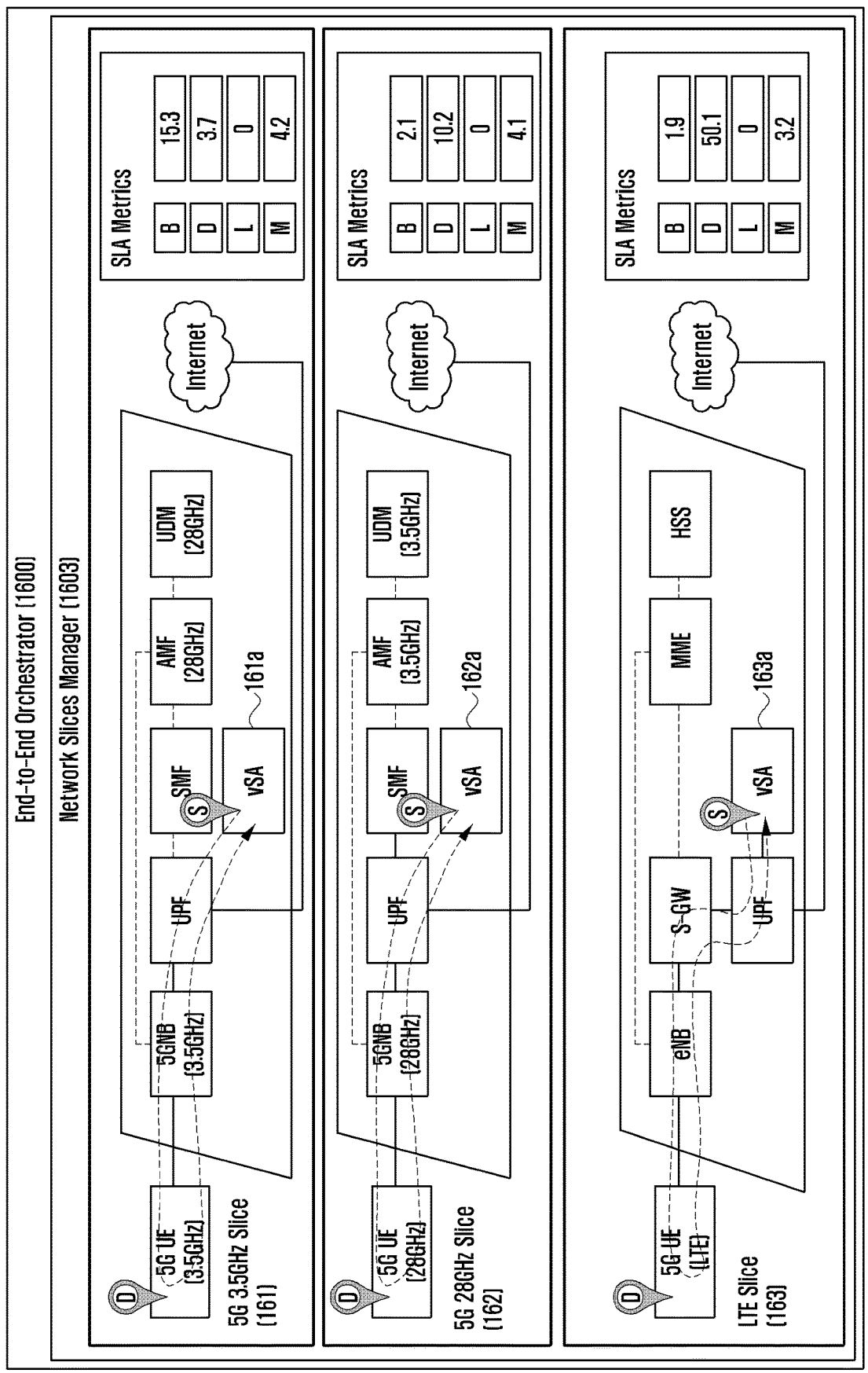
FIG. 16 is a diagram illustrating an example of active monitoring of a packet for each network slice according to an embodiment of the disclosure.

FIG. 16 is a diagram illustrating an example of active monitoring of a packet for each network slice according to an embodiment of the disclosure.

Referring to FIG. 16, three network slices 161, 162, and 163 are configured for a single terminal, and active monitoring is performed in each network slice, with result information thereof may be transmitted to a network slice manager 1600 in an E2E-O 1600. A vSA included in each network slice may produce a test packet for a measurement target terminal, may transmit the same to the terminal, and may then perform an operation of monitoring a response received from the terminal.

For example, a vSA 161a of a first network slice 161 may produce a test packet, and may monitor the transmission and reception of a packet in a transmission path having the vSA 161a as a source and a terminal as a destination, thereby measuring the quality of a network. Similarly, a vSA 162a of a second network slice 162 may produce a test packet, and may monitor the transmission and reception of a packet in a transmission path having the vSA 162a as a source and a terminal as a destination. A vSA 163a of a third network slice 163 may produce a test packet, and may monitor the transmission and reception of a packet in a transmission path having the vSA 163a as a source and a terminal as a destination.

Based on the monitoring result for each network slice as described above, it is possible to check whether or not each network slice satisfies SLA conditions. For example, if bandwidth (B), delay (D), latency (L), and mean opinion score (MOS) are configured as SLA conditions, it is possible to check whether or not the SLA conditions are satisfied using the monitoring result for each network slice.

Figure 17A:
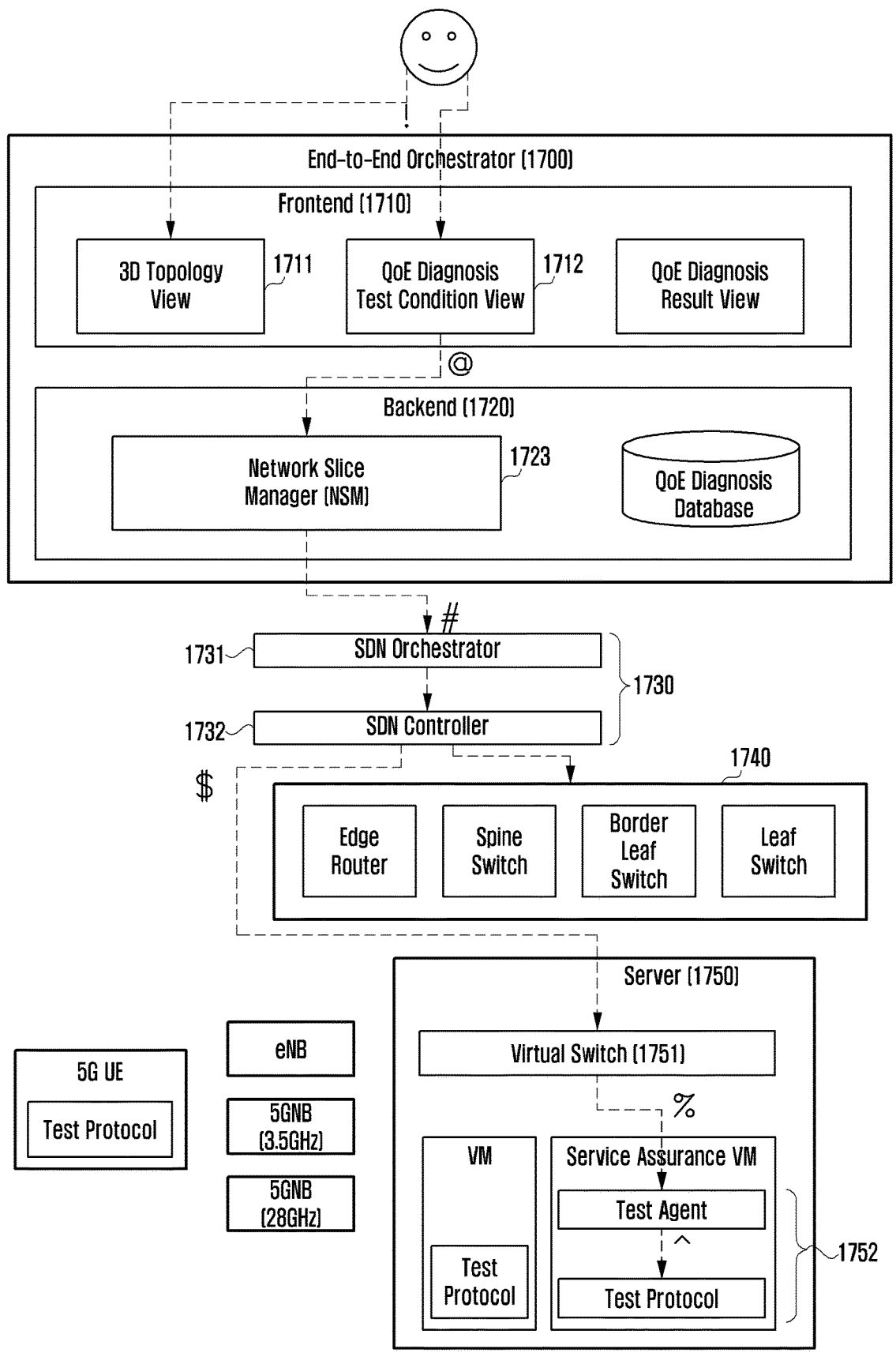
FIG. 17A is a diagram illustrating a flow of the overall operation of active monitoring according to an embodiment of the disclosure.

FIG. 17A is a diagram illustrating the flow of the overall operation of active monitoring according to an embodiment of the disclosure.

Figure 17B:
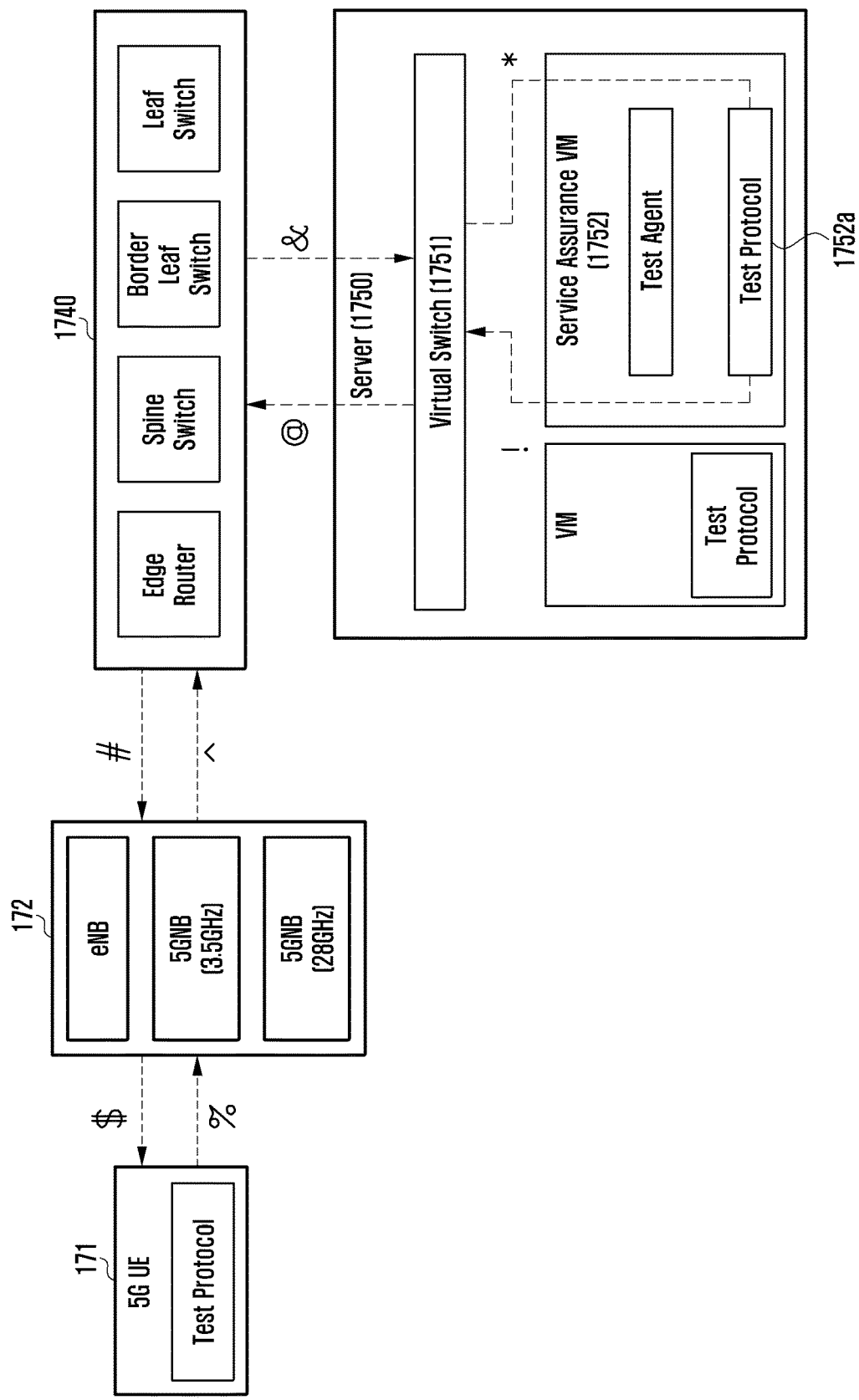
FIG. 17B is a diagram illustrating a flow of the overall operation of active monitoring according to an embodiment of the disclosure.

FIG. 17B is a diagram illustrating the flow of the overall operation of active monitoring according to an embodiment of the disclosure.

Figure 17C:
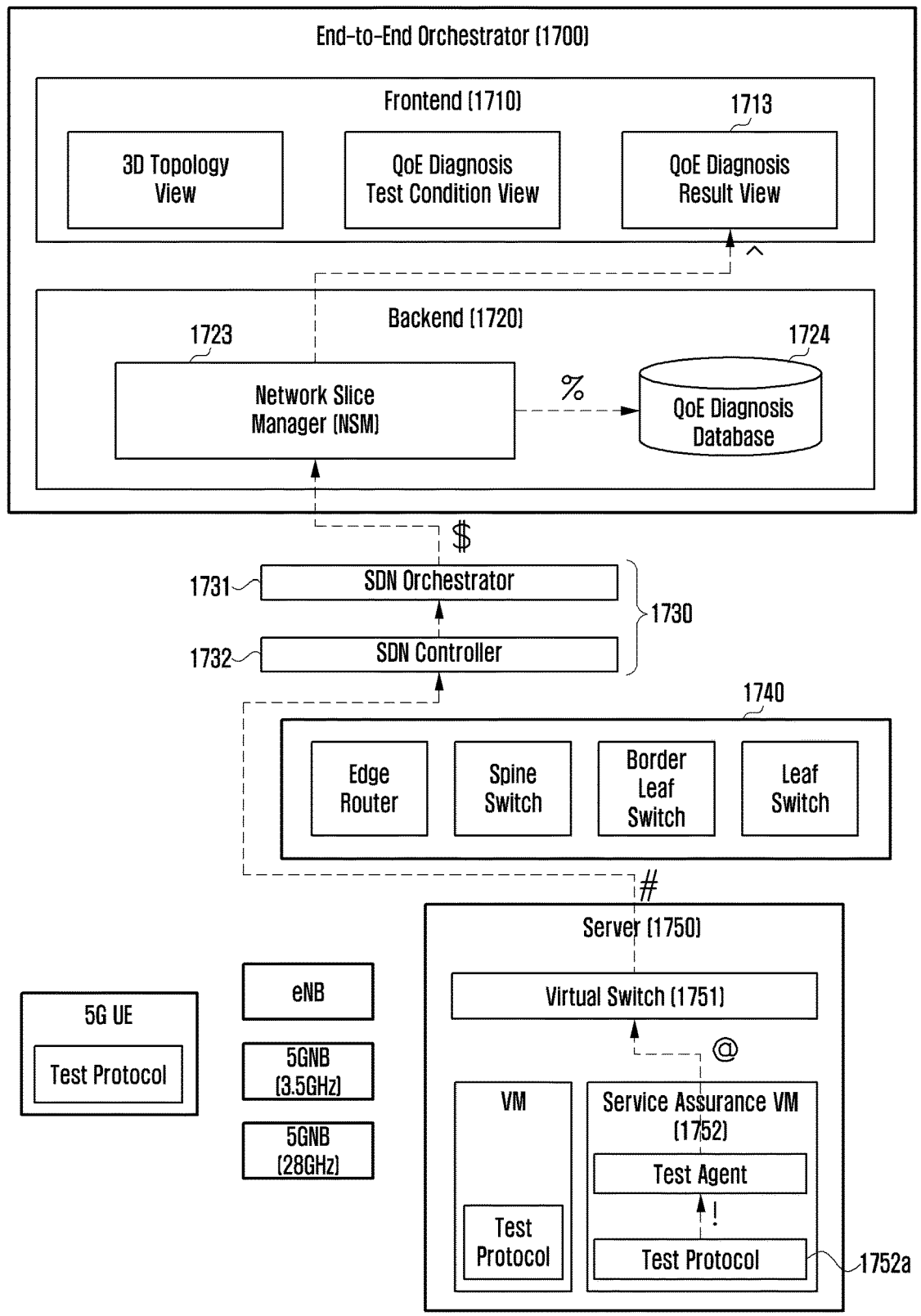
FIG. 17C is a diagram illustrating a flow of the overall operation of active monitoring according to an embodiment of the disclosure.

FIG. 17C is a diagram illustrating the flow of the overall operation of active monitoring according to an embodiment of the disclosure.

Referring to FIG. 17A, according to an embodiment, an operator may trigger an active monitoring operation using an E2E-O 1700 that performs a function of managing and controlling an end-to-end network. For example, as shown in FIG. 17A, the E2E-O 1700 may include a frontend 1710 that receives an operator's input and provides visual information to the operator and a backend 1720 that transfers the operator's input and processes information to be provided to the operator.

For example, the operator may transmit an input ① for generating a signal for triggering an active monitoring operation through the configuration of a 3D topology view 1711 or through the configuration of a QoE diagnosis test condition view 1712 in the E2E-O 1700. The input ① is transmitted to a network slice manager 1723 of the backend 1720 (②), and the network slice manager 1723 transmits a signal for requesting an active monitoring operation to the SDN 1730 (③). The request signal may be transmitted to an SDN controller 1732 through an SDN orchestrator 1731 included in the SDN 1730 according to an embodiment, and the SDN controller 1732 may control a plurality of switches 1740 so as to transmit the request signal to a server (④).

A virtual switch 1751 of the server 1750 receiving the request signal from the SDN controller 1732 may control a VM for an active monitoring operation (⑤). For example, a service assurance VM that performs a function of a test manager for producing and managing a test packet for an active monitoring operation may correspond thereto. The service assurance VM 1752 receiving the trigger signal for the active monitoring operation from the virtual switch 1751 may produce a test packet for measuring network quality using a test protocol (⑥).

Referring to FIG. 17B, the test packet produced by the test protocol 1752a as described above may be transmitted to the outside of the server 1750 through a virtual switch 1751 (①). The test packet transmitted to the outside of the server 1750 may be transmitted through network entities of the corresponding network slice by a plurality of switches 1740 (②), and, for example, the test packet may be transmitted to a base station 172 (③) to then be transmitted to the terminal 171 that uses the corresponding network slice (④).

The terminal 171 according to an embodiment may include a test protocol to receive and process the test packet. The test packet processed by the test protocol of the terminal 171 is transmitted back to the base station 172, and is input to the server 1750 (⑦) and passed through the virtual switch 1751 via a plurality of switches 1740 (⑤ and ⑥). Thereafter, the test packet may be received by the test protocol 1752a of the service assurance VM 1752 (⑧) to then be processed.

Referring to FIG. 17C, after the test packet received as a response of the terminal is processed by the test protocol 1752a of the server 1750, information thereabout is transmitted to the virtual switch 1751, and the virtual switch 1751 transmits the information to the SDN 1730 through a plurality of switches 1740 outside the server 1750. As described above, since the test packet is transmitted and received through a wireless region between the terminal and the base station, the monitoring operation according to an embodiment enables measurement of the network quality in the wireless region.

Meanwhile, the SDN controller 1732 according to an embodiment collects monitoring result information (e.g., measurement information obtained by measuring the network quality) by the test packet transmitted from the server 1750 and produces result information on the analysis thereof. The result information is transmitted to the network slice manager 1723 of the E2E-O 1700 through the SDN orchestrator 1731.

The network slice manager 1723 may process the result information received from the SDN 1730 to obtain quality information about the network slice, and may store the same in the DB 1724. The quality information about the network slice may be transmitted to the frontend 1710 to then be visualized in order to be provided to the operator. For example, the quality information about the network slice may be visualized through the element of the QoE diagnosis result view 1713 so as to allow the operator to identify whether or not the SLA is satisfied, and may then be provided to the operator.

Figure 18A:
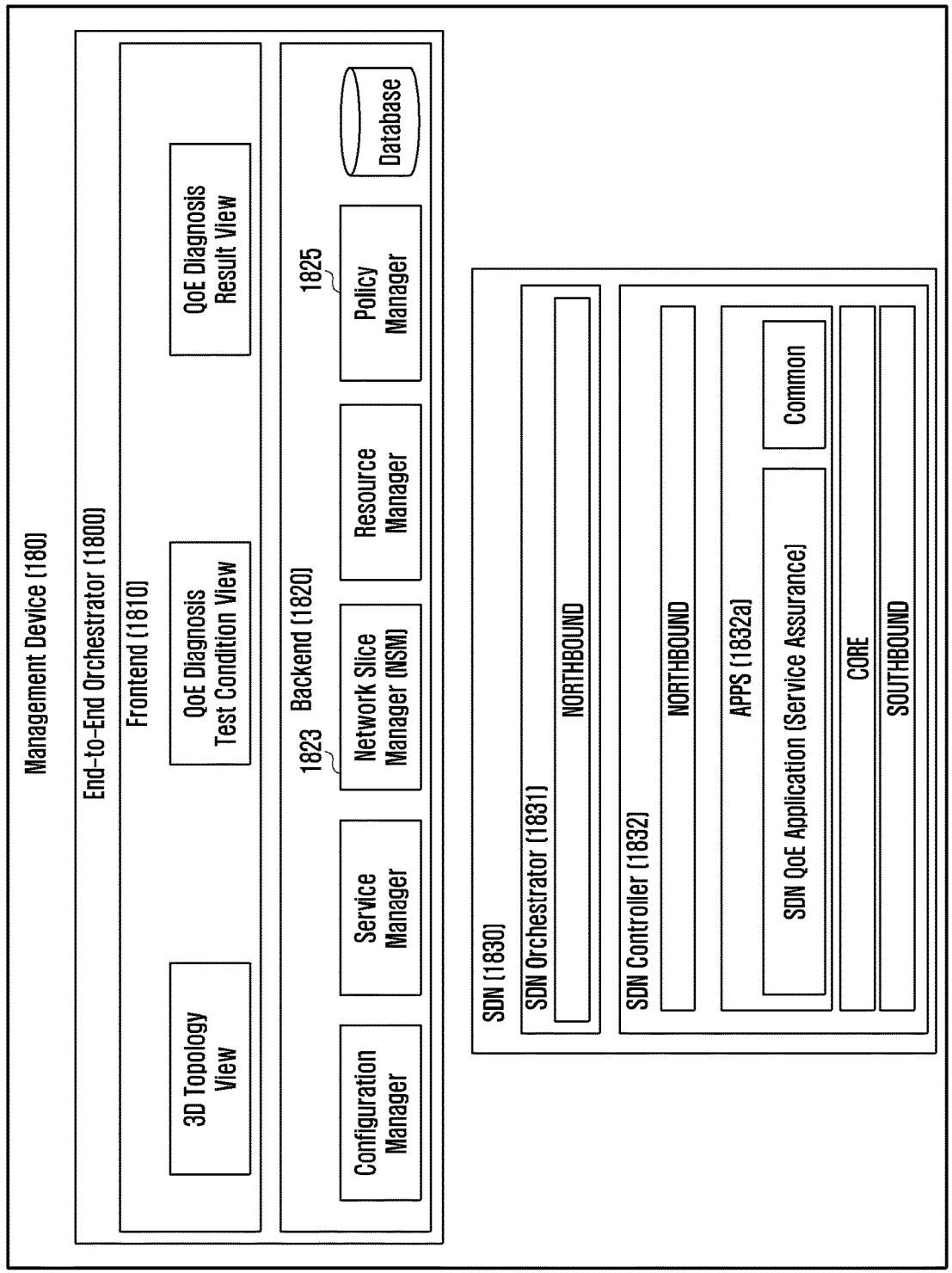
FIG. 18A is a block diagram of an overall system for performing the operation proposed in the disclosure according an embodiment of the disclosure.

FIG. 18A is a block diagram of an overall system for performing the operation proposed in the disclosure.

Figure 18B:
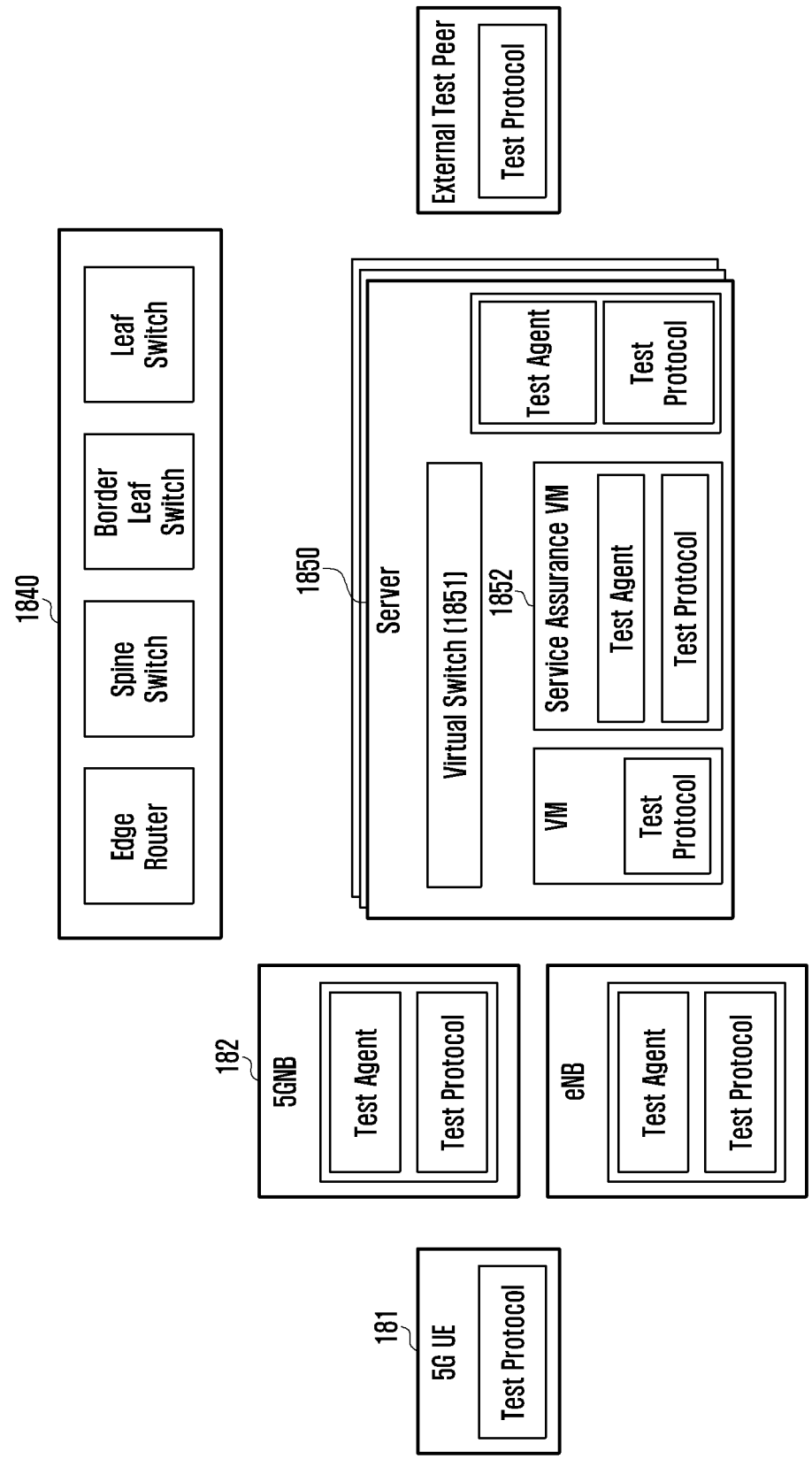
FIG. 18B is a block diagram of an overall system for performing the operation proposed according to an embodiment of the disclosure.

FIG. 18B is a block diagram of an overall system for performing the operation proposed in the disclosure.

Referring to FIG. 18A, the configuration of a management device for operating and managing an end-to-end network according to an embodiment is illustrated. The management device 180 according to an embodiment may include an E2E-O 1800 and an SDN device 1830.

According to an embodiment, the E2E-O 1800 may include a backend 1820 that includes a network slice manager 1823 for configuring network slices classified by radio access technology (RAT) (e.g., by frequency bands for LTE communication or 5G communication), a policy manager 1825 for setting a policy including SLA information that each configured network slice must satisfy, a database for storing information on the operations of the network slice manager 1823 and the policy manager 1825, and a frontend 1810 that receives input for network control from the operator and includes elements for providing the operator with information about the state of the network.

The SDN device 1830 performs operations, under the control of the E2E-O 1800, of controlling the path of traffic between a terminal and a UPF for a specific network slice according to a policy set by the E2E-O 1800, transmitting a command for measurement of network quality from the E2E-O 1800 to a server 1850 (shown in FIG. 18B), and analyzing and processing information about the result of network quality measurement. In addition, the SDN device 1830 may include an SDN orchestrator 1831 and an SDN controller 1832 in order to perform the above-described operations, and the SDN controller 1832 may include several applications 1832a for the above operations (e.g., the operations of collecting and analyzing monitoring results).

Referring to FIG. 18B, a system according to an embodiment may further include a plurality of switches 1840 and a server 1850 for transmitting traffic of a network slice configured for a terminal 181. The plurality of switches 1840 may control the path of traffic transmitted and received between the terminal 181 and the UPF, for example, under the control of the SDN device 1830 (shown in FIG. 18A).

In addition, the virtual switch 1851 of the server 1850 according to an embodiment may receive the traffic transmitted from the plurality of switches 1840, and may identify the terminal, the network slice, and the UPF for traffic by applying a flow table thereto. In addition, the virtual switch 1851 may transmit a monitoring request signal received from the SDN device 1830 to a test protocol included in a service assurance VM 1852, and may transmit measurement information obtained through an active monitoring operation to the SDN device 1830 (shown in FIG. 18A). Further, the virtual switch 1851 may transmit, to the SDN device 1830 (shown in FIG. 18A), measurement information of passive monitoring according to a counter value accumulated through the transmission and reception of traffic in the flow table according to an embodiment.

Figure 19A:
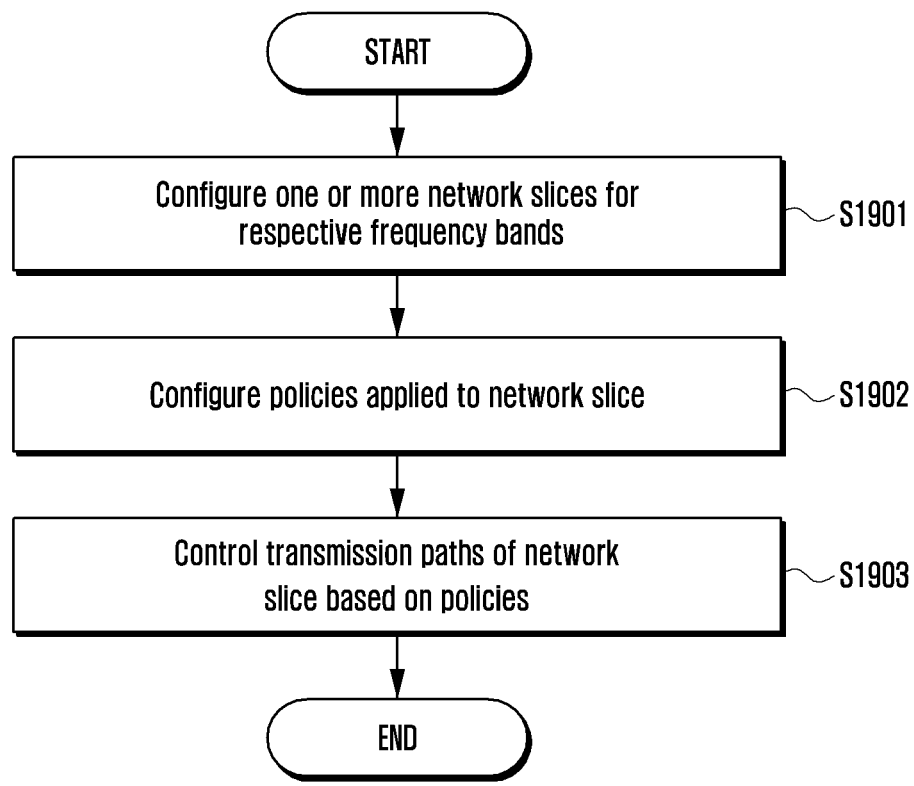
FIG. 19A is a flowchart illustrating an operation of controlling a traffic transmission path in a network slice according to an embodiment of the disclosure.

FIG. 19A is a flowchart illustrating an operation of controlling a traffic transmission path in a network slice according to an embodiment of the disclosure.

Figure 19B:
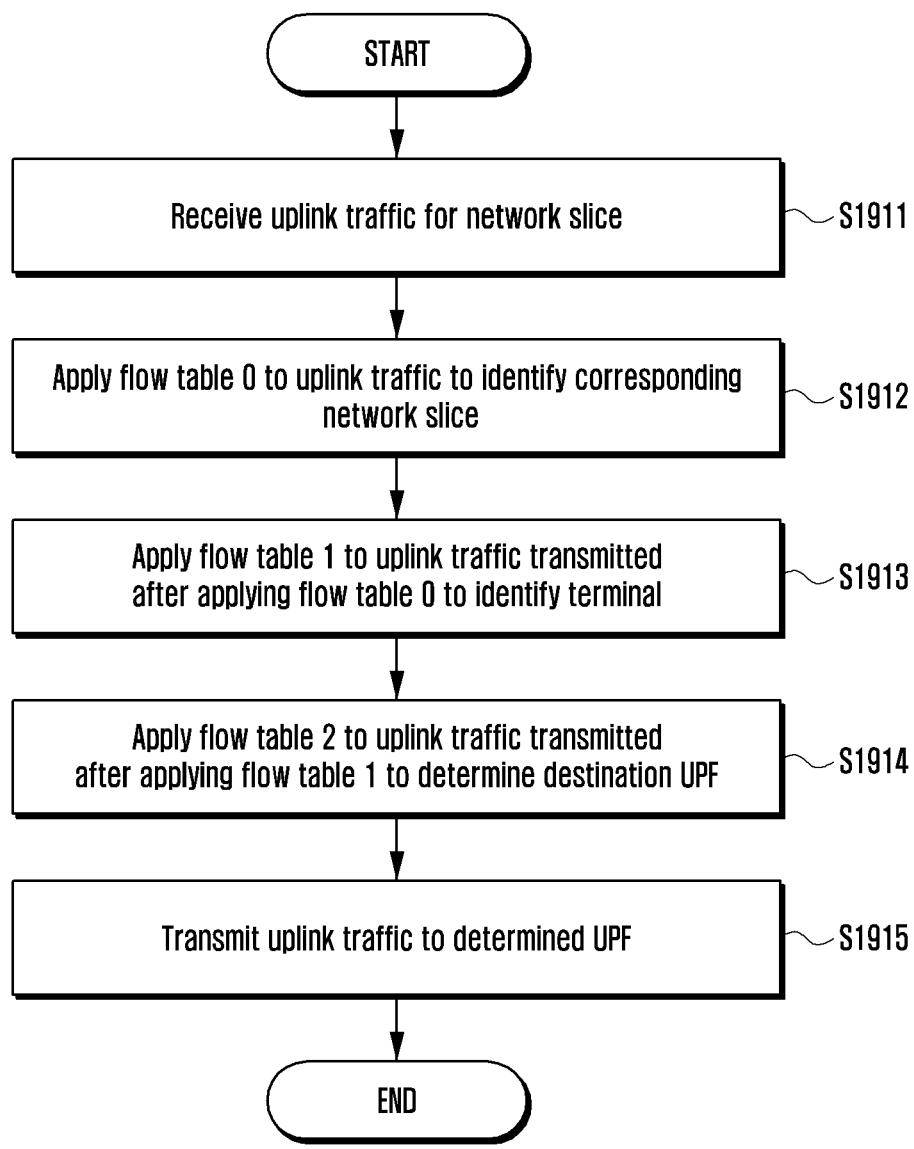
FIG. 19B is a flowchart illustrating an operation of controlling a traffic transmission path in a network slice according to an embodiment of the disclosure.

FIG. 19B is a flowchart illustrating an operation of controlling a traffic transmission path in a network slice according to an embodiment of the disclosure.

Figure 19C:
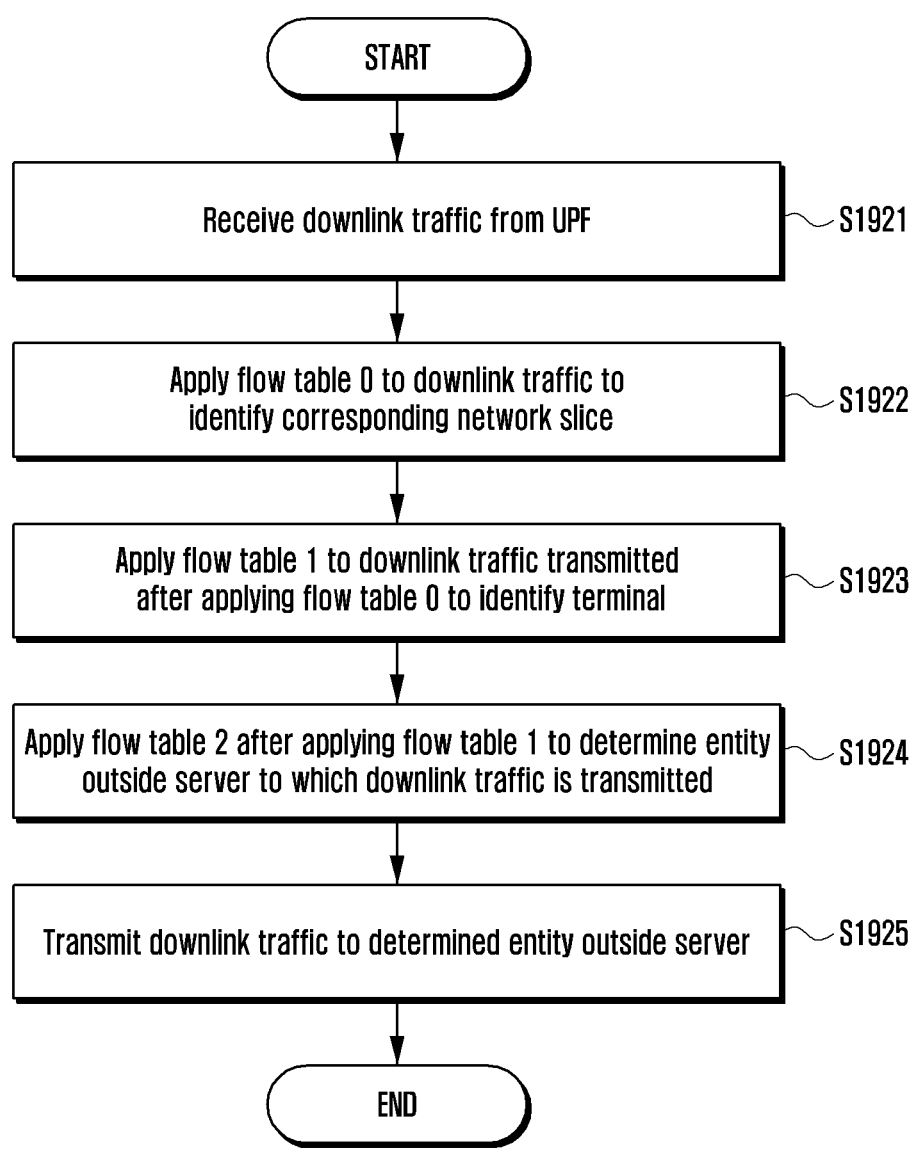
FIG. 19C is a flowchart illustrating an operation of controlling a traffic transmission path in a network slice according to an embodiment of the disclosure.

FIG. 19C is a flowchart illustrating an operation of controlling a traffic transmission path in a network slice according to an embodiment of the disclosure.

Figure 20A:
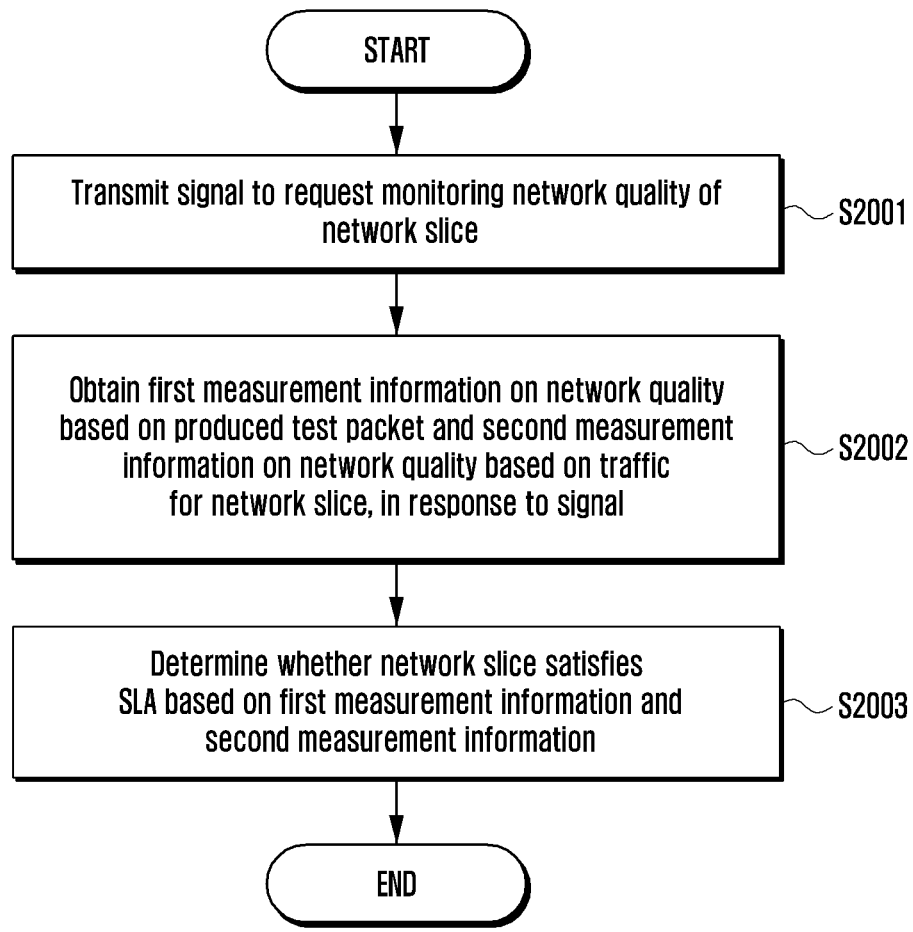
FIG. 20A is a flowchart illustrating a monitoring operation for measuring network quality according to an embodiment of the disclosure.

FIG. 20A is a flowchart illustrating a monitoring operation for measuring network quality according to an embodiment of the disclosure.

Figure 20B:
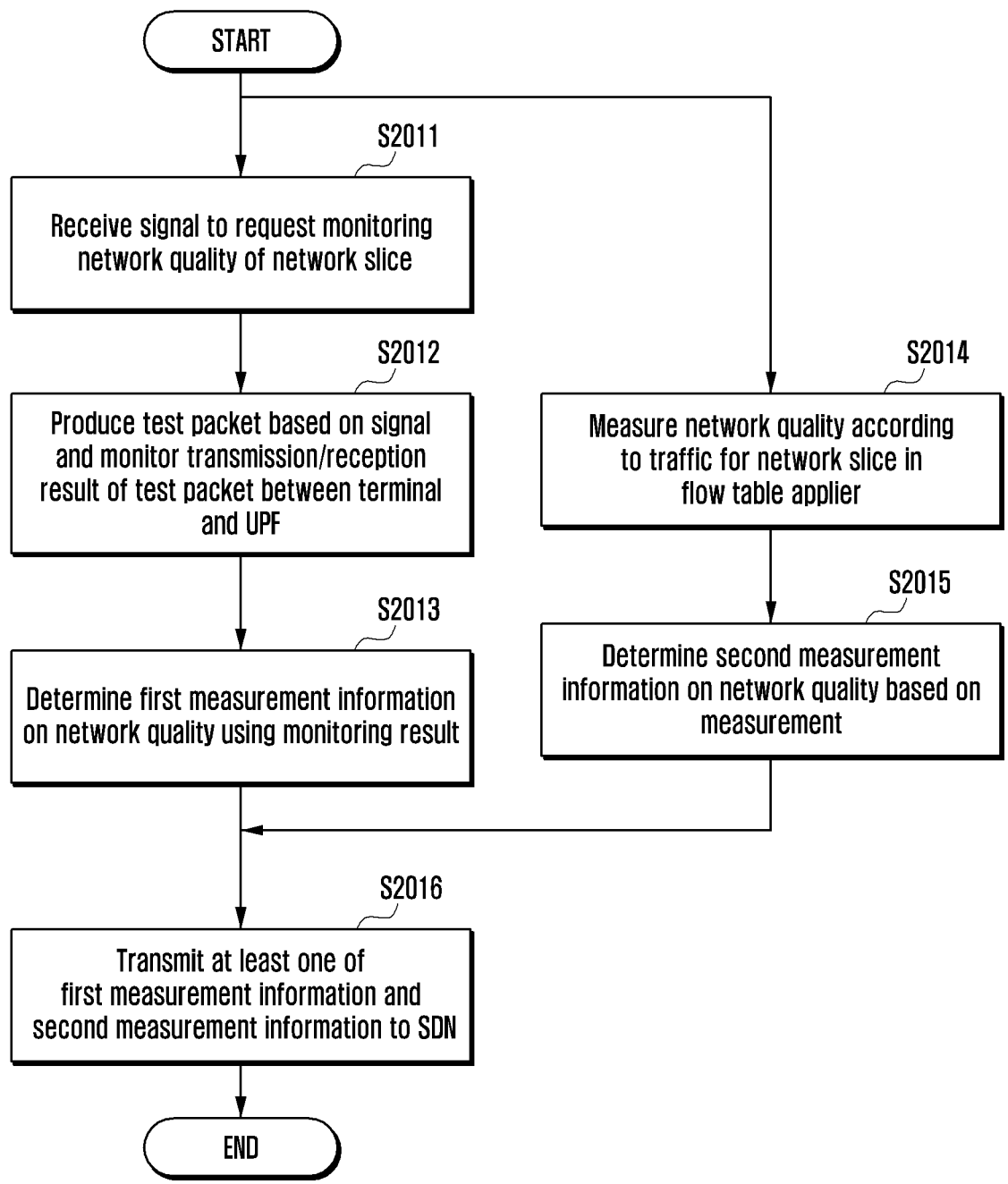
FIG. 20B is a flowchart illustrating a monitoring operation for measuring network quality according to an embodiment of the disclosure.

FIG. 20B is a flowchart illustrating a monitoring operation for measuring network quality according to an embodiment of the disclosure.

FIG. 19A illustrates a process in which a management device according to an embodiment of the disclosure controls traffic for a network slice.

Referring to FIG. 19A, the management device according to an embodiment of the disclosure may configure one or more network slices for respective RATs or respective frequency bands for a terminal at operation S1901.

In addition, the management device according to an embodiment may set a policy to be applied to each of one or more configured network slices at operation S1902. Here, the policy may include information on the transmission path of traffic for the network slice and information on the service level agreement (SLA) that the network slice must satisfy.

If the policy is set as described above, the management device according to an embodiment may control a transmission path of traffic for each network slice using an SDN device at operation S1903.

The traffic for each network slice may include uplink traffic and downlink traffic.

FIG. 19B is a diagram illustrating a process of transmitting uplink traffic to a UPF by a server according to an embodiment of the disclosure.

Referring to FIG. 19B, a server according to an embodiment of the disclosure may receive uplink traffic, which is transmitted from a terminal, for example, from a plurality of switches controlled by an SDN device at operation S1911. In addition, the server according to an embodiment may sequentially apply flow tables to the uplink traffic using a flow table applier included in a virtual switch.

More specifically, the server according to an embodiment may apply flow table 0 to the uplink traffic, thereby identifying the network slice for the received uplink traffic at operation S1912. Subsequently, the server according to an embodiment may apply flow table 1 to the uplink traffic, to which flow table 0 has been applied, thereby identifying the terminal that transmitted the uplink traffic at operation S1913. In addition, the server according to an embodiment may apply flow table 2 to the uplink traffic, to which flow table 1 has been applied, thereby determining the destination UPF to which the uplink traffic is to be transmitted at operation S1914.

If the destination UPF is determined as described above, the server according to an embodiment may perform control such that the uplink traffic is transmitted to the destination UPF included in the server at operation S1915.

Referring to FIG. 19C, a virtual switch of a server according to an embodiment of the disclosure may receive downlink traffic to be transmitted to a terminal from a UPF included in the server at operation S1921. In addition, a virtual switch of the server according to an embodiment may sequentially apply flow tables to the downlink traffic using a flow table applier.

More specifically, the server according to an embodiment may apply flow table 0 to the downlink traffic, thereby identifying the network slice for the downlink traffic to be transmitted at operation S1922. Subsequently, the server according to an embodiment may apply flow table 1 to the downlink traffic to which flow table 0 has been applied, thereby identifying the terminal to which the downlink traffic is to be transmitted at operation S1923. In addition, the server according to an embodiment may apply flow table 2 to the downlink traffic to which flow table 1 has been applied, thereby determining an entity outside the server to which the downlink traffic is to be transmitted at operation S1924.

If the external entity of the server is determined as described above, the server according to an embodiment may perform control such that the virtual switch transmits the downlink traffic to the external entity of the server at operation S1925.

FIG. 20A is a flowchart illustrating a process in which a management device according to an embodiment of the disclosure obtains monitoring information about network quality.

Referring to FIG. 20A, a management device according to an embodiment of the disclosure may transmit a signal to request monitoring network quality of a network slice to a server at operation S2001.

In response to the signal, the management device may obtain, from the server, first measurement information on the network quality based on a test packet according to active monitoring and second measurement information based on traffic transmitted and received in the network slice at operation S2002.

Although it has been described in the embodiment that the management device simultaneously obtains the first measurement information and the second measurement information, the management device may obtain the first measurement information and the second measurement information separately. For example, the first measurement information may be transmitted from the server to the management device in response to a signal from the management device for requesting active monitoring, and the second measurement information may be transmitted from the server to the management device for a predetermined period without a separate request.

The management device having obtained the first measurement information and the second measurement information according to an embodiment may determine whether or not the network slices satisfy the SLA according to a set policy, based on the first measurement information and the second measurement information at operation S2003.

According to the determination result, a closed loop control operation may be performed as described above.

FIG. 20B is a flowchart illustrating a process in which a server according to an embodiment of the disclosure transmits measurement information on network quality to a management device.

Referring to FIG. 20B, a server according to an embodiment of the disclosure may receive a signal to request monitoring the network quality of a network slice from a management device at operation S2011. The monitoring request signal corresponds to a signal requesting active monitoring.

The server having received the signal according to an embodiment may produce a test packet, based on the signal, and may monitor a result of transmission and reception of the test packet in a section between a terminal and a UPF at operation S2012. In addition, the server according to an embodiment may determine first measurement information on the network quality using the monitoring result at operation S2013.

Meanwhile, the server according to an embodiment may accumulate traffic information about the network slice according to a predetermined period, thereby performing a passive monitoring operation. That is, a flow table applier of the server according to an embodiment may measure network quality, based on traffic for the network slice at operation S2014. In addition, based on the measurement of the traffic, second measurement information on the network quality may be determined at operation S2015.

Thereafter, the server according to an embodiment may transmit, to an SDN of the management device, at least one piece of the first measurement information and the second measurement information determined as described above at operation S2016.

FIGS. 21 to 36 are diagrams illustrating user interfaces by which a device for managing an end-to-end network receives input for network management from an operator and provides network-related information according to various embodiments of the disclosure.

Figure 21:
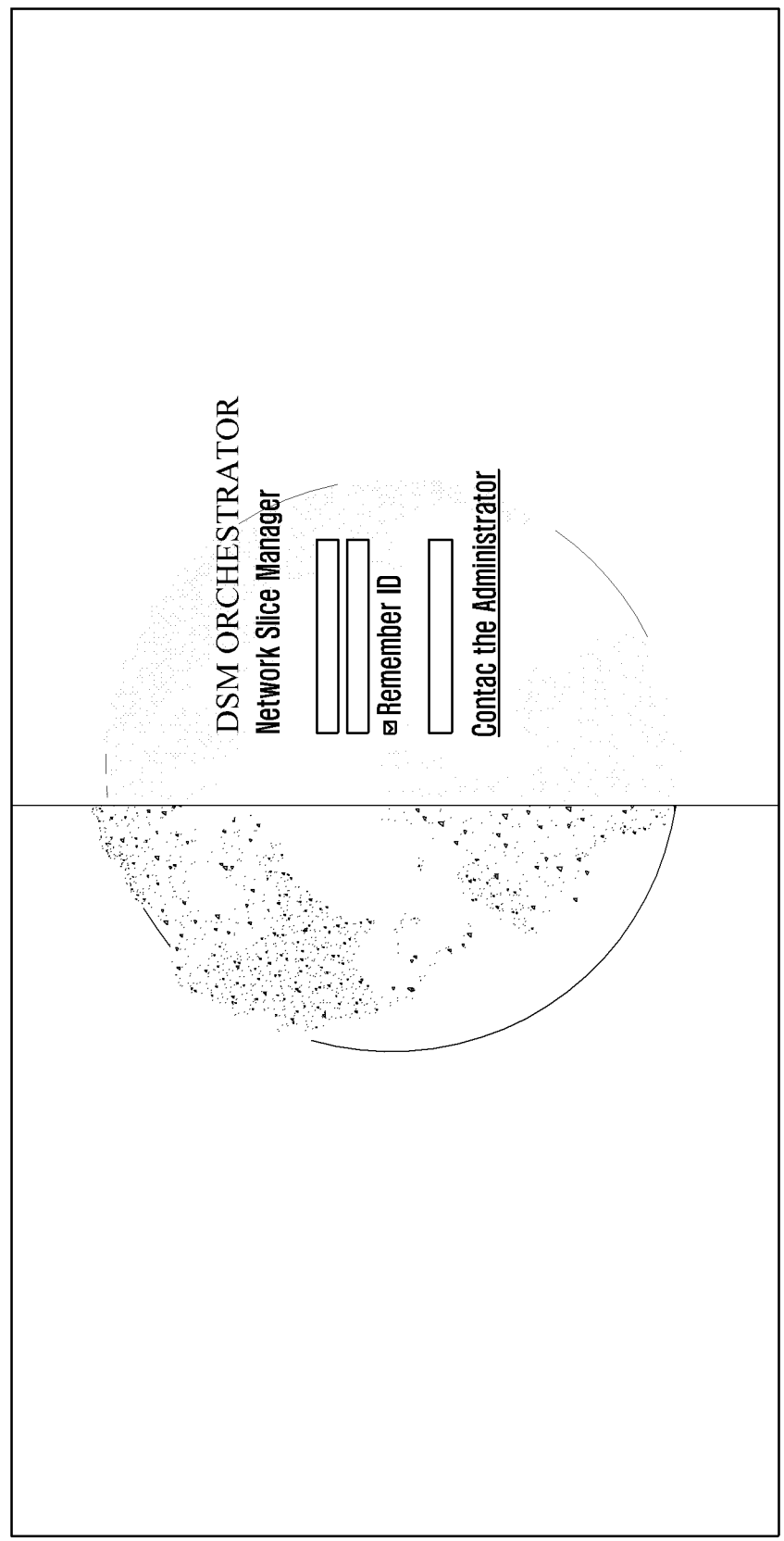
FIG. 21 is a diagram illustrating a user interface for inputting information of an operator who can use a management device according to an embodiment of the disclosure.

Referring to FIG. 21, a management device according to an embodiment of the disclosure may provide a user interface for inputting information on an operator who can use the management device.

Referring to FIG. 22, a management device according to an embodiment of the disclosure may provide information about network slices configured for respective RATs for a single terminal. The operator may identify the type of the network slice and the IP address of a corresponding base station through the user interface shown in FIG. 22.

Figure 23:
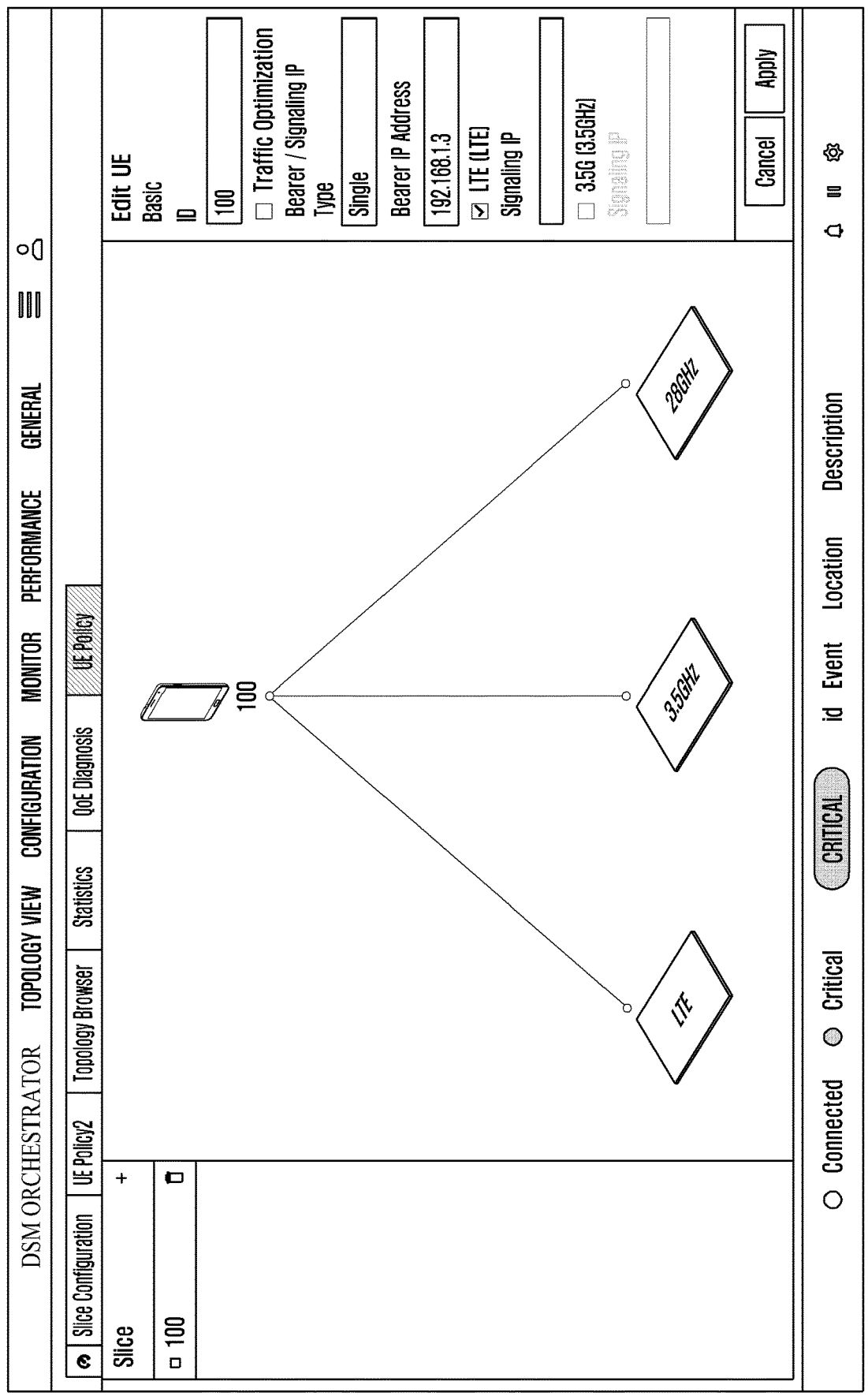
FIG. 23 is a diagram illustrating a user interface for setting information on network slices configured for a terminal and a policy for the corresponding terminal according to an embodiment of the disclosure.
Figure 24:
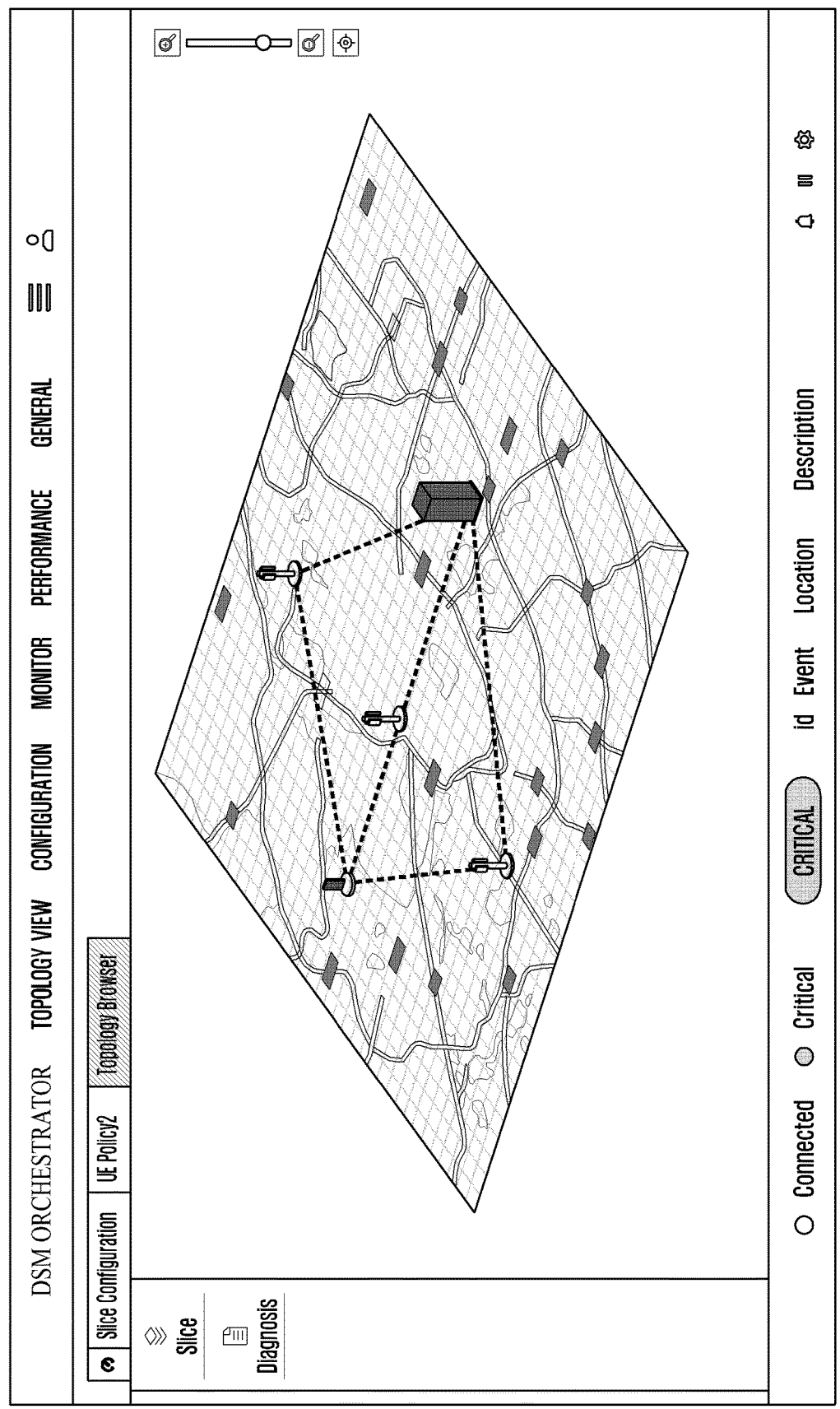
FIG. 24 is a diagram illustrating a user interface for providing network slices configured for a terminal by displaying the same by regions and RATs according to an embodiment of the disclosure.
Figure 25:
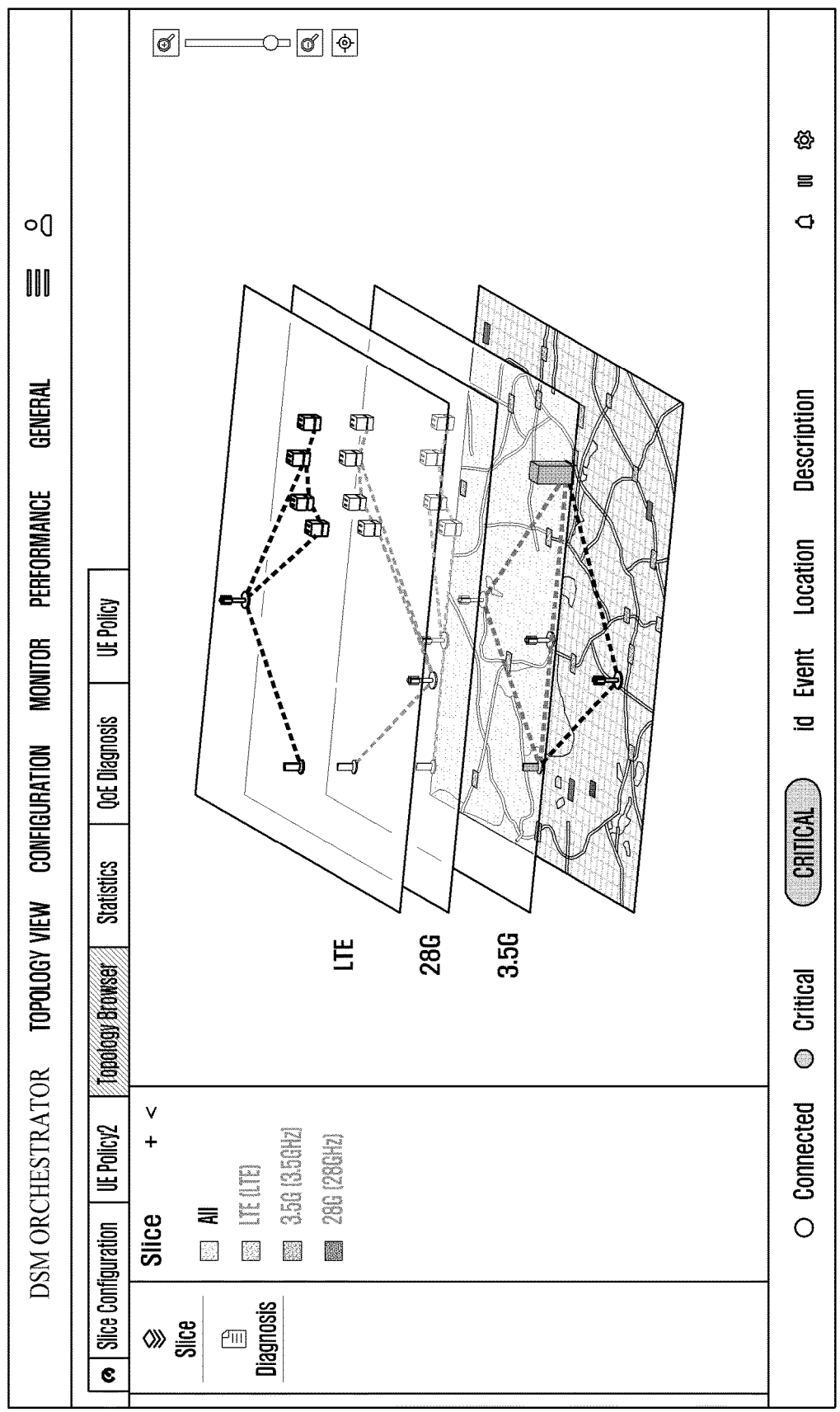
FIG. 25 is a diagram illustrating a user interface for providing network slices configured for a terminal by displaying the same by regions and RATs according to an embodiment of the disclosure.
Figure 26:
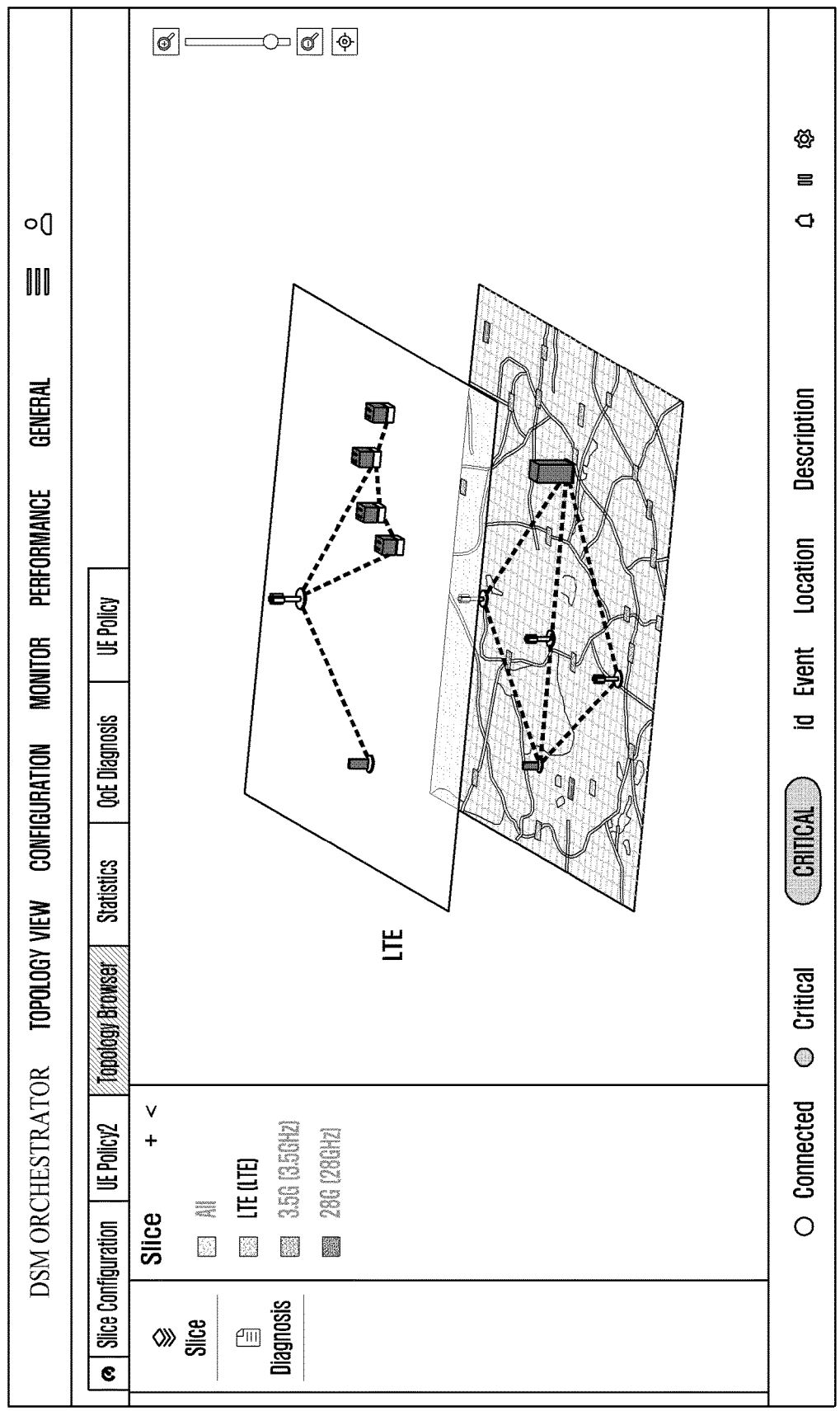
FIG. 26 is a diagram illustrating a user interface for providing network slices configured for a terminal by displaying the same by regions and RATs according to an embodiment of the disclosure.
Figure 27:
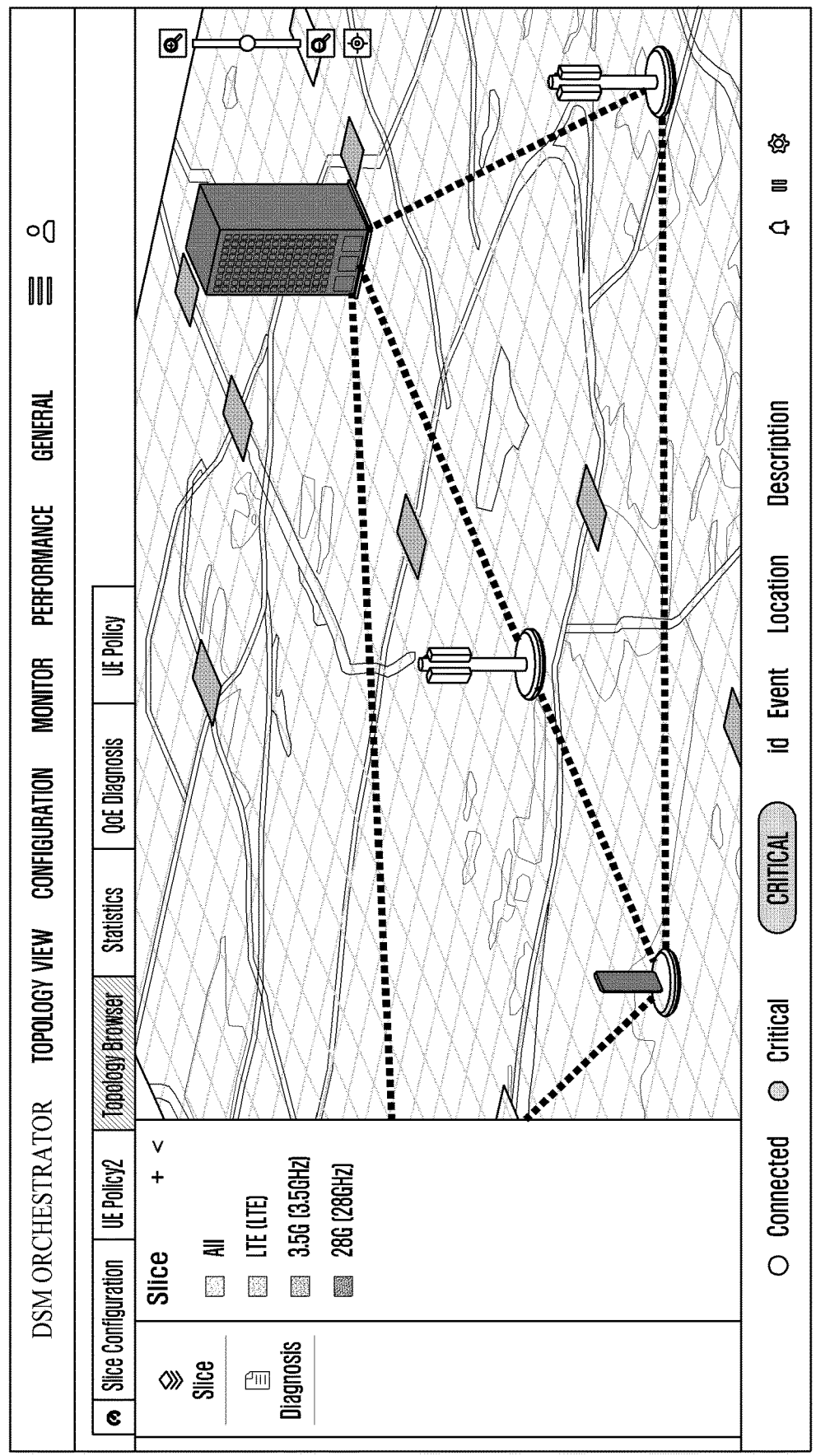
FIG. 27 is a diagram illustrating a user interface for providing network slices configured for a terminal by displaying the same by regions and RATs according to an embodiment of the disclosure.

Referring to FIG. 23, a management device according to an embodiment of the disclosure may provide a user interface as shown in the drawing in order for an operator to configure information on network slices configured for a single terminal and a policy for the corresponding terminal.

Referring to FIGS. 24 to 27, a management device according to various embodiments of the disclosure may display and provide the network slices configured for a terminal by regions and RATs to the operator.

Figure 28:
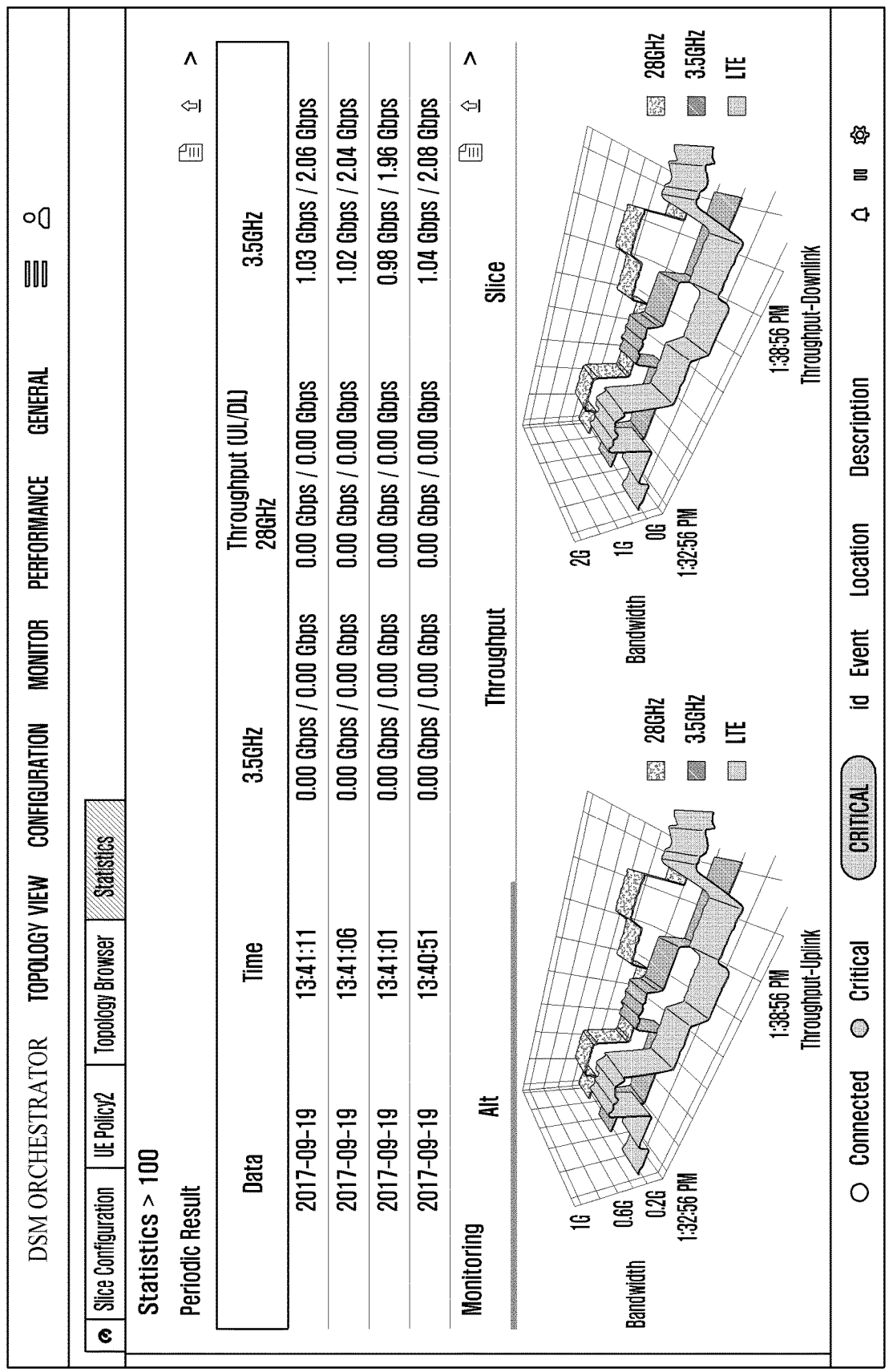
FIG. 28 is a diagram illustrating a user interface displaying a monitoring result for traffic transmitted and received in each network slice by date and time according to an embodiment of the disclosure.
Figure 29:
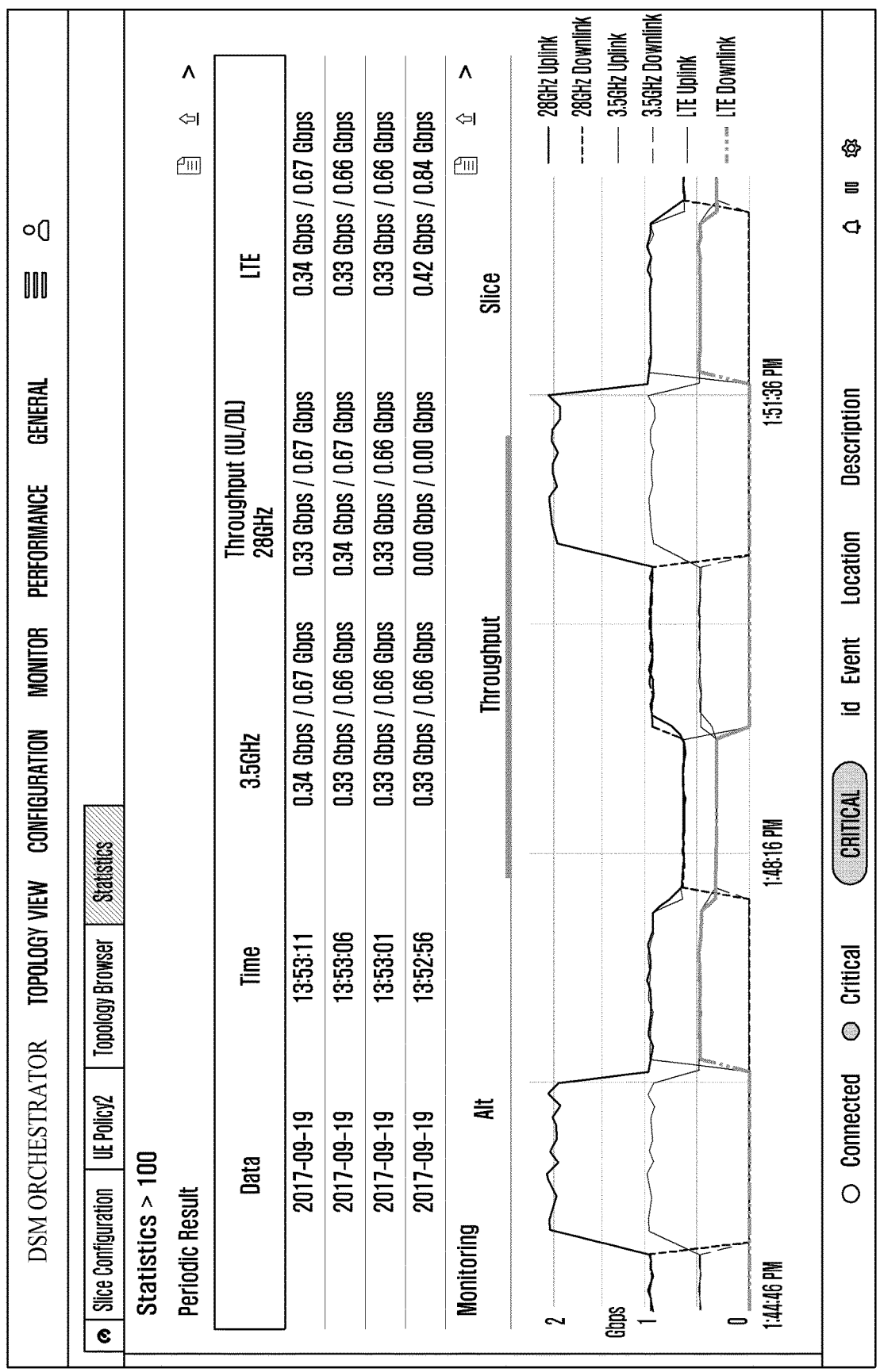
FIG. 29 is a diagram illustrating a user interface displaying a monitoring result for traffic transmitted and received in each network slice by date and time according to an embodiment of the disclosure.
Figure 30:
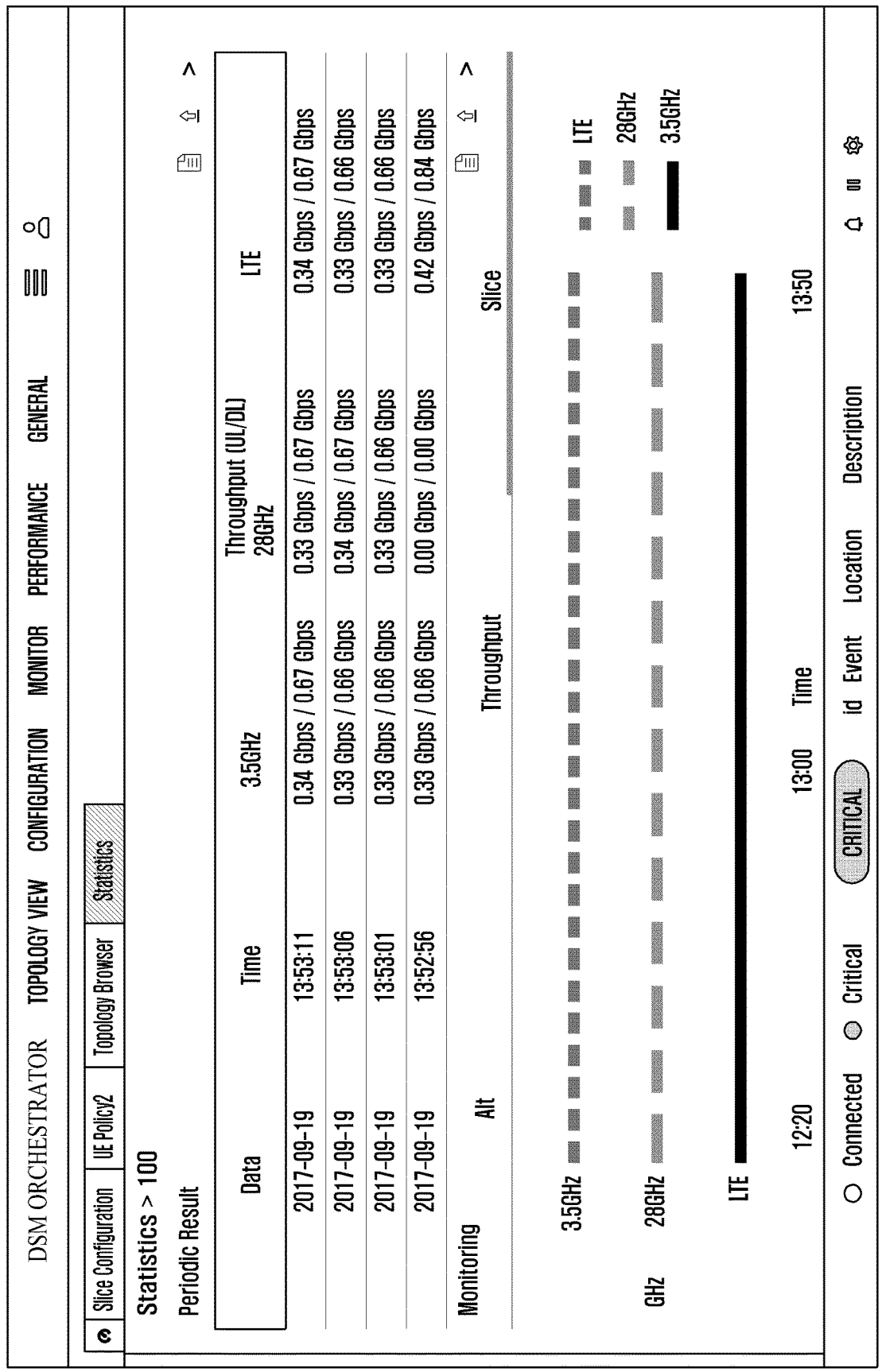
FIG. 30 is a diagram illustrating a user interface displaying a result of monitoring traffic transmitted and received in each network slice by date and time according to an embodiment of the disclosure.

Referring to FIGS. 28 to 30, a management device according to various embodiments of the disclosure may display and provide a monitoring result for traffic transmitted and received in each network slice by date and time to the operator.

Figure 31:
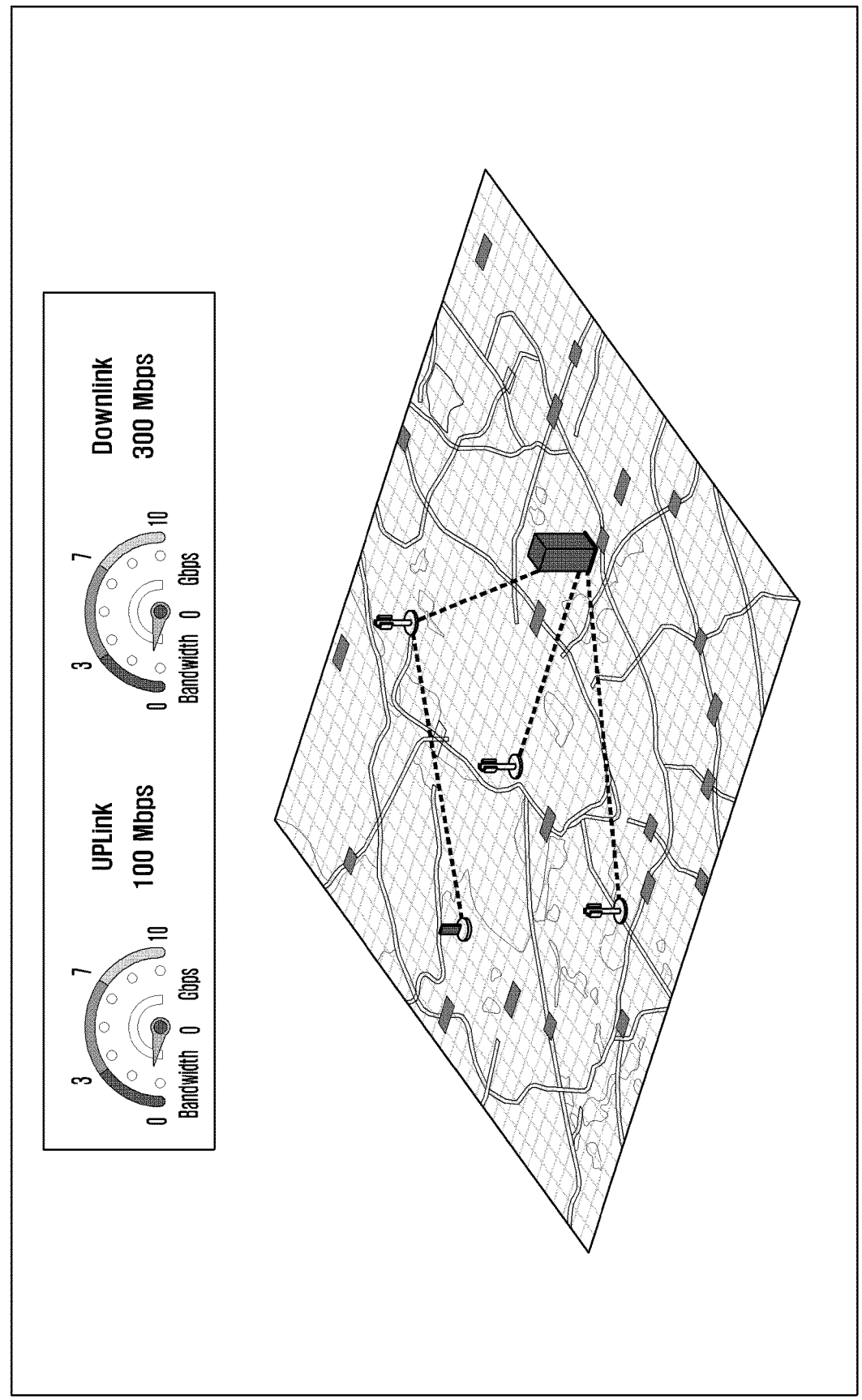
FIG. 31 is a diagram illustrating a user interface displaying a result of monitoring uplink traffic and downlink traffic for a specific network slice according to an embodiment of the disclosure.

Referring to FIG. 31, a management device according to an embodiment of the disclosure may display and provide the result of monitoring uplink traffic and downlink traffic for a specific network slice to the operator.

Figure 32:
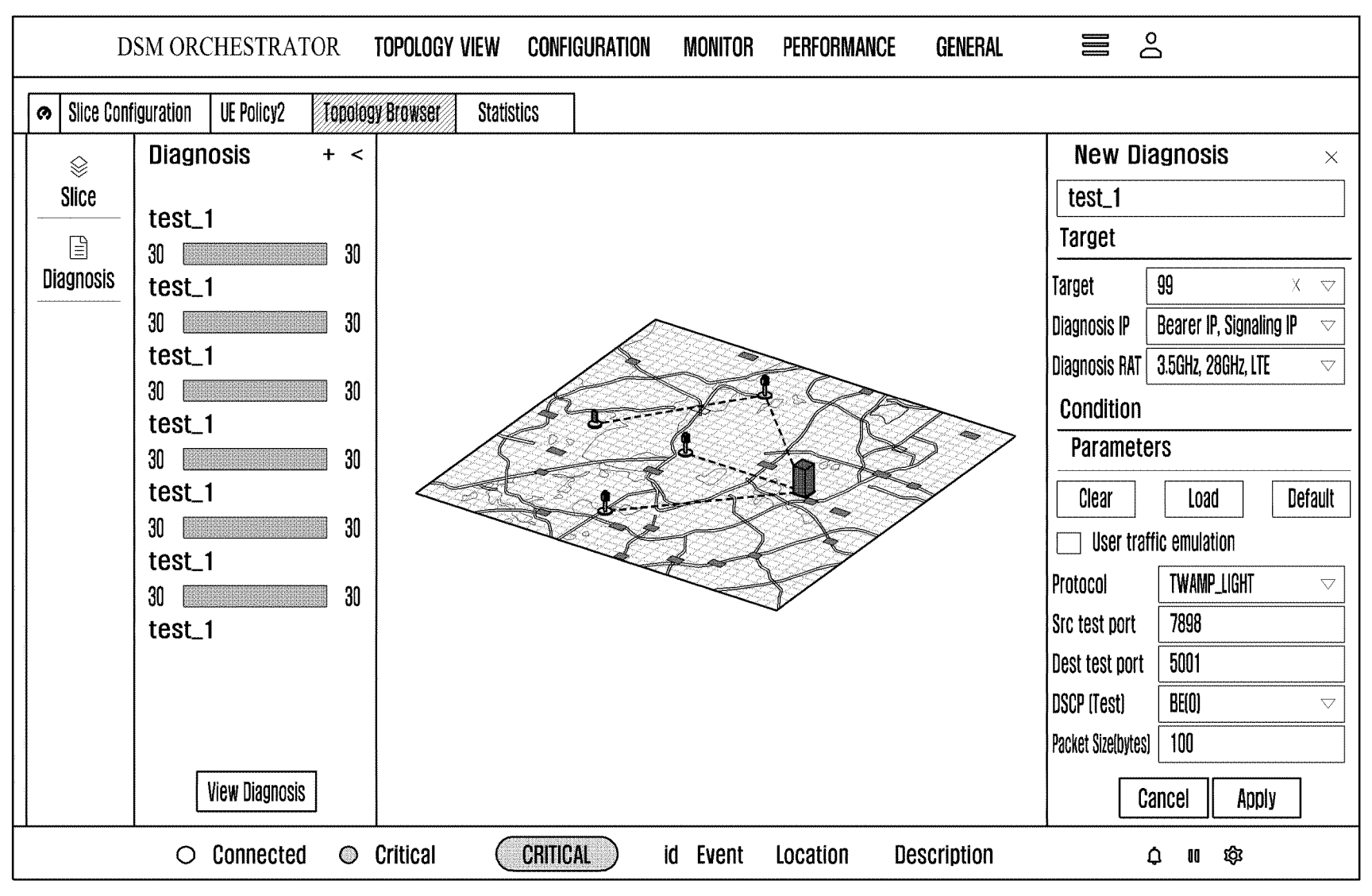
Figure 33:
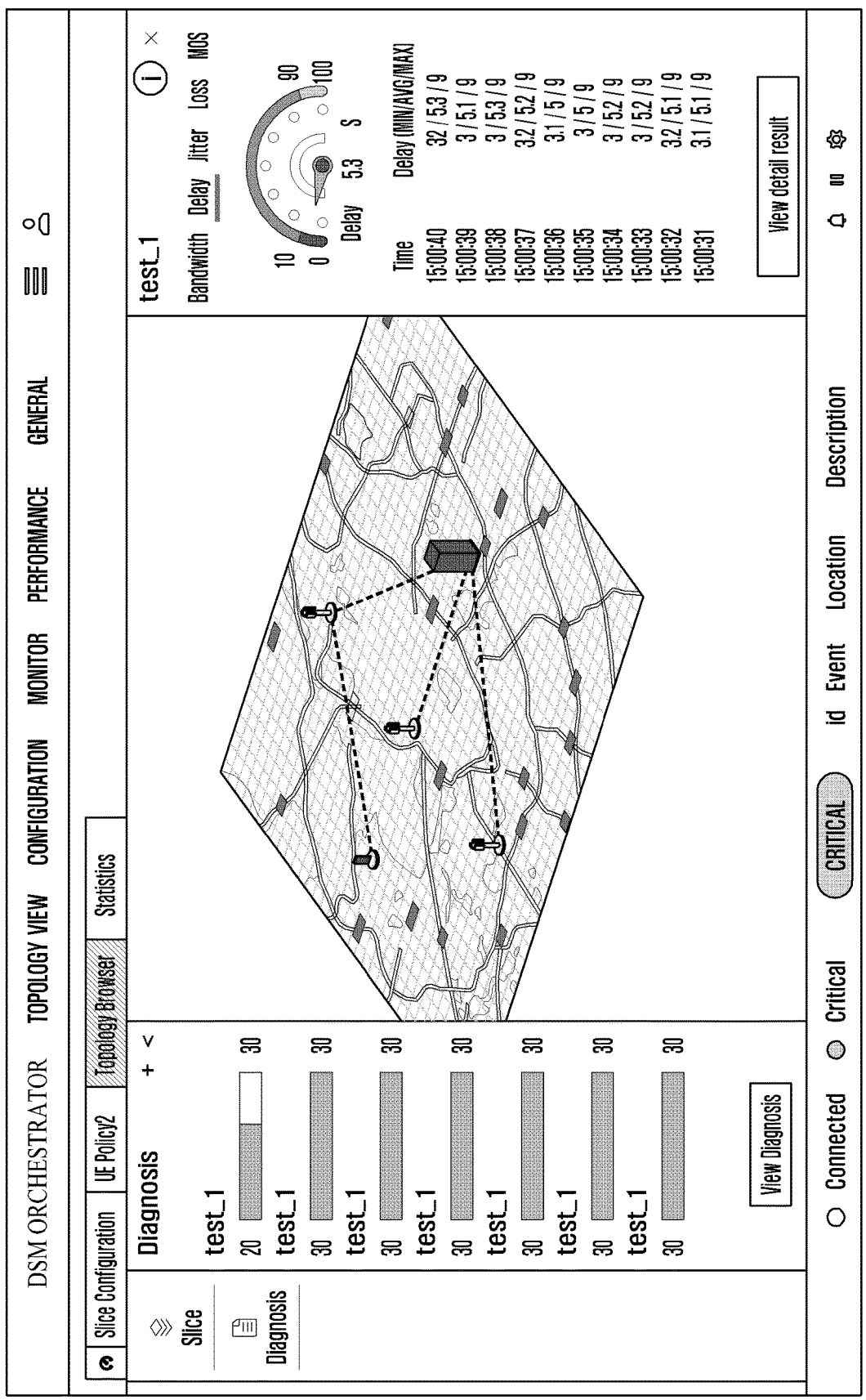
FIG. 33 is a diagram illustrating a user interface for providing a result of an active monitoring operation according to an operator's request by displaying the same for respective SLA conditions according to an embodiment of the disclosure.
Figure 34:
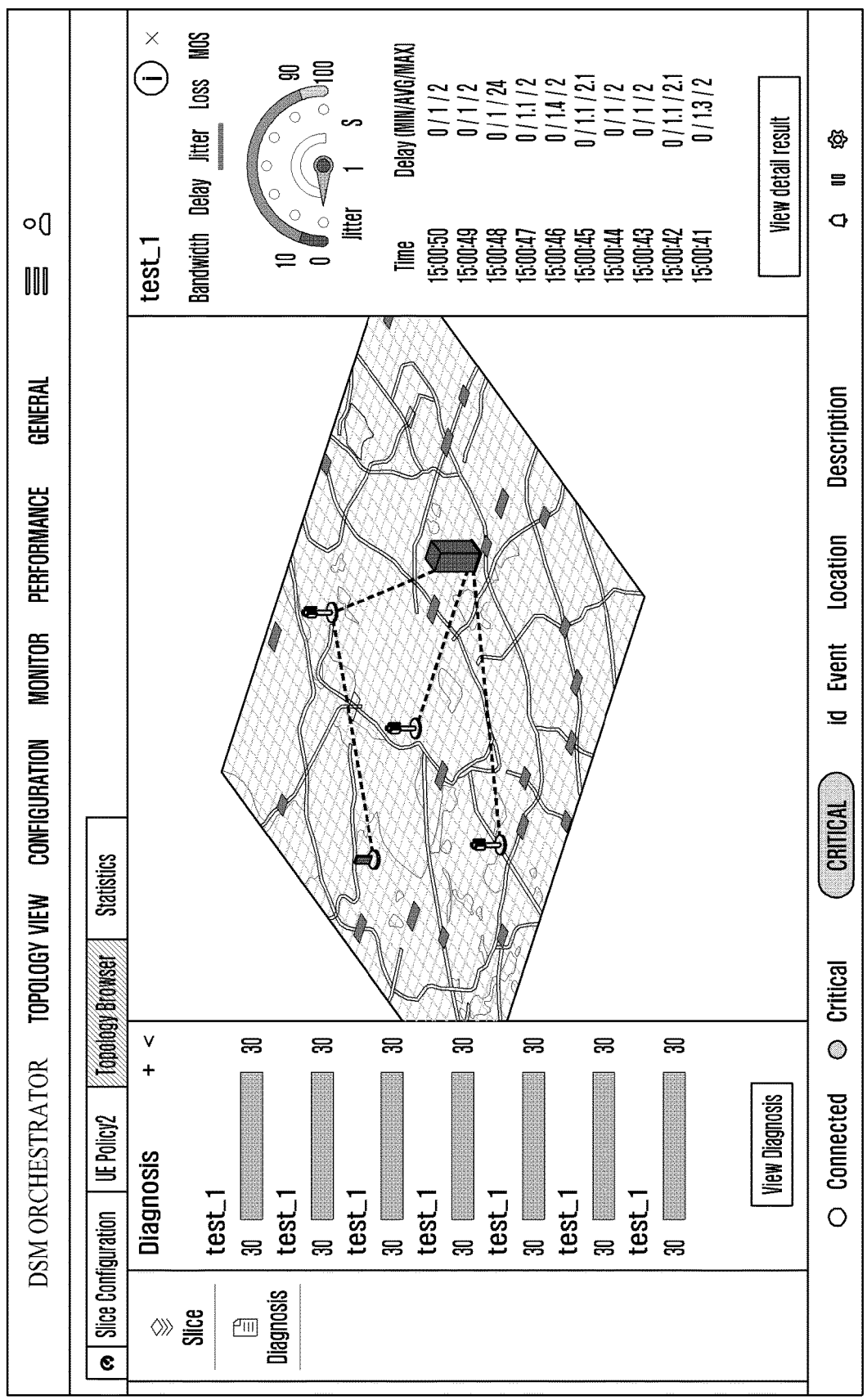
FIG. 34 is a diagram illustrating a user interface for providing a result of an active monitoring operation according to an operator's request by displaying the same for respective SLA conditions according to an embodiment of the disclosure.

Referring to FIGS. 32 to 34, a management device according to various embodiments of the disclosure may provide the operator with a user interface for inputting configuration related to an active monitoring operation for a specific network slice as shown in FIG. 32, and may provide an active monitoring operation result according to a request from the operator by displaying the same for respective SLA conditions (e.g., delay or jitter) as shown in FIGS. 33 and 34.

Figure 35:
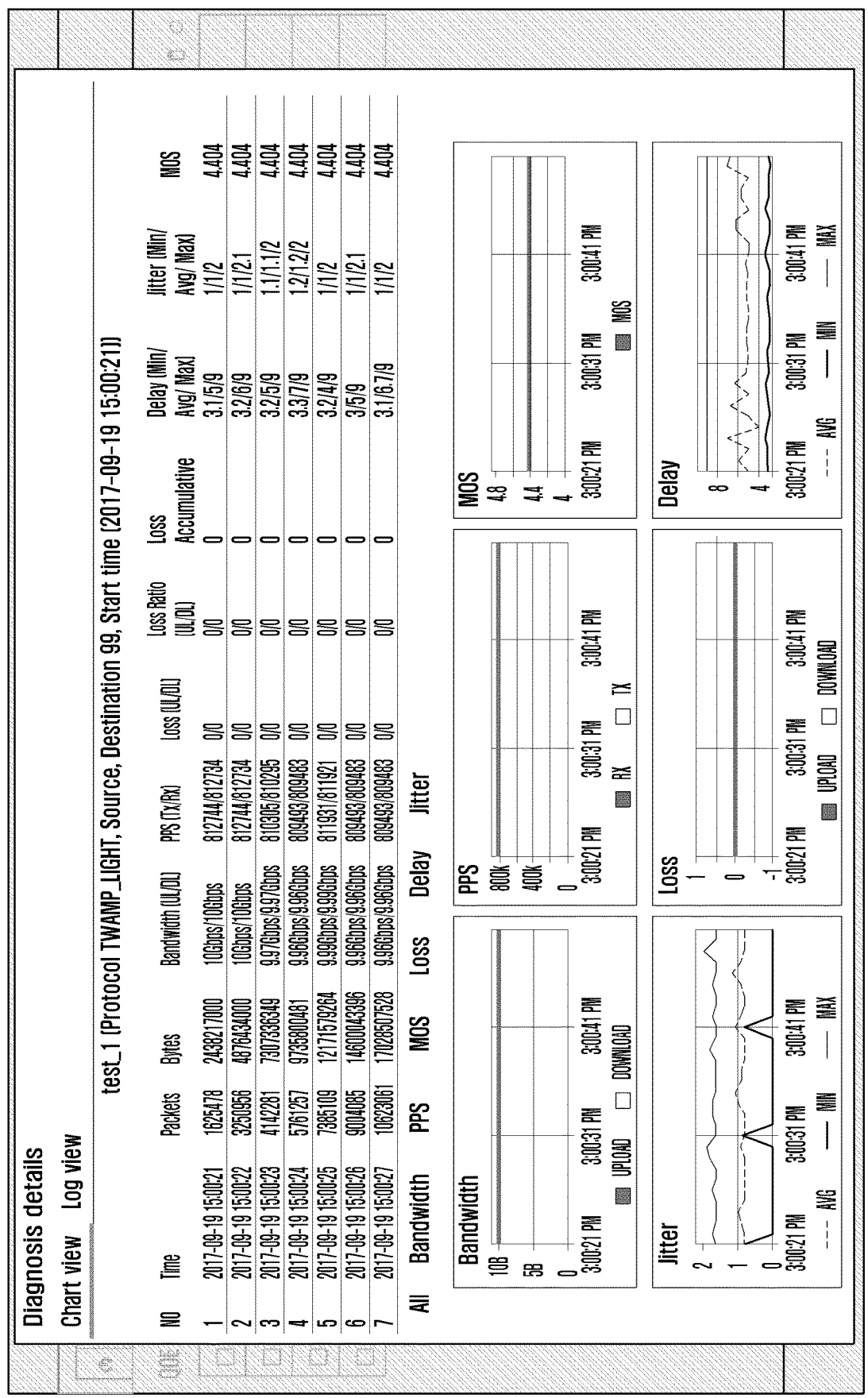
FIG. 35 is a diagram illustrating a user interface for visualizing and providing network quality information based on a monitoring result according to an embodiment of the disclosure.
Figure 36:
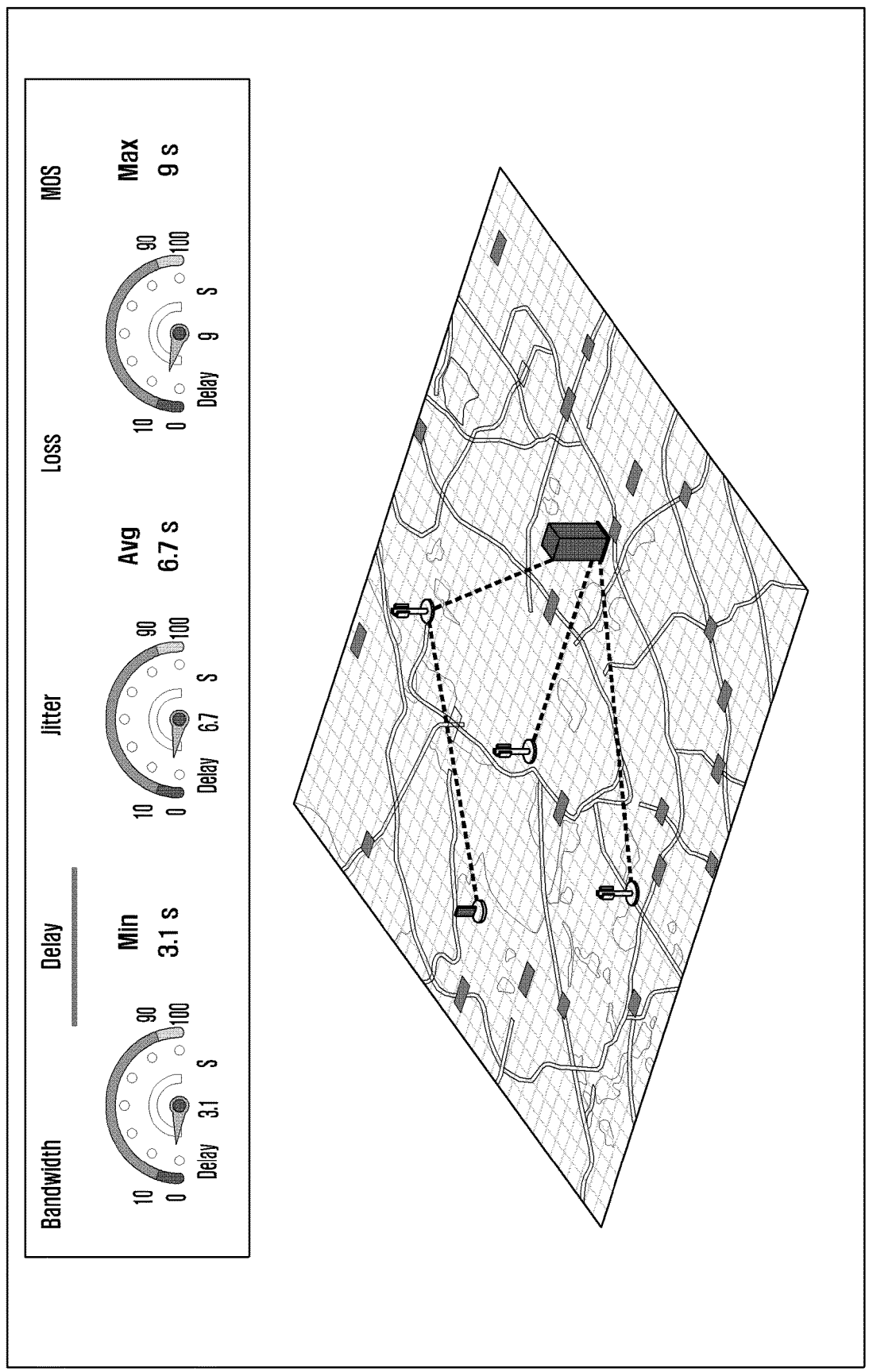
FIG. 36 is a diagram illustrating a user interface for visualizing and providing network quality information based on a monitoring result according to an embodiment of the disclosure.

Referring to FIGS. 35 and 36, a management device according to various embodiments of the disclosure may provide network quality information according to a monitoring result by visualizing the same in the form of a chart, and may provide measurement results related to a plurality of SLA conditions by displaying the same together with the configuration of network slices.

Those skilled in the art can appreciate that it is possible to implement the disclosure in another specific form without changing the technical idea or the indispensable characteristics of the disclosure. Accordingly, it should be understood that the embodiments described above are merely exemplary and are not limited. The scope of the disclosure is defined by the appended claims to be described later, rather than the detailed description. Accordingly, it should be appreciated that all modifications or variations derived from the meaning and scope of the appended claims and their equivalents are included in the range of the disclosure.

While the disclosure has been shown and described with reference to various embodiments thereof, it will be understood by those skilled in the art that various changes in form and details may be made therein without departing from the spirit and the scope of the disclosure as defined by the appended claims and their equivalents.

What is claimed is:

1. A management device for controlling an end-to-end network in a wireless communication system, the management device comprising:
at least one processor configured to:
configure a plurality of network slices for a terminal, and
set a policy applied to the plurality of network slices, wherein each of the plurality of network slices is configured for a different frequency band, wherein each base station is allocated to a network slice among the plurality of network slices, and wherein the policy includes transmission path information of traffic for each of the plurality of network slices; and
a software defined network (SDN) device configured to:
identify a base station based on an internet protocol (IP) address which is included in the traffic,
select a network slice for which the identified base station is allocated from the plurality of network slices, and
control one or more network entities for transmitting the traffic through a transmission path based on the transmission path information corresponding to the selected network slice.

2. The management device of claim 1,
wherein the policy further comprises information on a service level agreement (SLA) applied to each of the plurality of network slices, and
wherein the one or more network entities comprise at least one of an edge router included in a transmission path between the terminal and a user plane function (UPF) entity of a server, at least one switch, and a virtual switch included in the server.

3. The management device of claim 2, wherein the SDN device is configured to
determine the transmission path of the traffic.

4. The management device of claim 2, wherein, if the traffic is transmitted to the virtual switch of the server, the traffic is processed by a at least one processor included in the virtual switch and is transmitted to the UPF entity or an entity outside the server, which is determined by the at least one processor included in the virtual switch.

5. The management device of claim 4, wherein a plurality of flow tables applied by the at least one processor included in the virtual switch comprise:
a first flow table applied to identify the terminal to and from which the traffic is transmitted and received;
a second flow table applied to identify a network slice for the traffic; and
a third flow table applied to determine the UPF entity or the entity outside the server to which the traffic is to be transmitted.

6. The management device of claim 2,
wherein the at least one processor is further configured to transmit, to a server including a user plane function (UPF) entity, a signal to request monitoring network quality for at least one network slice among the plurality of network slices by using the SDN device,
wherein the signal controls the server to produce a test packet for performing an operation of the monitoring, and
wherein the test packet provides the server with measurement information related to the network quality by being transmitted and received between the terminal and the UPF entity.

7. The management device of claim 6,
wherein the SDN device obtains, from the server, first measurement information on network quality based on the traffic and second measurement information on network quality based on the test packet,
wherein the at least one processor is further configured to determine whether quality information on the at least one network slice satisfies information on the SLA agreement based on the first measurement information and the second measurement information, and
wherein the information on the SLA agreement comprises at least one of information on maximum bandwidth used by the at least one network slice, information on latency guaranteed by the at least one network slice, information on the maximum number of terminals accessing the at least one network slice, and priority information of the at least one network slice.

8. A server for controlling an end-to-end network in a wireless communication system, the server comprising:
a virtual switch comprising at least one processor configured to process traffic for a terminal; and
a user plane function (UPF) entity configured to receive the traffic from the terminal or transmit the traffic to the terminal,
wherein the at least one processor is configured to identify a network slice configured for the terminal among a plurality of network slices using a plurality of flow tables for processing the traffic and process the traffic according to a flow rule corresponding to the identified network slice, and
wherein each network slice among the plurality of network slices is configured for a different frequency band.

9. The server of claim 8, wherein the plurality of flow tables comprises:
a first flow table applied to identify the terminal to and from which the traffic is transmitted and received;
a second flow table applied to identify the network slice for the traffic; and
a third flow table applied to determine the UPF entity or an entity outside the server to which the traffic is to be transmitted.

10. The server of claim 8,
wherein the at least one processor is further configured to:
produce, if a signal to request monitoring network quality for the identified network slice is received, by the virtual switch, from a management device controlling a transmission path of the traffic, a test packet for measuring quality of the identified network slice; and
transmit the test packet to the virtual switch,
wherein the test packet transmitted to the virtual switch is transmitted and received between the terminal and the UPF entity,
wherein first measurement information on network quality is determined by the at least one processor based on the test packet,
wherein second measurement information on network quality is determined by the at least one processor based on the traffic, and wherein at least one of the first measurement information and the second measurement information is transmitted from the virtual switch to the management device.

11. A method of a management device for controlling an end-to-end network in a wireless communication system, the method comprising:
configuring a plurality of network slices for a terminal;
setting a policy applied to the plurality of network slices, wherein each of the plurality of network slices is configured for a different frequency band, wherein each base station is allocated to a network slice among the plurality of network slices, and wherein the policy includes transmission path information of traffic for each of the plurality of network slices;
identifying a base station based on an internet protocol (IP) address which is included in the traffic;
selecting a network slice for which the identified base station is allocated from the plurality of network slices; and
controlling one or more network entities for transmitting the traffic through a transmission path based on the transmission path information corresponding to the selected network slice.

12. The method of claim 11,
wherein the policy further comprises information on a service level agreement (SLA) applied to each of the plurality of network slices, and
wherein the one or more network entities comprise at least one of an edge router included in a transmission path between the terminal and a user plane function (UPF) entity of a server, at least one switch, and a virtual switch included in the server.

13. The method of claim 12, further comprising:
determining the transmission path of the traffic.

14. The method of claim 12, wherein, if the traffic is transmitted to the virtual switch of the server, the traffic is processed by at least one processor included in the virtual switch and is transmitted to the UPF entity or an entity outside the server, which is determined by the at least one processor included in the virtual switch.

15. The method of claim 14, wherein a plurality of flow tables applied by the at least one processor included in the virtual switch comprises:
flow table 0 applied to identify the terminal to and from which the traffic is transmitted and received;
flow table 1 applied to identify a network slice for the traffic; and
flow table 2 applied to determine the UPF entity or the entity outside the server to which the traffic is to be transmitted.

16. The method of claim 12, further comprising: transmitting, to a server including a user plane function (UPF) entity, a signal to request monitoring network quality for at least one network slice among the plurality of network slices,
wherein the signal controls the server to produce a test packet for performing an operation of the monitoring, and
wherein the test packet provides the server with measurement information related to the network quality by being transmitted and received between the terminal and the UPF entity.

17. The method of claim 16, further comprising:
obtaining, from the server, first measurement information on network quality based on the traffic and second measurement information on network quality based on the test packet; and
determining whether quality information on the at least one network slice satisfies information on the SLA agreement based on the first measurement information and the second measurement information,
wherein the information on the SLA agreement comprises at least one piece of information on maximum bandwidth used by the at least one network slice, information on latency guaranteed by the at least one network slice, information on the maximum number of terminals accessing the at least one network slice, and priority information of the at least one network slice.

18. A method of a server for controlling an end-to-end network in a wireless communication system, the method comprising:
identifying a network slice configured for a terminal among a plurality of network slices using a plurality of flow tables for processing traffic for the terminal;
processing the traffic according to a flow rule corresponding to the identified network slice; and
transmitting the processed traffic to a user plane function (UPF) entity inside the server or to an entity outside the server,
wherein each network slice among the plurality of network slices is configured for a different frequency band.

19. The method of claim 18, wherein the plurality of flow tables comprises:
flow table 0 applied to identify the terminal to and from which the traffic is transmitted and received;
flow table 1 applied to identify the network slice for the traffic; and
flow table 2 applied to determine the UPF entity or an entity outside the server to which the traffic is to be transmitted.

20. The method of claim 18, further comprising:
receiving a signal to request monitoring network quality for the network slice from a management device controlling a transmission path of the traffic;
producing a test packet for measuring quality of the network slice, based on the received signal;
controlling the test packet to be transmitted and received between the terminal and the UPF entity;
determining first measurement information on network quality, based on the test packet;
determining second measurement information on network quality, based on the traffic; and
transmitting at least one of the first measurement information and the second measurement information to the management device.

* * * * *